US005590037A

United States Patent [19]

Ryan et al.

[11] Patent Number: 5,590,037

[45] Date of Patent: Dec. 31, 1996

[54] DIGITAL COMPUTER SYSTEM AND METHODS FOR COMPUTING A FINANCIAL PROJECTION AND AN ILLUSTRATION OF A PREFUNDING PROGRAM FOR AN EMPLOYEE BENEFIT

[75] Inventors: Raymond B. Ryan, Darien, Conn.; Noah F. Gans, New York, N.Y.

[73] Assignee: The Evergreen Group Incorporated, Stamford, Conn.

[21] Appl. No.: 123,312

[22] Filed: Sep. 17, 1993

[51] Int. Cl.$^6$ .................................................. G06F 157/00

[52] U.S. Cl. ............................................ 395/204; 395/230

[58] Field of Search .................................... 364/401, 408, 364/406

[56] References Cited

U.S. PATENT DOCUMENTS

| | | |
|---|---|---|
| 4,750,119 | 6/1988 | Cohen . |
| 4,750,121 | 6/1988 | Halley . |
| 4,969,094 | 11/1990 | Halley . |
| 4,975,840 | 12/1990 | Detore . |
| 5,136,501 | 8/1992 | Silverman . |
| 5,136,502 | 8/1992 | Van Remortel . |
| 5,206,803 | 4/1993 | Vitagliano . |

OTHER PUBLICATIONS

Utilities and Telecommunications Responses to FAS 106 presented by The Evergreen Group at The Twelfth Annual Utility and Telecommunications Accounting and Tax Conference in Washington D.C. on May 13, 1993.

FASB Emerging Issues Task Force Issue No. 93–3 on Jan. 21, 1993 (EITF 93–3).

Donald T. Cameron, John Erlenbron, Nealy K. Ranade, Frederick W. Ruebeck, Dallas Salisbury, J.E. Stair, Michael J. Gulotta, Panelists, How to meet your OPEB Obligation, Financial Executive, Jan./Feb., 1992, pp. 17–30.

Janet M. Den Uyl and Larry R. Sluder, Funding Retiree Health Benefits With Life Insurance In A VEBA, Journal of Compensation and Benefits, May/Jun., 1992, pp. 22–31.

Ethan E. Kra, and William A. Bader, Retiree Medical Benefits: Making the Fund or Finance Decision, The Journal of Corporate Accounting and Finance, Spring, 1992, pp. 285–301.

Harold Dankner, John M. Bertko, Jean M. Wodarcyk, and Lee E. Launer, Your retiree health benefits plan: good design, safe funding, Financial Executive, Mar./Apr., 1991, pp. 47–54.

Raymond B. Ryan and Michael L. Johnson, Fund OPEB Now, Not Later, Financial Executive, May/Jun., 1992, pp. 46–47.

*Primary Examiner*—Donald E. McElheny, Jr.
*Attorney, Agent, or Firm*—Peter K. Trzyna; Baker & McKenzie

[57] ABSTRACT

In a system and methods for using a data processing system including a programmed electrical digital computer having a processor electrically connected to an input device and to an output device, generating financial projections and an illustration of an employee benefit program. The digital computer performs the steps of processing input data, including a financial forecast for a life insurance contract and further including a financial forecast for an employee benefit, to generate processed data including an illustration representing the life insurance contract encumbered by an indenture agreement as a means of prefunding for future employee benefits. The digital computer is programmed to provide financial analytical data, incorporating the requirements of a Financial Accounting Standards Board standard, such as Statement 87, 106, 112, or the like, for use in evaluating the use of life insurance as an investment in connection with an indenture plan for prefunding benefit liabilities.

42 Claims, 11 Drawing Sheets

FIG. 3.0
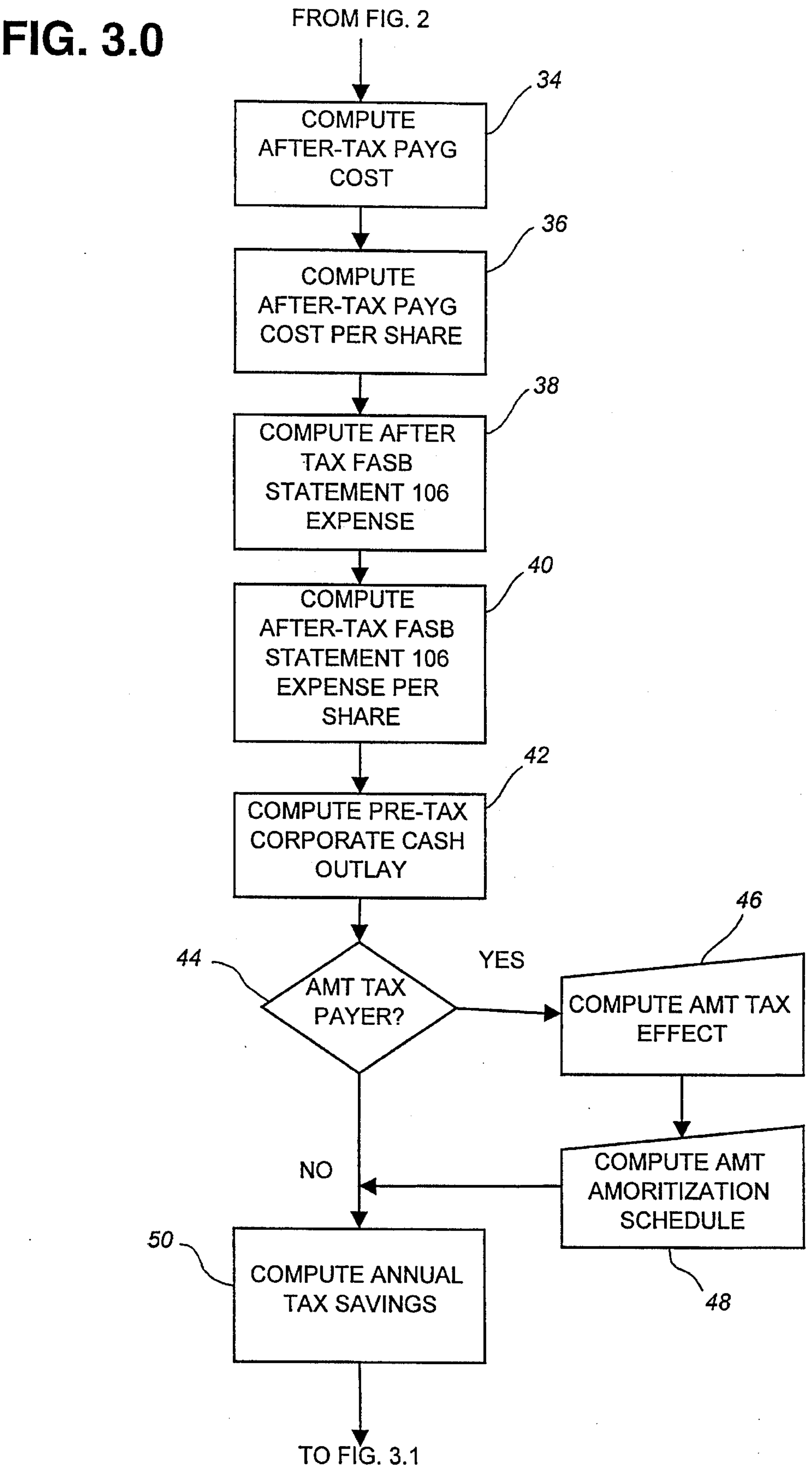

FIG. 3.1
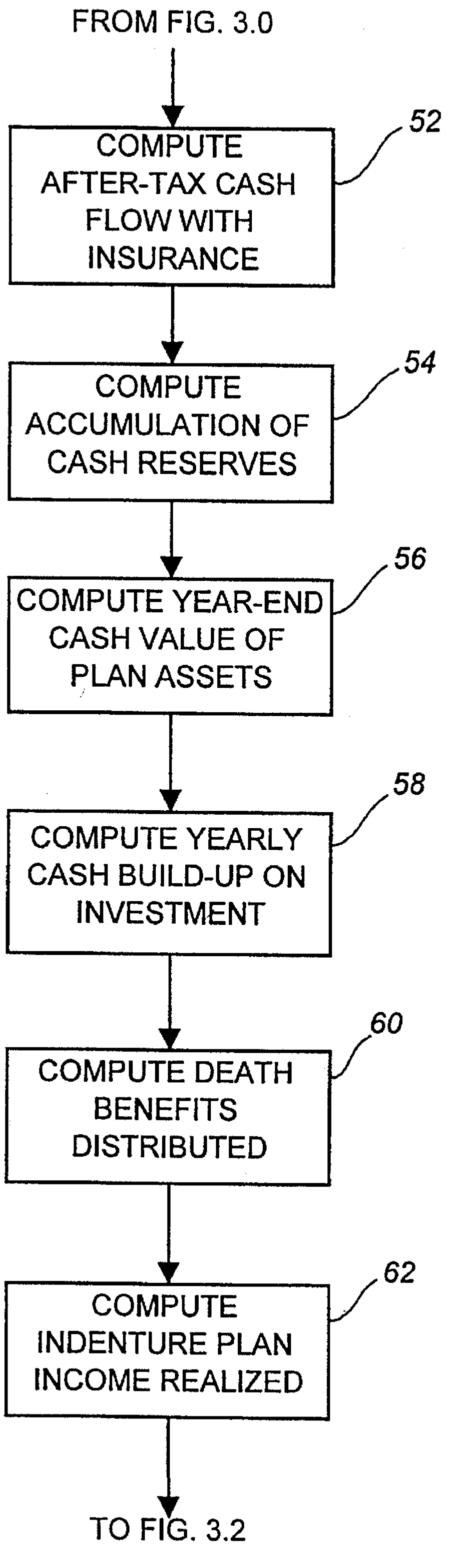

FIG. 3.2
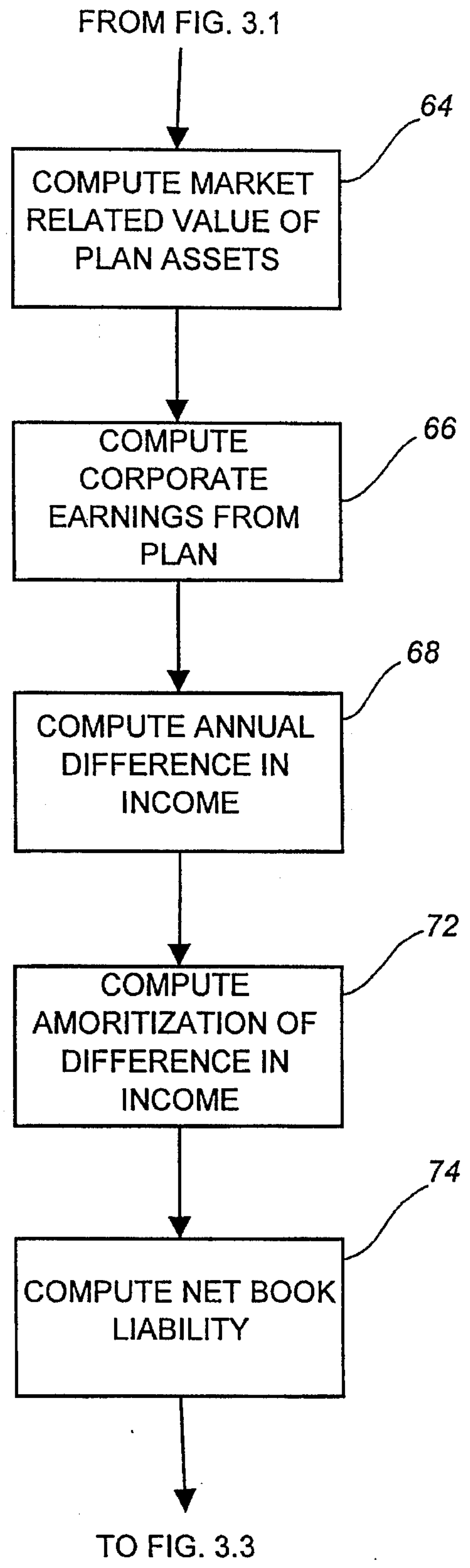

FIG. 3.3
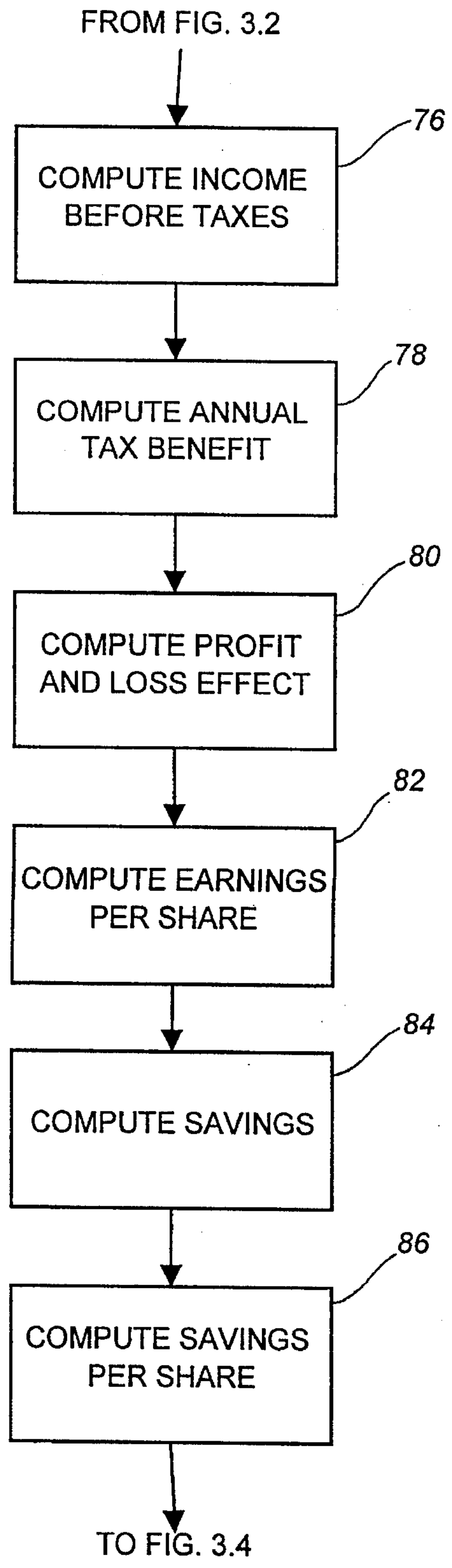

FIG. 3.4
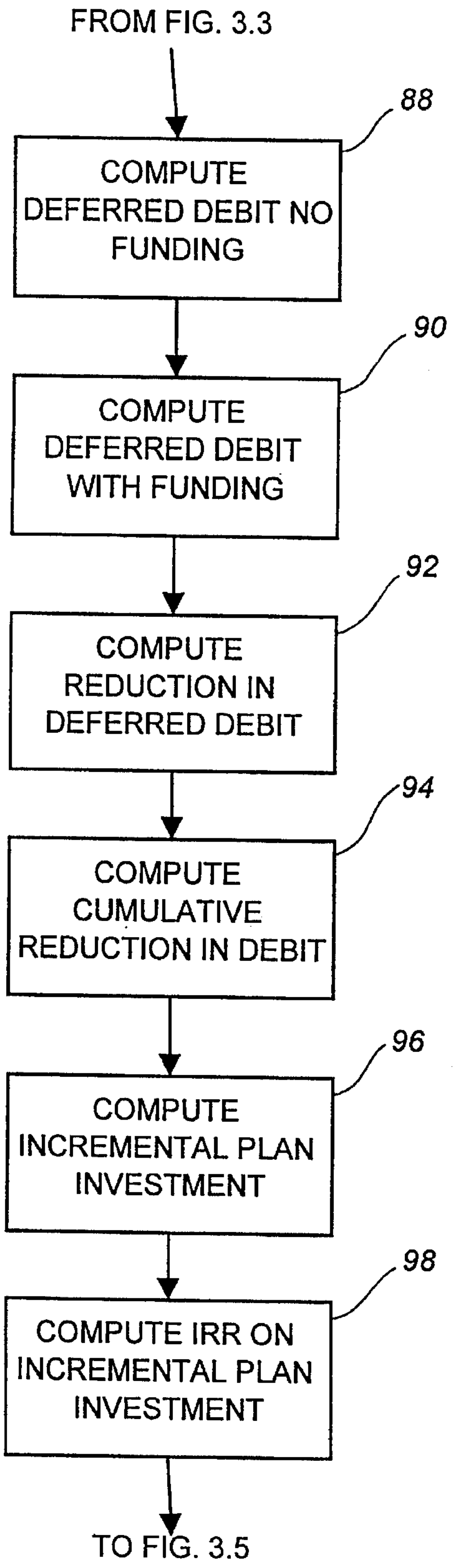

FIG. 3.5
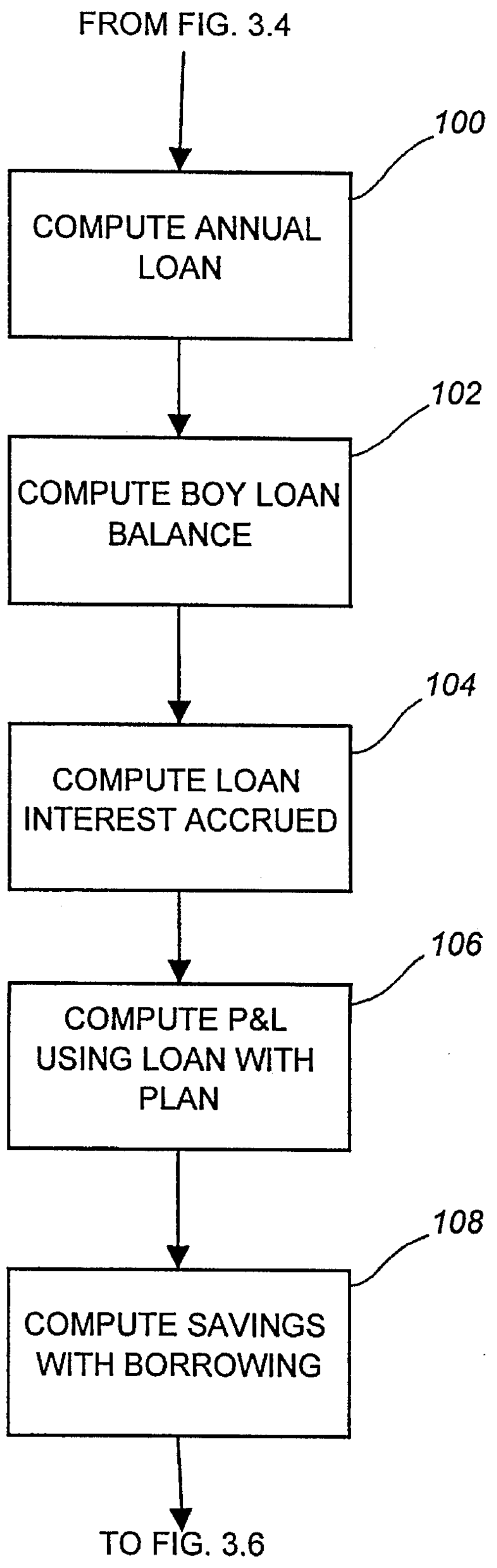

FIG. 3.6
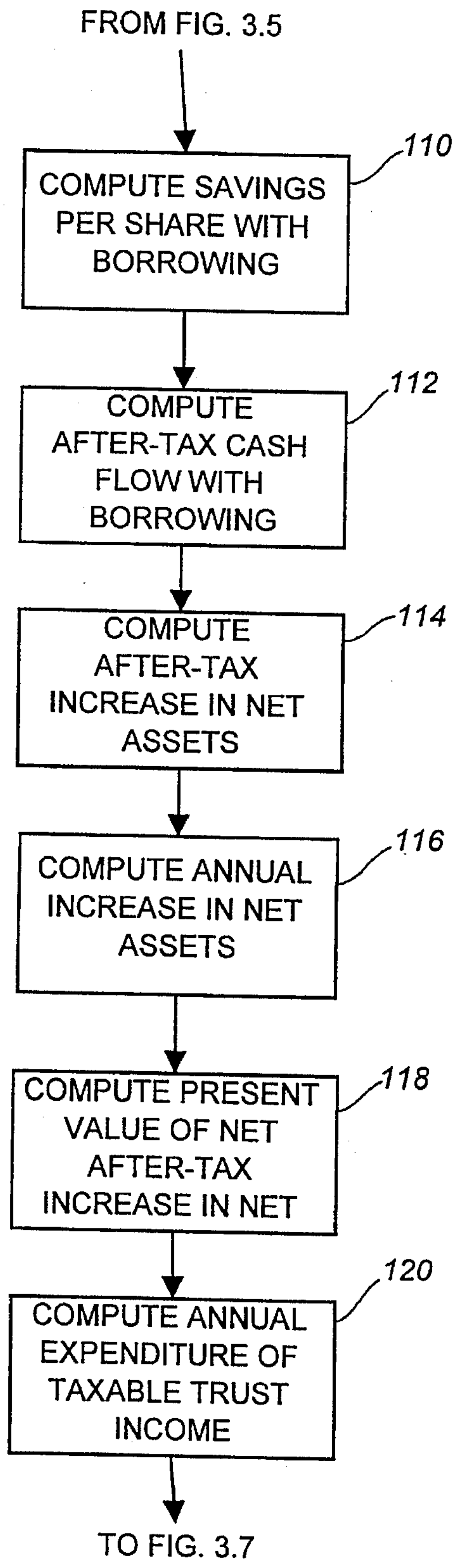

FIG. 3.7
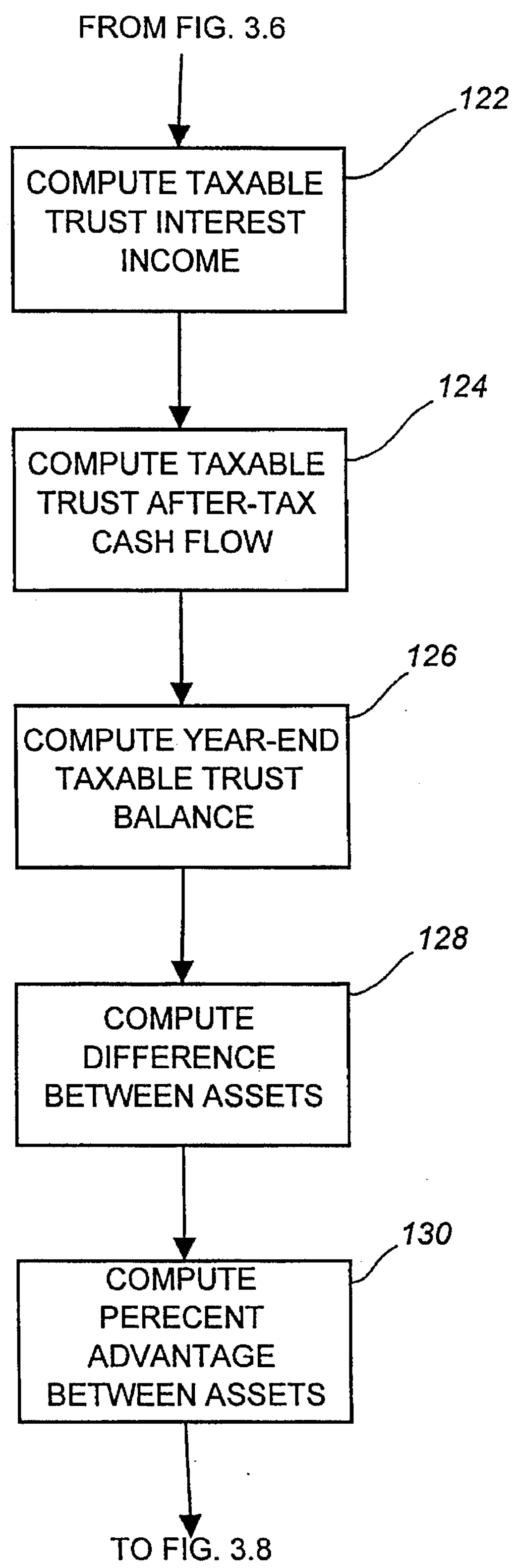

FIG. 3.8
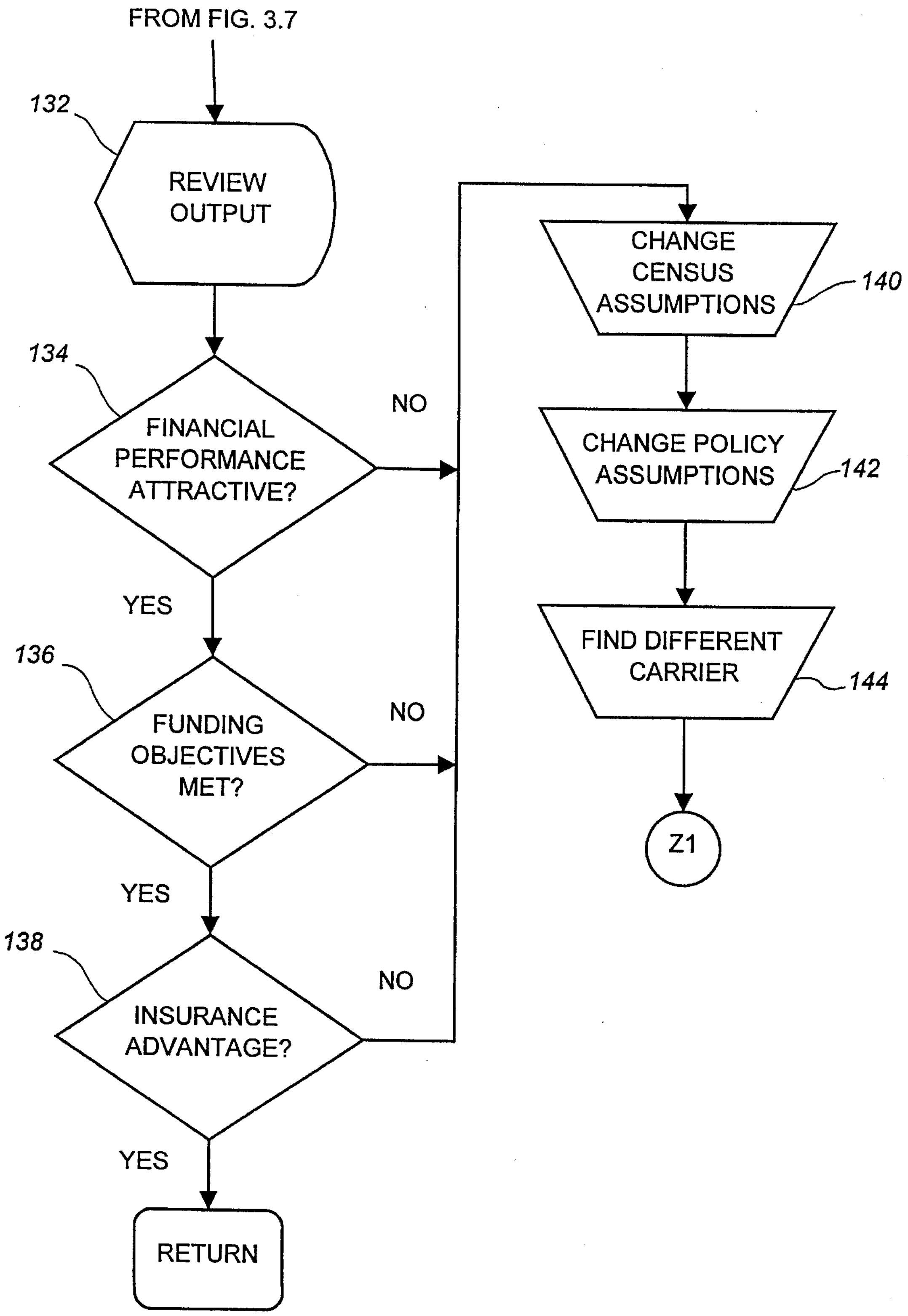

DIGITAL COMPUTER SYSTEM AND METHODS FOR COMPUTING A FINANCIAL PROJECTION AND AN ILLUSTRATION OF A PREFUNDING PROGRAM FOR AN EMPLOYEE BENEFIT

I. TECHNICAL FIELD

This invention concerns an electrical digital computer and a data processing system, and methods involving the same, applied to the financial fields of insurance and benefit funding. More particularly, this invention relates to automated and semi-automated aspects of an Indenture Agreement used to structure a prefunding program for an employee benefit program. The invention further comprehends computer-assisted analysis and projection of the after-tax cash flow and the balance sheet and income statement consequences of the funding program, in connection with an illustration generated by the system.

II. BACKGROUND OF THE INVENTION

The genesis of this invention originates in a need to respond to new accounting rules for Other Postretirement Employee Benefits (OPEBs). Until recently, the principal method of accounting for OPEB expenses has been the pay-as-you-go method of accounting. Under the pay-as-you-go accounting method, a corporation only recognizes those costs that it actually pays in cash. Not until 1993 have corporations been required to accrue for OPEB costs to be paid their employees in the future.

In December of 1990, the Financial Accounting Standards Board (FASB) issued accounting standard Statement 106 relating to accounting for OPEB costs—costs that primarily include retiree health care and retiree life insurance benefits. Very briefly, Statement 106 requires "calendar year" corporations reporting under Generally Accepted Accounting Principles (GAAP) to use an accrual method of accounting for OPEBs by 1993.

This change in accounting rules has a significant impact on any company with OPEB liabilities. First, the change means that corporations are required to show on their balance sheets the present value of the expected future cost of paying for retiree health care benefits promised to employees and retirees. The accounting standard requires companies to project this value taking into account anticipated medical inflation rates. With medical cost inflation racing ahead of general inflation, for many companies this liability is significant. The amount may equal a sizeable portion of their book net worth and total in the billions of dollars. For example, in 1991 IBM announced that its liability for these costs would be in excess of $2 billion. In the same year General Motors Corporation announced that its liability would exceed $16 billion.

The new accounting standard requires corporations to accrue this expense during the working life of the employee, rather than record it upon retirement or as an expense as it is paid. This has the effect of moving a future expense into the present. For most companies the impact of the new accounting standard is to create an annual book expense equal to three to six times the current pay-as-you-go costs.

Under Statement 106, a corporation may use assets contributed to a trust (or other vehicle that adequately "segregates and restricts" the use of the assets) as an offset to the accrued OPEB liability to be recorded on a company's balance sheet. Assets eligible to offset OPEB liabilities are labelled as "plan assets". Furthermore, the new accounting standard will permit recognition of the growth in "plan assets" as an offset to the accrual expense charge for OPEBs.

In prefunding for OPEBs, the U.S. tax rules are more restrictive than those that apply to qualified pension trusts. Of the alternative trust vehicles, to date corporations have primarily considered three choices: 401(h) accounts, collectively-bargained Voluntary Employees' Beneficiary Association (VEBA) trusts, and non-collectively-bargained VEBA trusts. A 401(h) account is an account held in a tax-qualified pension trust. The 401(h) account holds assets for retiree health and life benefits. Both types of VEBAs are organized as trusts qualifying under Internal Revenue Code Section 501(c)(9).

Unfortunately, most corporations can take only limited advantage of 401(h) accounts. Under current IRS regulations, 25% or less of each year's pension contribution may be earmarked for a 401(h) account. Corporations whose pensions are already adequately funded or are over-funded, usually make little or no yearly pension contributions. As a consequence, there is little opportunity for them to place funds in a 401(h) account. Because the strong stock-market of the 1980's caused many pension funds to become fully or even over-funded, this limitation is now widespread.

The current uncertainty surrounding health care financing reform in the U.S. has limited the appeal of both collectively bargained and non-union VEBAs. When a corporation receives a tax deduction for prefunding in a VEBA, any future reversion of the assets to the corporate grantor will result in a 100% penalty tax. Therefore, the return of funds to a corporate grantor makes no sense. Corporations that consider using VEBAs are concerned that if the U.S. government in some way assumes responsibility for health care, they would not be able to retrieve the investments they had made to pre-fund their OPEB liabilities.

One of the initial attractions of a VEBA is that contributions to the trust may be tax deductible. For non-union VEBAs, the tax law requires a computation of a Qualified Asset Account Limit (QAAL) and an actuarial certification of the QAAL computation. Unfortunately for some corporations, the expense and complexity of preparing QAAL computations proves to be reason enough not to implement a VEBA funding program.

In addition, the Internal Revenue Service (IRS) has recently created a task force that has been assigned to examine the computations of the QAAL for existing VEBAs. Because there are currently no regulatory guidelines on how to compute the QAAL, corporations that use a QAAL when funding a VEBA are automatically exposed to the risk of an IRS challenge. This potential for IRS controversy further limits the attractiveness of VEBAs.

In January 1993 the Emerging Issues Task Force of FASB issued a memorandum which designated assets in spendthrift trusts as qualifying for "plan asset" status under Statement 106. Heretofore, the staff of the FASB had consistently taken the position that a grantor trust was not eligible to hold "plan assets" for GAAP purposes.

A spendthrift trust is normally a grantor trust. Thus, the Emerging Issues Task Force decision has signalled the FASB's willingness to consider and accept new and innovative funding programs, so long as the funding plan adequately "segregates and restricts" the use of plan assets for the intended purpose.

Paradoxically, there are numerous potential legal "pitfalls" which arise with the use of a grantor trust. The Department of Labor (DOL) is believed likely to view any GAAP approved funding plan as a "Welfare Benefit Plan"

for purposes of the 1974 Employee Retirement Income Security Act (ERISA). In turn, the IRS is believed likely to rule that any trust designated by the DOL as a "Welfare Benefit Plan" is a "Welfare Benefit Fund" for tax purposes too. In turn, the IRS designation as a "Welfare Benefit Fund" will expose the trust to the 100% penalty tax on any reversion of plan assets to the corporate grantor.

Prior to the present invention, a solution has not been discovered which permits a corporation the same funding flexibility that is available under a spendthrift trust without incurring the disadvantage of exposure to tax penalties on reversion of assets to the corporation from the plan.

Of course, computer support for the yet undiscovered solution did not exist either. Instead, the focus has been on sources for the computation of Statement 106 expense and liability forecasts. Even as the accounting rules were being debated by the FASB from 1989 through 1990, major actuarial firms and outside actuarial software vendors created systems to project book accrual expenses and liabilities. With the issuance of Statement 106 in December 1990, all these organizations quickly amended their software to accommodate the new accounting rules.

Prior to the present invention, computer systems existed that compared the cash values of life insurance to a simple arithmetic present value of the OPEBs. Systems also existed that reflected the earnings effect of prefunding with Trust Owned Life Insurance (TOLI) under a pay-as-you-go accounting environment and under the accrual accounting required by Statement 106.

For reasons outlined above, it would be highly desirable to find a method of prefunding for OPEB liabilities that overcomes the various limitations and risks associated with 401(h) accounts, VEBA trusts, and spendthrift trusts. It would also be highly desirable to develop a computer system to perform the complex calculations that would allow a corporation to estimate the economic and financial accounting impact of prefunding with the new method.

However, prior to the present invention, no known system has been able to take into account a large number of input variables generally available from a large number of different providers, including projections of insurance values from insurance carriers, corporate retiree health care cost projections from corporations, corporate tax data, corporate investment assumption data, and other corporate data. Also, no known system has been able to compute the corporate earnings and balance sheet implications of prefunding assuming accrual accounting under Statement 106, as well as after-tax cash flows and rates of returns afforded by the investment in plan assets.

With FASB Statement 106 forcing the determination and disclosure of the amount of each corporation's OPEB obligations, responsible managements facing material liabilities have therefore looked unsuccessfully for effective ways to fund. Unfortunately no simple pension-like process for tax-advantaged funding has existed. As a result, virtually every corporation across the nation (other than corporations where benefit commitments and recovery of benefit costs may be subject to regulatory review) have instituted studies to find ways to significantly reduce costs of benefits or even to eliminate them, particularly retiree health care. The present invention makes available for the first time a simple, effective means for tax exempt funding qualified for offset of OPEB and other similar FASB mandated accruals. Since many employers may find use of this invention for funding a preferred alternative to reducing benefits, this invention is clearly in the national interest.

III. SUMMARY OF THE INVENTION

A. Objects

Therefore, it is an object of the invention to provide a method of prefunding for OPEBs which both meets the definition of "Plan Assets" under Statement 106 and retains the ability for those assets to revert without penalty to the corporation should the liability be eliminated.

Another objective of the invention, in meeting the definition of Plan Assets, is to allow the corporation to use the assets to offset the Statement 106 OPEB liability and to use plan income to offset the related Statement 106 accrual expense.

Still another objective of the invention is to remove the tax limitation on the amount contributed to the plan.

Still another objective of the invention, in meeting the definition of plan assets, is to utilize available accounting standards that allow a corporation to amortize over a period of years the acquisition costs of insurance, thereby improving corporate earnings in the early years of the plan.

Still another objective of the invention is to eliminate the theoretical tax charges, required by GAAP, against earnings on plan assets, as exists with plans in which fund contributions are tax-deductible.

Still another objective of the invention is to demonstrate the superior earnings effects of the funding in comparison to plans which utilize trusts that permit tax-deductible contributions.

Still another objective of the invention is to give insurance carriers a more secure economic incentive to underwrite life insurance policies for prefunding by making it unlikely that any corporation that prefunds for OPEBs using life insurance will opt for a premature surrender of the policies.

Still another object of the present invention is to automatically provide financial analytical data, incorporating the accounting implications of Statement 106, for evaluating use of life insurance as a Plan Asset in conjunction with an Indenture Agreement for prefunding OPEB liabilities.

Another object of the invention is to provide a system and method for determining the effect of varying the amount and timing of premium payments when prefunding the OPEB obligation of a corporation and when taking into account the benefits from a life insurance contract and the effects of accrual accounting under Statement 106.

Still another object of the invention is to provide a system and method for calculation of the earnings impact of prefunding for OPEBs using life insurance in connection with an Indenture Plan, taking into account the effects of accrual accounting under Statement 106.

Still another object of the invention is to provide a system and method for calculating an amount of cash value for the insurance contract such that the cash value offsets an accrued obligation for the employee benefit.

Still another object of the invention is to provide a system and method for calculating the financial impact of funding for OPEBs assuming corporate borrowing of the prefunding amounts, taking into account the effects of accrual accounting under Statement 106.

Still another object of the invention is to provide a system and method for calculating the gross and incremental cash flow consequences of prefunding for OPEBs, taking into account the performance from investments in life insurance and the effects of accrual accounting under Statement 106.

Still another object of the invention is to provide a system and method for making the aforementioned computations on an on-going annual basis in order to permit a corporation to adjust its contributions to Indenture Plan assets, life insurance funding, policy distributions, and disposition of assets held under a settlement option each year.

Still another object of the invention is to provide a system and a method of calculating the deferred income tax consequences of prefunding for OPEBs, taking into account the performance from the investments in life insurance and the effects of accrual accounting under Statement 106.

Yet another object of the invention is to provide a system and method for making the aforementioned computations iteratively, in order to conduct sensitivity analyses which will better permit the corporation to understand, and ultimately enter into, an OPEB funding transaction, taking into account the effects of Statement 106.

Generally, these and other objectives are addressed by a plan which utilizes a corporate owned life insurance policy with specially designed settlement clauses and a formal Indenture Agreement between the corporate buyer-policyowner and the insurance carrier.

The Indenture Plan is designed to meet the requirements for "Plan Assets" under FASB Statement No. 106, paragraph 63. While a trust is not used to implement this funding plan, an Indenture Agreement signed with the formality of a deed by all parties to the transaction guarantees that the assets of the program are more than adequately "segregated and restricted." This result is obtained under the provisions of the Indenture Agreement and plan policies which assure that all policy assets are dedicated to the payment of OPEB expenses and cannot be applied by the corporation or its creditors for other purposes. Accordingly, the assets covered by the Indenture Plan should be accounted for as "plan assets" under Statement 106.

A corporation that decides to use the Indenture Plan to prefund its OPEB obligations will select a group of employees that are eligible or are expected to become eligible for OPEB payments. These employee lives will be insured with the corporation named as the owner and the beneficiary of the policy(ies).

The insurance policies are specially designed cash value insurance contracts. The insurance contract form may be straight universal life or universal variable life.

At the time that the policies are applied for and delivered, the insurance carrier and the corporate buyer enter into a written Indenture Agreement that will govern the administration of the insurance contracts as well as all withdrawals, distributions and death benefit settlements thereunder.

The Indenture Agreement contains provisions which enable the policy cash value to qualify as fully "segregated and restricted" assets for book accounting purposes. First, the Indenture Agreement provides that the amount of death proceeds payable to the corporate policyowner shall be limited to the amount of OPEB pay-as-you-go expenditures during the reporting period. Periodically, the corporation's independent auditor must certify to the carrier the amount of the OPEB expenses paid. Accordingly, for all policies written and owned under the Indenture Agreement, it is clearly provided that the only death payments payable directly to the corporation are amounts which are not in excess of actual OPEB costs incurred and paid. Death benefits are therefore committed (i.e., restricted) to the payment (reimbursement) of OPEB expenditures.

Another embodiment of the present invention (which is less preferred because of complexities of documentation, implementation, administration and regulatory reporting) provides for the OPEB benefits plan, as a duly constituted welfare benefits plan, to serve as the principal contracting entity for entering into an indenture agreement with a carrier, the plan to act as policyowner and beneficiary of policies purchased pursuant to an indenture agreement. For example, a sponsoring corporation could transfer cash to such an OPEB benefits plan under terms and conditions requiring the plan to enter into a specified indenture agreement for purchase of multi-life insurance policies covering plan beneficiaries, such policies to contain a spendthrift settlement clause. Under the provisions of the agreement setting up such a plan, the plan would be required to remain as the policyowner and beneficiary of the policies subject to the terms, conditions, limitations and obligations of an indenture agreement similar to the indenture agreement described herein.

Where death benefits and any other withdrawals or distributions from the insurance policy(ies) in a given year exceed OPEB payments, the Indenture Agreement calls for such excess amounts to be retained by the carrier and paid out under a specially designed settlement option. This settlement option incorporates a standard insurance spendthrift settlement clause. As a result, regardless of the fortunes of the corporation, the company must meet its OPEB obligations in order to collect on death benefits and other distributions from the insurance policies. Said another way, payments from the policy can only be applied toward OPEB expenditures.

In subsequent periods in which OPEBs' pay-as-you-go costs exceed death benefits, settlement amounts on deposit with the carrier are released to the corporation. The remittance amounts are limited to unreimbursed OPEB pay-as-you-go expenditures.

One of the important provisions of the Indenture Agreement states that the policy cannot be surrendered (in whole or in part) as long as the corporation has an OPEB liability. Notwithstanding, the policyowner can exchange the policy so long as the new policy has the necessary spendthrift settlement option and the new carrier signs the Indenture Agreement. Policy dividends will be governed in the same manner as death benefits under the Indenture Agreement. Failure to make any premium payment will not result in the policy termination—rather it will trigger exercise of an automatic election of policy paid-up status. This provision is included to assure that the plan assets (policy cash value) are fully restricted to the application of OPEB benefit payments.

The Indenture Agreement must anticipate that the OPEB liability may one day disappear. Accordingly, the Indenture Agreement provides that the agreement itself shall terminate in the event that the liability is settled, the benefit is terminated by the corporation, or the government assumes the responsibility for paying the benefits.

If the Indenture Agreement ceases to exist, then the corporation's rights in administering its policy (and the disposition of any funds held by the insurance carrier) are no longer restricted. The corporation can then surrender the contract, take partial cash value surrenders, etc. In other words, from that point forward it can exercise its policy ownership rights just as would any other corporate policyowner. Most importantly, the termination of the Indenture Agreement should not result in a tax penalty charge.

One of the elections under the Indenture Agreement permits the policyowner to direct the carrier at any time to reinvest death proceeds in policies subject to the Indenture Agreement. This election gives the corporation the flexibility to increase its plan assets, rather than just meeting current pay-as-you-go expenses with cash flow from the policies. Also, funds that otherwise would have been held under a settlement option, can be returned to policy cash value and accumulate tax free.

In order for the carrier to comply with the Indenture Agreement, the carrier must know the specific amount of the pay-as-you-go OPEB expenditures of the corporation for a given reporting period. In order for the carrier to receive this information from a competent independent third party, the Indenture Agreement requires the corporation to have its independent auditors report as to these OPEB values on a regular periodic basis—at least annually.

Through the use of the spendthrift settlement clause and the Indenture Agreement, the insurance Indenture Plan meets Statement 106's requirement that "plan assets" be "segregated and restricted." As a result, the cash value and any funds held by the carrier under the settlement option must be included in the computation of accrued or prepaid postretirement benefit cost.

The policy cash surrender value constitutes the fair market value of the plan assets in this computation. Initially, any funds retained by the carrier under the spendthrift settlement option are accounted for as "plan assets." The face value of the receivable under the settlement option is the amount recorded as a plan asset by the corporation.

Interest income earned on funds held by the carrier under the settlement option will be included in the net periodic expense computation. Because these assets are the property of the corporation, and the income on these deposits is taxable, the net periodic income must include an accrual for the corporate tax on the interest income.

Death proceeds paid and policy cash value increases are also income that is included in the net periodic expense computation. Death proceeds and cash value growth are exempt from taxation—no tax provision is required for these two items of income in the net periodic expense computation.

The temporary difference for income tax accounting purposes under the Indenture Plan is measured by comparing the pay-as-you-go costs to the Statement 106 accrued OPEB cost for service, interest, and amortization of the transition obligation. Included in the accrued OPEB cost amount will be any gain or loss on actuarial estimates. The earnings on plan assets is not included in the accrued OPEB cost for purposes of computing the tax accounting temporary difference.

While this invention was created to meet the needs to fund for OPEBs under Statement 106, the invention is also applicable to funding for other accrued employee benefit obligations. For example, this invention can be utilized for prefunding for benefits specified by Statements 87 and 112.

More particularly, the aforementioned and other objects of the invention are addressed by a digital computer controlled by a computer program programmed to provide financial analytical data, incorporating the requirements of a Financial Accounting Standards Board standard, such as Statement 87, 106, 112, or the like, for use in evaluating the use of life insurance as an investment in connection with an Indenture Plan for prefunding benefit liabilities. The computer system of the present invention includes a digital computer connected to receive information representing a description of a benefits funding plan and a description of life insurance contracts from a data input means. The digital computer also outputs computed data to a data presentation means and saves the output data to a means for electronically storing output data. The system also has a means for automatically controlling the computer to compute the data from the information. The data represents a financial projection of a prefunding program for benefits under a Financial Accounting Standards Board standard, such as Statement 87, 106, 112, or the like. Note that the FASB issues modifications and additional standards from time to time, and it is contemplated that the present invention would be suitable for supporting computations for such modifications and additional standards of the like.

The computer system uses information obtained from a variety of sources, such as Statement 106 expense and liability projections, insurance product performance projections and corporate specific data such as tax rates and number of shares outstanding. The system assumes that a corporation will contribute to an Indenture Plan which is funded with life insurance assets and which uses Statement 106 (or other benefit) accrual accounting, and it uses the data to project the corporate balance sheet, earnings, and cash-flow effects.

Computer system output, shown by means of a monitor or printer, permits a determination of whether or not a funding proposal will be contributing to earnings per share, and if so, how much by year. Furthermore, the extent to which it is possible to reduce or offset the Statement 106 book liability on a year-by-year basis can also be projected. In addition, analytical schedules produced by the computer system show the effect of a resulting cost of borrowing or a cost of capital. Also, an analysis is prepared of the gross and incremental after-tax cash flow consequences of prefunding, the internal rates of return on funded assets. With this information, it is possible to make an informed capital allocation decision to prefund (or not to prefund) for OPEBs (or other benefits) using an Indenture Plan in conjunction with life insurance.

From the point of view of an Indenture Plan marketing organization, the invention is a practical necessity. Without the information generated by the system, a corporate decision maker cannot determine the effect on his or her company of an Indenture Plan prefunding program. Without a detailed projection and understanding of the consequences of funding, it is not likely that a prospective corporate buyer will decide to prefund.

The invention also permits sensitivity analyses of various alternative assumptions to be illustrated. Corporations, as part of their due diligence process in evaluating an Indenture Plan, may wish to change various assumptions and then study the results of those changes. Given the large number of variables and interdependencies, it is not possible to predict the result. For this reason empirical testing is required. Examples of sensitivity analyses made possible by this invention include preparing forecasts assuming different earnings rates in an insurance contract, assuming different rates of inflation for retiree health care benefits, assuming different tax rates, etc.

One of the important functions of the invention is to enable the user to evaluate an amount of premium dollars that should be paid in accordance with the insurance product performance data in order to meet funding objectives. The present invention makes possible and facilitates this task.

After an Indenture Plan is installed, the present invention also has an important role to play. Before making each year's contribution to the plan, the corporate Indenture Plan sponsor will want to prepare new financial forecasts to adjust the appropriate funding levels to reflect actual circumstances and new funding assumptions. The corporation will be able to determine the level of funding depending on the expected future financial consequences projected by the invention.

While the invention has been shown in the particular context of funding Other Postretirement Employee Benefits (OPEBs), it should be understood that its systems and procedures may be applied to any unfunded corporate benefit obligation. Specifically, the representation of an Indenture Agreement can be used with such benefit obligations as unfunded pension benefits, life insurance benefits, health care benefits, or any other benefit which may have gone unfunded, through time, at a given corporation.

For example, taking the case of unfunded pension obligations, many corporations have employees whose pension benefits are not fully funded by the corporation, because the corporation may not fund the full amount of the pension contributions on a tax-deductible basis (due to statutory contribution limits for, for example, some highly paid employees). While the company may have a legal and moral obligation to pay the benefit, heretofore it has had little incentive to fund that part of its obligation which is not tax deductible. The situation is complicated by the fact that by funding the obligation the corporation may create a tax liability for the recipient, in the case of a so-called Secular Trust, or leave employees exposed in the event of corporate bankruptcy, in the case of a so-called Rabbi Trust. Indeed, in the case of a Rabbi Trust or no funding at all, employees could find themselves competing with other creditors for what is rightfully their pension. Funding through a plan with a life insurance policy(ies) with a spendthrift settlement clause and an Indenture Agreement will serve to provide security that an employee receives his or her benefit, without experiencing the weaknesses of either the aforementioned Secular or Rabbi Trust. Computing the effects of funding such an obligation is within the scope of this invention, requiring only minor adjustments to the system.

IV. BRIEF DESCRIPTION OF THE DRAWINGS, SPECIMENS, AND CODE

The aforementioned and other objects and features of this invention and the manner of attaining them will become apparent and the invention itself will be best understood with reference to the following description of the invention in conjunction with accompanying drawings and specimen output, and the code.

A. Figures

FIGS. 3.0–3.8 are flow charts showing the principal computations of the system.

B. Specimens (See Appendix A)

Specimen 1, the first page of the system output, shows the assumptions used by the system in the computation of the output;

Specimen 2 is an example of system output including after-tax retiree medical pay-as-you-go cost, and the effect of this cost under a pay-as-you-go accounting system, on corporate earnings per share over thirty years;

specimen 3 is an example of the system's output of the after-tax corporate earnings-per-share impact of Statement 106, assuming accrual accounting and no prefunding of the obligation;

Specimen 4 is an example of the system's output regarding projected Indenture Plan funding cash flow;

Specimen 5 is an example of the system's output, which provides an analysis of yearly cash accumulation within and corporate earnings from the Indenture Plan insurance contract;

Specimen 6 is an example of the system's output showing accumulated Plan assets as an offset to the Statement 106 liability;

Specimen 7 is an example of the system's output showing the annual income statement effect to a corporation which has prefunded its Statement 106 liability using Indenture Plan life insurance;

Specimen 8 is an example of the system's output showing the annual savings in earnings-per-share terms on an accrual basis under Statement 106 (the calculation of savings being based on a comparison of funding versus not funding for the OPEB obligation);

Specimen 9 is an example of the system's output, which compares debits to deferred income taxes with and without Indenture Plan funding;

Specimen 10 is an example of the system's output showing the annual rate of return on the cash flow invested in the Indenture Plan;

Specimen 11 is an example of the system's output of the after-tax earnings-per-share impact on the corporation assuming the corporation borrowed the funds needed to prefund the OPEB obligation;

Specimen 12 is an example of the system output showing asset growth in a trust assuming the assets were not invested in life insurance, but were invested in taxable instruments instead;

Specimen 13 is an example of the system output comparing the accumulated assets in a trust investing in taxable instruments and an Indenture Plan which has invested in life insurance;

Specimen 14 is an example of the system's output reflecting the annual present value of the increase in corporate net worth assuming the corporation borrows the money needed to prefund the OPEBs obligation;

Specimen 15 is an example of the system's output reflecting the annual after-tax cash flow to the corporation assuming it borrows the funds necessary to prefund the OPEBs obligation.

C. Code (See Appendix B)

Illustrative code, written in Lotus 123 version 3.1 is provided as in Appendix B hereto.

V. DETAILED DESCRIPTION OF A PREFERRED EMBODIMENT OF THE INVENTION

Figure 1:
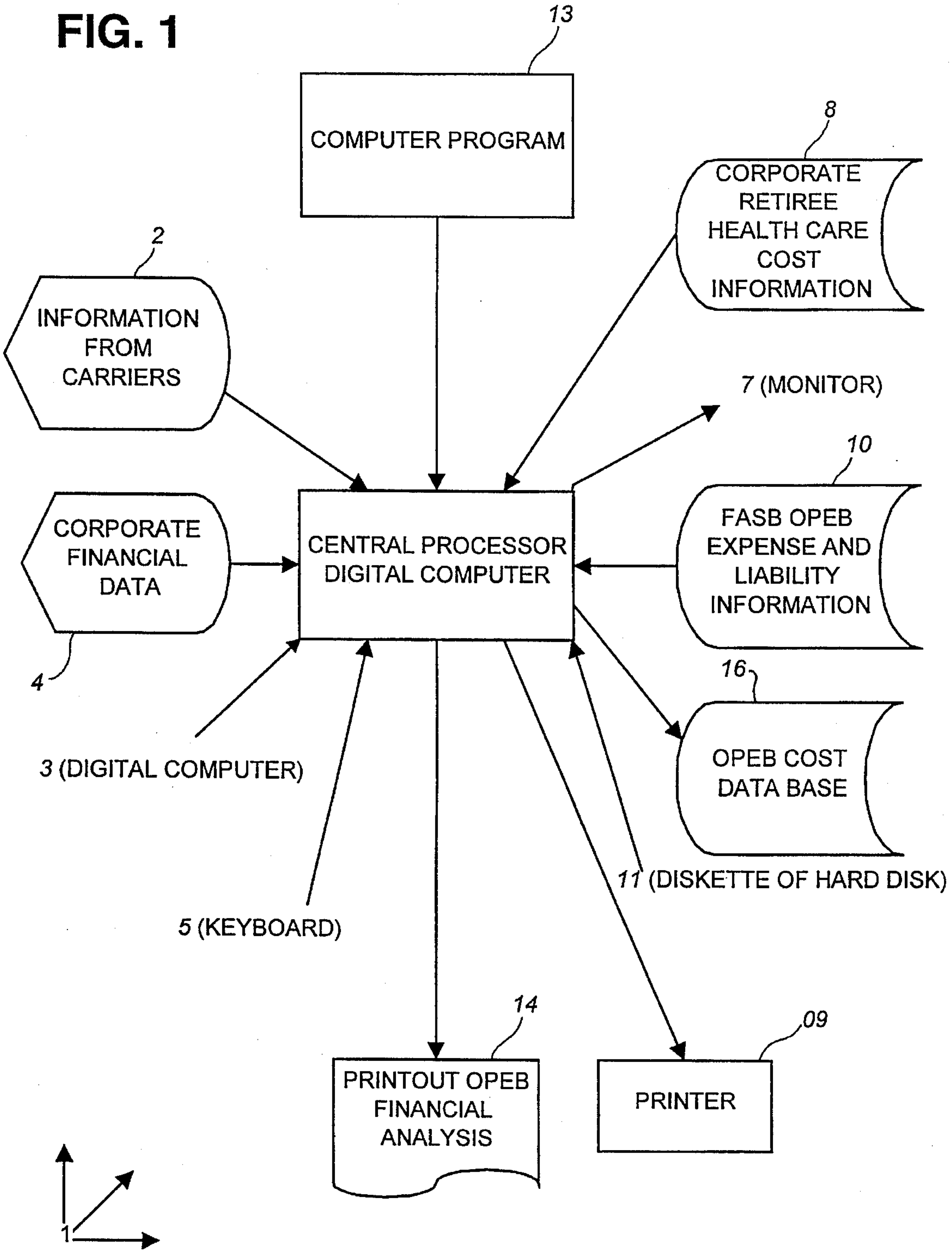
FIG. 1 is a flow chart representing the overall functioning of the invention.

Referring now to FIG. 1, the overall functioning of an Indenture Plan (IP) Computer System 1 of the present invention is shown with odd numbers designating hardware and software, and even numbers designating program logic and data. The System 1 includes a Digital Computer 3, such as an IBM-compatible personal computer with a processor and a DOS operating system. Digital Computer 3 has a Keyboard 5, Monitor 7, Printer 9 (such as a dot-matrix or laser printer), and Means For Storing Electronic Output 11, such as a disk storage means. Of course other means for receiving input data such as a modem, laser disk or magnetic tape may be substituted for Keyboard 5. In addition, other means for outputting processed data such as a plotter or even a monitor may be substituted for Printer 9. Computer 3 is controlled by a Computer Program 13, a LOTUS 123 (Version 3.1) computer program. A copy of Computer Program 13 is provided in Appendix B hereto. It is to be explicitly understood that other implementations of the present invention, say, those using a different kind of digital computer or a computer program written in a different language, are entirely acceptable and wholly equivalent.

The Computer System 1 can use the four distinct sets of input data, as shown on FIG. 1. Computer System 1 input includes Information from Carriers 2. These data can be received from insurance carriers in response to a request for an illustration of insurance to be provided by the carrier. This data includes premium amounts, death benefits distributed (or reinvested in the policy), and annual cash surrender values of the life insurance contract(s). The data can be input via the Keyboard 5 from hard copy, read from a disk, or similarly obtained from the carriers.

The next input item is Corporate Financial Data 4, which includes the corporate tax rate, the trust tax rate, the earnings rate for a taxable trust, the variable contract earnings rate, the pre-tax corporate discount rates to be used in calculating corporate present values on cash flow with or without borrowing assumptions, the average estimated return on plan assets, and the number of corporate shares outstanding. If the corporation at issue is under an alternative minimum tax (AMT) structure, then the data will also include the AMT tax rate, the number of years under AMT, and the number of years to claim credit for past alternative minimum taxes. (The Internal Revenue Code presently imposes an additional tax on corporations in certain complex situations under the AMT codes. This additional tax then can be used as a credit against future income taxes once the corporation falls outside the AMT computation.)

The next input item is Corporate Retiree Health Care Cost Information 8. These data comprise medical pay-as-you-go cost, medical cost inflation assumptions, mortality assumptions, retirement rates, census type, number of retired and active employees, and pre and post age 65 health care costs. These amounts can be typically provided by the corporation or are submitted on behalf of the corporation by consulting actuaries or accountants.

Further input data include FASB OPEB Expense and Liability Information 10, which comprises annual book expense and the annual book accrued liability amounts. These amounts are obtained from software available from numerous providers including Lynchval, ACTI, and many major actuarial consulting firms. Also, the Statement 106 discount rate is recorded into the computer system as part of Block 10.

These four sets of data are accessible to Computer 3, which processes the data by means of Computer Program 13 according to the present invention to generate hard copy and electronic copy. The hard copy includes such output as is shown in Specimens 1–15 (as denoted on FIG. 1 by Printout OPEB Financial Analysis 14). The electronic copy includes an electronic file, stored in a memory of Computer 3 or such storage means as a disk in disk drive 11, of the input and output data (as denoted on FIG. 1 by OPEB Cost Data Base 16). Once these outputs are produced, either or both can be reviewed by a computer system user. If the results of the analysis are not satisfactory, the input items can be reviewed and altered, and a modified illustration request can be sent to the insurance carrier to obtain changed input for Block 2, and a new set of computations by the system. (Unsatisfactory results might include inadequate returns on the corporate investment or inadequate accumulation of funds in the life insurance policies illustrated, projected death benefits in excess of OPEB pay-as-you-go costs, etc.)

Figure 2:
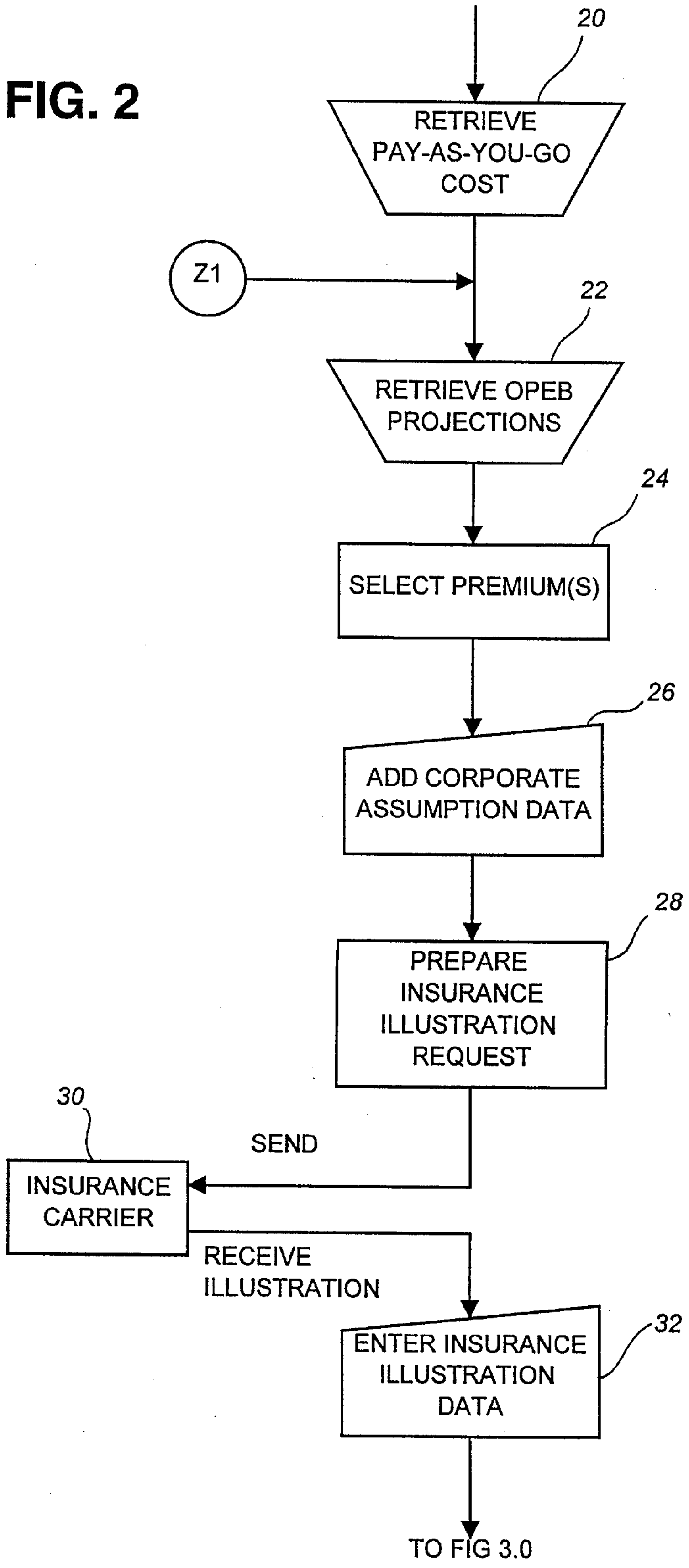
FIG. 2 is a flow chart showing the data input function of the invention.

FIGS. 2–3.8 highlight aspects of the logic for Computer Program 13, the details of which can be obtained from the copy of an illustrative computer program provided as an appendix hereto.

FIG. 2 illustrates the logic for a data input function of Computer Program 13. In Block 20, the annual pay-as-you-go costs are retrieved from data files that are provided by the corporation or by an actuarial consulting firm or accounting firm, or from data files that are computed by publicly available software.

OPEB projection data are retrieved in Block 22. These are the projected amounts of the corporate OPEB expense and liability, under Statement 106. The liability data, available from the aforementioned software systems or outside providers, are used to compute targets for cash values to be provided by a life insurance carrier.

Insurance premium(s) are selected in Block 24. The projected insurance premium may reflect the desire to provide some predetermined initial level of asset funding to offset the OPEB liability or the desire to create annual projected death benefits approximately equal to the projected annual pay-as-you-go costs.

Corporate assumption data are obtained in Block 26. The corporate assumption data include number of shares outstanding, marginal tax rate, discount rates, estimated long term cost of borrowing, assumed yield on listed assets, alternative minimum tax, years of tax exposure, etc.

Using this information, an illustration request can be sent to an insurance carrier preferably via modem, facsimile, or by letter in Blocks 28 and 30. The illustration request seeks information based on the following:

1) Projected annual premiums. The system user may instruct the carrier to prepare an illustration in which the premiums match an investment whose timing and magnitude are predetermined by the corporation.
2) Targeted cash value. The system user may instruct the carrier to prepare an illustration in which the cash value of the insurance policy equals the book accrued liability. Because Statement 106 accounting provides that qualified trust assets are a direct offset to the OPEB liability, generating life insurance cash values equal to the OPEB book liability will permit the corporation to remove the OPEB liability from its balance sheet.
3) Targeted cash flows. The system user may instruct the carriers to prepare illustrations in which the annual cash flows from life insurance death benefits and policy surrenders are sufficient to offset the retiree health care pay-as-you-go cash flow. These instructions will indicate a time at which policy cash flows should match pay-as-you-go cash outflows.
4) Earnings rate. This amount is used to determine the cash value earnings rate in the insurance contract and is typically equal to the corporation's long term rate of return on pension investments.
5) Corporate tax rate. This amount, equal to the corporation's combined, federal, state, and local tax rate, is used to determine the after-tax effects of OPEB expenses and prefunding measures.

6) Mortality assumptions. Typically provided by the corporation based on the corporation's experience with its pool of corporate employees and pension holders, these data are used to determine frequency of deaths in the insured population.

7) Census data. This information provides the carrier with demographic information as to the age and sex of the corporation's employee population which will be insured. Where underwriting is required, other demographic data may be supplied (e.g., number of smokers).

8) Reinvestment of death benefits assumption. When a large group of employees is insured, it is actuarially possible to predict with relative accuracy the number of deaths in each year. These deaths provide the plan with death benefits from the insurance contracts. By reinvesting these death benefits in the remaining life insurance covering the surviving employees, the cash value in the insurance policy or policies can grow more rapidly than if death benefits were applied to current pay-as-you-go OPEB costs.

Once an insurance carrier receives this information in the illustration request, the carrier can prepare a life insurance illustration which shows, among other things annual premium(s), an annual stream of death benefits and cash surrender values of the policy(ies). Depending on the corporate sponsor's preference and the life insurance carrier chosen, the policy(ies) may be either an individual or group life insurance contract and it may be a variable or whole life insurance contract.

The life insurance carrier illustration is then received either by modem, facsimile, or letter. Data from the illustration are either loaded or manually input into the system at Block 32 for subsequent processing.

When all the data have been entered, the System 1 automatically performs a series of calculations. These calculations convert all of the aforementioned disparate elements of input data into a comprehensible financial output of a summary nature, which can be easily understood by corporate executives and others familiar with the concepts of corporate finance. Illustrative samples of the system output are shown in Specimens 1–15, beginning with Specimen 1 (see Appendix A).

Specimen 1 shows key assumptions used by the System 1 in making the calculations for the output. The assumptions start with the census data. This information shows the reader of the output the number of active employees, retirees, percentage of retirees with dependent coverage and the census type used in calculating the output. The census type may be either an open group or a closed group. An open group assumes new lives enter into the population on an annual basis, whereas a closed group assumes no new entrants.

The next series of assumptions includes actuarial assumptions used in developing the inputs. The actuarial assumptions include termination rates, disability rates, retirement rates, and mortality rates. Termination rates are the rates at which members of the employee population leave the employ of a company prior to retirement, due to turnover, termination, or other reasons not relating to disability or retirement. Disability rates are the rates at which various segments of the employee population become disabled and are no longer able to work. Retirement rates are the rates at which various segments of the population retire, by age group. Mortality rates are the number of deaths per 1,000 lives, by age group for the population.

These rates are followed by the medical cost inflation rates assumed by the corporation, its actuary or accountant in making the OPEB cost projections. The medical cost trend is the rate at which retiree medical costs are expected to grow, by year. This is usually based on an analysis of health care cost growth rates at the corporation.

Next, the medical cost discount rate and the pre-tax corporate borrowing rate are displayed. The medical cost discount rate is the discount rate used in calculating the OPEBs liability. The pre-tax corporate borrowing rate is the rate at which the corporation may borrow from banks or the capital markets.

Next are the trust tax rate, corporate tax rate, the earnings rate in the insurance contract and the earnings rate to be used in calculating the trust assets.

Thereafter, assumptions regarding the reinvestment of death benefits are shown, followed by the average pre-65 and post-65 health care costs for the corporate employee population.

The final assumption shown is the assumed amortization period of the OPEBs transition obligation. Under Statement 106, a corporation may elect to recognize the OPEBs costs immediately, in which case the transition obligation is written off immediately. A corporation may also elect to delay recognition of the OPEB past service obligation at the adoption date. If a company elects to delay recognition, the transition obligation may be amortized on a straight-line basis over the average remaining service period (the remaining working life) of the active participants. However, if the average remaining service period is less than 20 years, under Statement 106 the employer may elect to use a 20 year amortization period. If most plan participants are already in retirement, then the employer assumes an amortization period equal to the average remaining life expectancy of the participants.

As an example, the XYZ Corporation is assumed to have 3,755 retired employees and 8,041 active employees. The illustration initial year annual health care costs are approximately $3,500 prior to eligibility for Medicare, and $500 after Medicare eligibility at age 65. Medical inflation is assumed to be 12 percent in the first year, declining one half percentage point per annum until year nine, after which it drops off one point each year, leveling off at six percent in year eleven, and remaining at six percent thereafter.

The discount rate chosen by XYZ Corporation in calculating the OPEB liability and expense for accounting purposes is 8.5 percent.

Specimen 1 also shows assumptions reflecting XYZ's expectations for long term earnings on future investments in the Indenture Plan. XYZ anticipates long term earnings of 10 percent after fund management fees. It is assumed that the company has fully recognized the transition obligation.

To provide a better understanding, a list of data input variables for formulas used by Computer Program 13 is set out below. As discussed throughout the text, computed input variables will be distinguished from data input variables by denoting the latter with an asterisk(*). A plus (+) or minus (–) next to a data input variable denotes whether the input item is entered as a positive or negative number:

*$P_t$=Pay-as-you-go cost, year (t) (–)

*$APBO_t$=Accumulated Postretirement Benefit Obligation under Statement 106, year (t) (+)

*$FE_t$=Statement 106 book expense, year (t) (–)

*$BL_t$=Statement 106 accrued book liability, year (t) (+)

*$PR_t$=Premium, year (t) (–)

*$DB_t$=Death benefit, year (t) (+)

$*CV_t$=Year-end cash value of insurance contract(s), year (t) (+)

$*SV_t$=After-tax year-end surrender value of insurance contract (s), year (t) (+)

*CT=Corporate tax rate (+)

*VT=Trust tax rate (+)

*ER=Taxable earnings rate (+)

*LR=Loan interest rate (+)

*DR=Discount rate (+)

*ROP=Return on Plan Assets (+)

*CDR=Cash flow discount rate (+)

*SO=Shares outstanding (+)

*AMT=Alternative minimum tax rate (+)

*AMTY=Number of years AMT in effect (+)

*AMTA=Number of years to amortize AMT paid (+)

*N=Year in which AMT tax begins (+)

The computations made by the System 1, and the formulas and variables used in making them, are shown beginning with FIG. 3.0, block 34 with Compute After-Tax PAYG Cost. The formula for the after-tax pay-as-you-go computation is set out below.

$ATP_t$=After-tax pay-as-you-go cost, year (t)

$$ATP_t = *P_t \times (1 - *CT)$$

In Compute After-Tax PAYG Cost Per Share 36, the System 1 converts the after-tax pay-as-you-go cost from absolute dollars into dollars per share as follows:

$ATPS_t$=After-tax pay-as-you-go cost per share, year (t)

$$ATPS_t = ATP_t / *SO$$

The output from this computation is summarized for XYZ corporation in Specimen 2 (see Appendix A).

Specimen 2 shows the projected annual pay-as-you-go costs expressed in absolute dollars and in dollars per share. The projections shown are based on an open group of employees, again, meaning that the analysis assumes that there are new additions to the employee population. However, static projections, showing a closed group to which no annual additions in the employee population are made, may also be computed by the invention. The original after-tax pay-as-you-go cost climbs from almost $3.0 million in the first year to over $15.3 million in year 30.

Moving now to Compute After-Tax FASB Statement 106Expense 38, the System 1 computes the after-tax FASB Statement 106 expense, assuming no funding, as follows:

$ATFE_t$=After-tax FASB Statement 106 expense, year (t)

$$ATFE_t = *FE_t \times (1 - *CT)$$

At Compute After-Tax FASB Statement 106 Expense per Share 40, the System 1 next converts the after-tax FASB Statement 106 expense into dollars per share:

$ATFES_t$=After-tax FASB Statement 106 expense per share, year (t)

$$ATFES_t = ATFE_t / *SO$$

The output for these computations appears in Specimen 3 (see Appendix A).

Specimen 3 shows the same stream of benefits as shown in Specimen 2, this time accounted for on an accrual basis in accordance with Statement 106. Year 1 retiree health care after-tax expense changes from almost $3.0 million (pay-as-you-go) in Specimen 2 to more than $7.0 million (accrual) in Specimen 3, because of the Statement 106 acceleration of the recognition of retiree health care costs on an accrual basis. Retiree health care after-tax expense under Statement 106 in Specimen 3 climb to over $35.4 million by year 30.

The output of System 1 in Specimens 2 and 3 permits the corporate client to see that in terms of earnings per share, the impact of Statement 106 is a dramatic increase in the book expense. In the first year, the OPEB expense in earnings per share jumps from three cents a share in Specimen 2 to seven cents per share in Specimen 3. In the example set forth in the Specimen output, the cost under accrued accounting is higher in every year and is more than double the pay-as-you-go cost in most years.

Moving now to Compute Pre-Tax Corporate Cash Outlay 42, the System 1 computes the corporate before-tax cash outlay assuming an investment in an insurance product owned by the Indenture Plan with the following formulas:

$CO_t$=Corporate cash outlay, year (t)

$$CO_t = \text{lesser of 0 or } (*PR_t + P_t + *DB_t)$$

In Branch 44, AMT Tax Payer?, the user will test whether an alternative minimum tax (AMT) is applicable. This information is normally provided by the corporation for which the financial analysis is being conducted. If the answer is yes, in Compute AMT Tax Effect 46 the user goes to a separate spread sheet and computes the AMT tax effect resulting from funding an Indenture Plan using insurance:

$AMTE_t$ = AMT tax effect, year(t)

$$AMTE_t = \begin{cases} (*CT - *AMT) \times *P_t, \text{ if } *AMTY \geqq t - *N + 1 \\ 0, \text{ otherwise} \end{cases}$$

Then at Compute AMT Amortization Schedule 48, the user computes the AMT amortization schedule:

$AMTAS_t$ = AMT amortization schedule, year(t)

$$AMTAS_t = \begin{cases} \sum_{r=1}^{t} \frac{-AMTE_r}{*AMTA}, & \text{if } (*N + *AMTY) < t \leqq (*N + *AMTY + *AMTA) \\ 0, \text{ otherwise} \end{cases}$$

Finally, in Compute Annual Tax Savings 50, the System 1 computes the annual tax savings resulting from funding the Indenture Plan. Under the Indenture Plan the tax deductible expense is the pay-as-you-go cost, so the tax savings are:

$TS_t$=Tax savings, year(t)

$$TS_t = -*P_t \times *CT$$

Moving now to FIG. 3.1, the logic of System 1 moves to Compute After-Tax Cash Flow with Insurance 52, where the System 1 computes the after-tax cash flow with the investment in insurance:

$CFI_t$=After-tax cash flow with insurance, year(t)

$$CFI_t = CO_t + TS_t + AMTE_t + AMTAS_t$$

(Note: If there is no AMT then $AMTE_t$ and $AMTAS_t$=0 for all years.)

The output from the computations in Blocks 42–52 is summarized in Specimen 4 (see Appendix A).

In this example for XYZ Corporation, there is no AMT. Specimen 4 shows the amount the corporation contributes to the Indenture Plan in each year, and the allocation of funds in the Plan. Of the total amount that the corporation contributes, $73.9 million, the Specimen 4 shows that System 1 has computed that $4.3 million (net of death benefits of $600,000) must be applied to current retiree costs. The additional $69.6 million is dedicated to funding for future OPEB costs and is used to purchase life insurance contracts. The total after-tax cost for retiree health care calculated by the System 1 for Year 1 is $72.1 million.

In Compute Accumulation of Cash Reserves 54, the System 1 computes the accumulation of cash reserves within the Plan. This amount is equal to the amount of money which has not been invested in life insurance:

$ACR_t$=Accumulation of Cash Reserves, year (t)

$$ACR_t = ACR_{t-1} \times (1 + {*}ER \times (1 - {*}CT)) + \max(0, P_t + DB_t) \times (1 + {*}ER \times (1 - {*}CT))^{0.5}$$

In Block 56, Compute Year-End Cash Value of Plan Assets, the System 1 computes the year end cash value of the life insurance policy (or policies) owned by the Indenture Plan:

$YVP_t$=Year end cash value of Plan Assets, year(t)

$$YVP_t = {*}CV_t + ACR_t$$

Next, in Compute Yearly Cash Build-Up on Investment 58, the System 1 computes the yearly cash buildup on investments made by the Plan:

$YBI_t$=Yearly buildup on investment, year (t)

$$YBI_t = YVP_t - YVP_{t-1} + {*}PR_t$$

(Note: $YVT_0$=0.)

In Compute Death Benefits Distributed 60, the System 1 computes the death benefits distributed from the life insurance policy(ies) to the Indenture Plan:

$DBD_t$=Death Benefits Distributed, year (t)

$DBD_t$=lesser of $-{*}P_t$ or ${*}DB_t$

In Compute Indenture Plan Income Realized 62, the System 1 Computes the book income earned by the Plan:

$PBI_t$=Plan Book Income, year (t)

$$PBI_t = YBI_t + DBD_t$$

Continuing with FIG. 3.2, in the following five blocks, Compute Market Related Value of Plan Assets 64 through Compute Amortization of Difference in Income 72, the System 1 computes the assets and income that the Corporation may recognize from its investment in the Indenture Plan. Because Statement 106 allows the Corporation to use estimated average rates of return on the income it declares, the earnings computed in Block 68 and the assets calculated in Block 66 may differ from those declared in Block 62.

It should be noted that Statement 106 requires the application of a corridor test to amortize the difference between estimated return on assets and actual returns realized. To the extent the difference exceeds the greater of 10% of the market related value of plan assets or the Accumulated Postretirement Benefit Obligation, the excess is amortized. This version of the invention does not include the corridor test or its effect on net periodic costs or plan assets inasmuch as any differences would be minor and not important for planning and forecasting purposes. Versions of the invention to be used for administration of an existing plan will include a routine to compute the corridor test and adjust values accordingly.

In Block 64 the System 1 computes the market related value of the Plan assets:

$MVA_t$=Market Related Value of Assets, end of year (t)

$AMD_t$=Amortization of Difference in Income, year (t)

$$MVA_t = (MVA_{t-1} - {*}PR_t) \times (1 + {*}ROP) - DBD_t - \sum_{j=0}^{4} AMD_{t-j}$$

(Note: $MVA_0$=0; $AMD_t$=0 for t<1).

In Block 66 the System 1 calculates the corporate earnings reported for the Plan assets:

$CEP_t$=Corporate Earnings From Plan, year(t)

$$CEP_t = (MVA_{t-1} - {*}PR_t) \times {*}ROP$$

In Block 68 the System 1 computes the annual difference between the Corporate Earnings From Plan 66 and the actual Indenture Plan Income Realized 62:

$ADI_t$=Annual Difference in Income, year (t)

$$ADI_t = CEP_t - PBI_t$$

Finally, in Block 72 The System 1 computes the yearly amortization of the difference between the Corporate Earnings From Plan 66 and the actual Indenture Plan Income Realized 62. A five year amortization is used by the system in a preferred embodiment because it is the longest period allowed for straight-line amortization under Statement 106. (However, shorter amortization periods and different amortization methods may also be used if desired):

$$AMD_t = ADI_t/5$$

The output from the computations in Blocks 54–72 show in Specimen 5 (see Appendix A) that prefunding using the Indenture Plan results in an immediate recognition of income by the corporate sponsor.

Also, despite year-to-year swings in actual income of invested assets, variations in commissions and mortality charges, the corporate earnings from Indenture Plan Income are smoothed through the use of an estimated average rate. (Corporate financial officers like to provide investors with stable earnings. According to modern financial theory, the more stable the earnings record of a company, all other things being equal, the lower its cost of capital.) This stabilized Corporate income will be used to offset increased book costs from Statement 106 expense accruals.

In Compute Net Book Liability 74, the System 1 computes the net book liability of the corporation assuming it used an Indenture Plan to prefund its retiree health care benefit costs:

$NBL_t$=Annual net book liability, year (t)

$$NBL_t = {}^*BL_t - MVA_t$$

The output from the computations in Block 74 are used in constructing Specimen 6 (see Appendix A).

Specimen 6 shows the accumulation of Indenture Plan assets over time and compares them to the accrued book liability for OPEBs in each year. This example assumes an open employee group and earnings in the life insurance contracts of ten percent after fund management fees. Under these assumptions, the plan achieves fully funded status by year seventeen. The plan remains overfunded in years seventeen through the twenty-sixth year and thereafter is slightly underfunded. This comparison is an important piece of information for anyone evaluating prefunding because it shows how rapidly and by what amount a corporation may offset the Statement 106 OPEB liability in its balance sheet. This example shows that the funding amount selected is approximately correct. (Corporations seek to eliminate this obligation from their balance sheet, and thereby reduce their debt to equity ratio; also, many corporations have loan covenants limiting the amount they can borrow as a percentage of shareholder's equity.) In the absence of this comparison, it would be all but impossible for a corporate decision-maker to determine the extent and timing of this liability offset.

Continuing with FIG. 3.3, in Compute Income Before Taxes 76, the System 1 computes the book income before taxes resulting from the Plan investment:

$IBT_t$=Income before taxes, year (t)

$$IBT_t = CEP_t + {}^*FE_t$$

At Compute Annual Tax Benefit 78, the System 1 computes the annual book tax benefit resulting from tax-deductible corporate contributions to the Indenture Plan:

$TB_t$=Tax benefit, year (t)

$$TB_t = -IBT_t \times {}^*CT$$

In Compute Profit and Loss Effect 80, the System 1 computes the profit and loss effect of the prefunding transaction as it might contribute to profit and loss on the corporation's annual Income Statement:

$PL_t$=Profit and loss effect, year (t)

$$PL_t = IBT_t + TB_t$$

Then, at Block 82, Compute Earnings Per Share, the System 1 converts the book income calculated above into earnings per share:

$EPS_t$=Earnings per share, year (t)

$$EPS_t = PL_t / {}^*SO$$

Specimen 7 (see Appendix A) shows the values computed in Blocks 76–82. This analysis, in particular, permits the user to show a corporate customer why prefunding is so attractive from an earnings stand-point. As the output in Specimen 7 shows, under Statement 106 accounting rules, both death proceeds and increases in cash value are recognized as current income without a tax burden. This income is included as an offset to the annual retiree medical expense accrual.

At Compute Savings 84, the System 1 computes the total savings that results from prefunding using life insurance in an Indenture Plan:

$S_t$=Savings from prefunding, year (t)

$$S_t = PL_t - ATFE_t$$

At Compute Savings Per Share 86, the System 1 computes the savings per share from using insurance in funding an Indenture Plan:

$SPS_t$=Savings per share from prefunding, year (t)

$$SPS_t = S_t / {}^*SO$$

The information computed in Blocks 84 and 86 allows a corporate decision-maker to quantify in earnings-per-share terms the benefits of prefunding with an Indenture Plan. An example of the output is shown as Specimen 8 (see Appendix A). Specimen 8 shows that a substantial benefit inures from prefunding with an Indenture Plan. This benefit increases annually from six cents per share in the first year to $0.43 per share in the thirtieth year.

FIG. 3.4 begins with Compute Deferred Debit No Funding 88, in which the System 1 computes the debit to deferred income taxes that is generated when the OPEB liability is accrued without the benefit of a current tax deduction for the book expense in excess of pay-as-you-go expenditures:

$DDN_t$ = Deferred Debit No Funding, year($t$)

$$DDN_t = \begin{cases} ({}^*BL_t - {}^*BL_{t-1}) \times {}^*CT, \\ \quad \text{if } \sum_{x=1}^{t-1} DDN_x + ({}^*BL_t - {}^*BL_{t-1}) \times {}^*CT \geqq 0 \\ -\sum_{x=1}^{t-1} DDN_x, \\ \quad \text{if } \sum_{x=1}^{t-1} DDN_x > 0 \text{ AND} \\ \quad \sum_{x=1}^{t-1} DDN_x + ({}^*BL_t - {}^*BL_{t-1}) \times {}^*CT < 0 \\ 0, \text{ otherwise} \end{cases}$$

In Compute Deferred Debit with Funding 90, the System 1 computes the debit to deferred income taxes that is generated when a corporation funds an Indenture Plan to offset its accrued OPEB liabilities:

$DDW_t$=Deferred Debit with Funding, year(t)

$$DDW_t = DDN_t$$

In Compute Reduction in Deferred Debit 92, the System 1 computes the annual reduction in the debit to deferred income taxes due to funding of the Indenture Plan:

$RDD_t$=Reduction in Deferred Debit, year (t)

$$RDD_t = DDN_t - DDW_t$$

In Compute Cumulative Reduction in Debit 94, in which the System 1 computes the cumulative effect of the reductions in the debits to deferred income taxes due to funding of the Indenture Plan:

$CRD_t$=Cumulative Reduction in Debit, year (t)

$$CRD_t=CRD_{t-1}+RDD_t$$

(Note $CRD_0$=0)

The output of the computations of Blocks 88–94, show in Specimen 9 (see Appendix A) that funding an Indenture Plan has no effect on the deferred-tax debits that grow from the accrual of the OPEB liability. Deferred tax debit balances indicate that a company is prepaying its accrued tax liability, in essence recognizing a tax deduction before it is actually taken with the IRS. Deferred tax debits arise from differences between the way taxes are calculated for book accounting purposes, and the way they are calculated by the Internal Revenue Service. In the case of Statement 106, this difference arises from the fact that companies under accrual accounting will incur a charge against current earnings for retiree health care expenses which they will not pay (and deduct for IRS purposes) for many years to come. When they accrue these costs, generally accepted accounting principles permit companies (in most instances) to recognize a matching book tax benefit. Still, the IRS only permits tax deductions for current cash expenditures for retiree health care. This means there is a timing difference between tax deductions for book accounting purposes (current) and actual tax deductions taken with the IRS (in the future). In order to reconcile the two calculations, this difference in tax amounts is accounted for on corporate books as a deferred tax debit. Contributions to an Indenture Plan in a prefunding transaction do not affect the timing of the book and tax deduction calculations, hence the deferred tax debits are not affected. The computations at Specimen 9 show this result.

In Compute Incremental Plan Investment 96, the System 1 isolates the incremental corporate cash investment in the Plan over the pay-as-you-go cost (which the corporation would have paid whether or not it decided to prefund):

$II_t$=Incremental plan investment, year (t)

$$II_t=CFI_t-ATP_t$$

At Compute IRR on Incremental Investment 98, the System 1 computes the annual internal rate of return on this incremental cash investment:

$III_t$ = $IRR$ on Incremental plan investment, year($t$)

$$0=\frac{*CV_t}{(1+III_t)^t}+\sum_{r=1}^{t}\frac{II_r}{(1+III_t)^r}$$

The output shown in Specimen 10 (see Appendix A) summarizes the computations made in Blocks 96–98. The analysis shown in Specimen 10 shows the incremental investment required for prefunding using the Indenture Plan and the rate of return the corporation is earning on its cash by investing through the Plan's life insurance contract. The rate of return computation also helps the corporation estimate the long term rate of return on its investment over an extended horizon. In the example appearing in Specimen 10, the rate of return in the thirtieth year is 9.3%. Because the earnings rate is assumed to be 10% on the insurance contract's underlying assets, the difference between the earnings rate and the rate of return is 70 basis points. This difference is the long term cost of the insurance to the corporation, which consists of administration charges, mortality charges, and other insurance expenses.

Moving now to FIG. 3.5, Compute Annual Loan 100 is where the System 1 computes the amount of the annual loan required to fund the Indenture Plan. The logic of System 1 takes into account the incremental cash flow required to fund the Plan and the excess cash produced as a result of the death benefits payable in reimbursement of OPEB pay-as-you-go costs in later years. Theoretically, these amounts may be assumed to go towards reducing the outstanding loan balance. Thus, a negative annual loan amount indicates a theoretical loan repayment:

$BLB_t$=Beginning loan balance, year (t)

$LIA_t$=Loan interest accrued, year (t)

$AL_t$=Annual loan, year(t)

$$AL_t=\begin{cases}-BLB_t,\ \text{if}\ II_t>(BLB_t-LIA_t)\\-II_t-LIA_t,\ \text{otherwise}\end{cases}$$

In Compute BOY Loan Balance 102, the System 1 computes the cumulative beginning of year loan balance assuming the corporation were to borrow the funds placed in the Indenture Plan:

$BLB_t$=Beginning loan balance, year(t)

$$BLB_t=\text{greater of:}\begin{cases}0,\ \text{or}\\BLB_{t-1}+AL_{t-1}\end{cases}$$

Then, in Compute Loan Interest Accrued 104, the System 1 computes the after-tax cost of the loan interest accrued on the total outstanding loan balance:

*LR=Loan interest rate $LIA_t$After-tax loan interest accrued, year(t)

$$LIA_t=\text{lesser of:}\begin{cases}0,\ \text{or}\\-(BLB_t+AL_t)\times(1-{*CT})\times{*LR}\end{cases}$$

Compute P&L Using Loan With Plan 106 marks the computation of the profit and loss impact of corporate borrowing to fund an Indenture Plan using life insurance:

$PLB_t$=Profit and loss with Plan and borrowing, year (t)

$$PLB_t=PL_t+LIA_t$$

Finally in FIG. 3.5, in Compute Savings with Borrowing 108, the System 1 finds the profit and loss effect of funding with borrowed funds is converted to earnings per share as follows:

$SB_t$=Savings with borrowing, year (t)

$$SB_t=PLB_t-ATFE_t$$

Moving now to FIG. 3.6, at Compute Savings Per Share 110, the System 1 computes the savings per share of borrowing to fund the plan:

$SPSB_t$=Savings per share with borrowing, year (t)

$$SPSB_t=SB_t/*SO$$

Specimen 11 (see Appendix A) summarizes the output from the computations appearing in Blocks 100–110. Specimen 11 shows that OPEB prefunding using the Indenture Plan is a worthwhile investment even where the corporation does not have the immediate cash resources to make the investment and must borrow using its debt capacity to make the incremental plan contributions. This example shows that plan funding by an investment in life insurance generates a savings over the pay-as-you-go approach. The savings begins in the first year of the investment and increases from three cents per share to $0.43 per share in the thirtieth year.

In Compute After Tax-Cash Flow with Borrowing 112, the System 1 isolates the after-tax cash flow impact of borrowing:

$ATCFB_t$=After-tax cash flow with borrowing, year (t)

$$ATCFB_t=II_t+AL_t+LIA_{t-1}$$

(Note: $LIA_0=0$.)

Output from the computation in Block 112 is exemplified in Specimen 15 (see Appendix A). Specimen 15 demonstrates the after-tax cash flow effect of borrowing funds to invest in the Indenture Plan. Continuing our example in Specimen 15, the net after-tax cash flow effect with borrowing is zero (or positive) for all years. The analysis provided by System 1 shows that because of the multiple advantages from funding under the Indenture Plan and assuming borrowing, the corporation does not have to burden its corporate cash flow to complete the funding process. Indeed, after 30 years the Plan after-tax cash flow is positive and there are over $477 million of plan assets on the books.

At Compute After-Tax Increase in Net Assets 114, the System 1 computes the after-tax increase in net assets in borrowing to fund an Indenture Plan:

$INA_t$=After-tax increase in net assets, year (t)

$$INA_t=*MVA_t-BLB_{t+1}$$

Compute Annual Increase in Net Assets 116 is where the System 1 computes the annual change in net assets assuming corporate borrowing to fund an Indenture Plan:

$AINA_t$=Change in net assets, year (t)

$$AINA_t=INA_t-INA_{t-1}+ATCFB_t$$

Block 118, Compute Present Value on Net After-Tax Increase in Net Assets 118, is where the System 1 computes the present value of the after-tax increase in net assets in borrowing to fund an Indenture Plan:

$PIN_t$ = Present value of increase in net assests, year($t$)

$$PIN_t=\frac{INA_t}{(1+*DR)^t}$$

Output from the computations in Blocks 114 to 118 is shown in Specimen 14 (see Appendix A). Specimen 14 illustrates the attractiveness of the corporate funding investment in present value terms, this time focusing on corporate net assets created via funding under the Indenture Plan and borrowing. The increase in corporate net assets is discounted using the same discount rate which the corporation uses to measure its other investment alternatives. In this case, using an assumed corporate discount rate of 15 percent, the present value improvement in corporate net worth, after taking into account the effects of borrowing, grows from almost $4.6 million in the first year of funding to almost $14 million in the thirteenth year of the funding program.

In Compute Annual Expenditure of Taxable Trust Income 120, the System 1 computes the annual cash flow and year-end asset balance of a taxable trust, assuming life insurance is not purchased. To accurately compare the financial performance of this taxable trust with an Indenture Plan investment, the system logic assumes that taxable trust expenditures match those made by a Plan which has invested in life insurance:

$AET_t$=Expenditure of trust income, year (t)

$AET_t$=Greater of $-*DB_t$ or $*P_t$

Turning now to FIG. 3.7, Compute Taxable Trust Interest Income 122 is where the System 1 computes the trust interest income in a trust, assuming the trust does not invest in life insurance, but instead invests in taxable instruments yielding a specified before-tax rate of return (in this case, the same before-tax return is assumed as with the life insurance investment):

$TII_t$=Trust interest income, year (t)

$YETB_t$=Year end trust balance, year (t)

$$TII_t=[(-*PR_t+YETB_{t-1})\times *ER\times(1-*VT)]+[AET_t\times((1+(*ER\times(1-*VT))^{1/2}-1)]$$

At Compute Taxable Trust After-Tax Cash Flow, Block 124, the System 1 computes the taxable trust cash flow by computing trust income net of trust expenditures assuming no life insurance investment:

$TCF_t$=Trust cash flow, year (t)

$$TCF_t=TII_t+AET_t$$

At Compute Year End Taxable Trust Balance, at Block 126, the System 1 computes the year end taxable trust balance. This is computed by showing the residual accumulation of trust cash balances, after allowing for net inflows and outflows, and interest income:

$YETB_t$=Year end trust balance, year (t)

$$YETB_t=YETB_{t-1}-*PR_t+TCF_t$$

The output in Specimen 12 (see Appendix A) summarizes the computations immediately above.

For those companies contemplating prefunding, the analysis underpinning Specimen 12 is important as it shows what the accumulation of assets would be in the absence of an Indenture Plan investment. By using the same methodology as was used in computing the Plan assets, Specimen 12 sets the stage for a comparison between the two funding approaches.

This comparison is developed in Compute Difference Between Assets 128, which computes the difference between assets in a trust making taxable investments and an Indenture Plan investing in life insurance:

$DAT_t$=Difference in assets between the Indenture Plan and a taxable trust, year (t)

$$DAT_t = MVA_t - YETB_t$$

In Compute Percent Advantage Between Assets 130, the System 1 goes on to compute the advantage, expressed in percentage terms, of the Indenture Plan's investment in life insurance over a comparable investment in a taxable trust:

$APDT_t$=Percentage difference of assets in Plan versus taxable trust, year (t)

$$APDT_t = DAT_t / \text{ABSOLUTE VALUE}(YETB_t)$$

The output in Specimen 13 (see Appendix A) summarizes the computations made in Blocks 128–130. For those companies contemplating funding a trust using taxable instruments, the analysis shown in Specimen 13 provides a measure of the advantage of using an Indenture Plan. The example analysis appearing in Specimen 13 shows that without the Plan, fund balances will accumulate to only $107 million by the end of the thirtieth year, while using the Indenture Plan approach, Plan assets will grow to over $477.5 million. The difference, $370.5 million, represents an advantage of over 346 percent.

Turning to FIG. 3.8, after the System 1 has completed all of the above-mentioned computations, the system user reviews the system output for performance (Block 132). The user checks to see that the insurance contract provides an acceptable return. In Financial Performance Attractive?, Branch 134, the user checks to see that the Internal Rate of Return on Cash Flow is adequate. If the Internal Rate of Return, which is computed in Block 98, is substantially less than the earnings rate on comparable investments assumed by the corporation, then the insurance contract is not offering a superior financial return. In Funding Objectives Met?, Branch 136, the user checks to see that the liability has been adequately funded. If the assets do not offset the liability (see Block 74) or the stream of cash flows from death benefits does not match (see Block 60) or exceed the after-tax pay-as-you-go cost (see Block 34), then the funding requirements for System 1 are not met. A user query at Insurance Advantage?, Branch 138, asks whether the assets generated by insurance are greater than those in a trust investing in taxable financial instruments. This determines whether it is advantageous to use insurance contracts in an Indenture Plan.

If the answer to any of the queries 134–138 is "no," the user changes the underlying assumptions. Options include: changing the insured population in Block 140; changing the premium and coverage of the insurance policy, changing the reinvestment of death benefits and/or taking out policy distributions, in Block 142; or, requesting an illustration from a different carrier in Block 144. All these options will change the performance of the insurance contract.

If different assumptions are required to change the performance of the contract, then a new illustration request is sent to the carrier via return Z1 to FIG. 2, thereby reinitiating the system's processes. Otherwise, the logic ends.

While a particular embodiment of the present invention has been disclosed, it is to be understood that various different modifications are possible and are within the true spirit of the invention, the scope of which is to be determined with reference to the claims set forth below. There is no intention, therefore, to limit the invention to the exact disclosure presented herein as a teaching of one embodiment of the invention.

APPENDIX A

Funding for Other Postretirement Employee Benefits Using An Indenture Plan

XYZ COMPANY
ILLUSTRATION 1
15-Sep-93
10:44 AM

SPECIMEN 1

ACTUARIAL AND FINANCIAL ASSUMPTIONS

| | |
|---|---|
| CENSUS PROJECTIONS: | |
| CENSUS TYPE | OPEN |
| NUMBER OF RETIREES | 3,755 |
| NUMBER OF ACTIVE EMPLOYEES | 8,041 |
| PERCENTAGE OF RETIREES WITH DEPENDENT COVERAGE | 70.00% |
| ACTUARIAL ASSUMPTIONS: | |
| TERMINATION RATES | COMPANY SUPPLIED |
| DISABILITY RATES | COMPANY SUPPLIED |
| RETIREMENT RATES | COMPANY SUPPLIED |
| MORTALITY RATES | COMPANY SUPPLIED |
| MEDICAL COST TREND: | |
| YEAR 1 | 12.00% |
| YEAR 2 | 11.50% |
| YEAR 3 | 11.00% |
| YEAR 4 | 10.50% |
| YEAR 5 | 10.00% |
| YEAR 6 | 9.50% |
| YEAR 7 | 9.00% |
| YEAR 8 | 8.50% |
| YEAR 9 | 8.00% |
| YEAR 10 | 7.00% |
| YEAR 11+ | 6.00% |
| AVERAGE PRE-65 COSTS: | $3,500 |
| AVERAGE POST-65 COSTS: | $500 |
| INTEREST RATES: | |
| MEDICAL COST DISCOUNT RATE | 8.50% |
| PRE-TAX CORPORATE BORROWING RATE | 7.00% |
| TAX RATES: | |
| TRUST TAX RATE | 31.00% |
| CORPORATE TAX RATE | 38.00% |
| EARNINGS RATES: | |
| VARIABLE CONTRACT ASSETS NET EARNINGS | 10.00% |
| TAXABLE TRUST ASSETS PRE-TAX EARNINGS | 10.00% |
| TRANSITION OBLIGATION: 1992 FULL RECOGNITION | $100,271,876 |
| DEATH BENEFITS: | NONE REINVESTED |

Copyright 1993 The Evergreen Group

Funding for Other Postretirement Employee Benefits Using An Indenture Plan

XYZ COMPANY
ILLUSTRATION 1
15-Sep-93
10:44 AM

SPECIMEN 2

PAY-AS-YOU-GO RETIREE COST
(000's OMITTED)

| Year | Annual Retiree Medical Cost | After-Tax Annual Medical Cost (1) | Cost per Share ($) (2) |
|---|---|---|---|
| 1 | ($4,774) | ($2,960) | -0.03 |
| 2 | (5,329) | (3,304) | -0.03 |
| 3 | (6,005) | (3,723) | -0.04 |
| 4 | (6,645) | (4,120) | -0.04 |
| 5 | (7,052) | (4,372) | -0.04 |
| 6 | (7,454) | (4,621) | -0.05 |
| 7 | (8,136) | (5,044) | -0.05 |
| 8 | (8,819) | (5,468) | -0.05 |
| 9 | (9,498) | (5,889) | -0.06 |
| 10 | (10,153) | (6,295) | -0.06 |
| 11 | (10,786) | (6,687) | -0.07 |
| 12 | (11,561) | (7,168) | -0.07 |
| 13 | (12,255) | (7,598) | -0.08 |
| 14 | (12,827) | (7,953) | -0.08 |
| 15 | (13,413) | (8,316) | -0.08 |
| 16 | (14,020) | (8,692) | -0.09 |
| 17 | (14,534) | (9,011) | -0.09 |
| 18 | (15,056) | (9,335) | -0.09 |
| 19 | (15,600) | (9,672) | -0.10 |
| 20 | (16,164) | (10,022) | -0.10 |
| 21 | (16,764) | (10,394) | -0.10 |
| 22 | (17,213) | (10,672) | -0.11 |
| 23 | (17,686) | (10,965) | -0.11 |
| 24 | (18,184) | (11,274) | -0.11 |
| 25 | (18,786) | (11,647) | -0.12 |
| 26 | (19,543) | (12,117) | -0.12 |
| 27 | (20,431) | (12,667) | -0.13 |
| 28 | (21,582) | (13,381) | -0.13 |
| 29 | (22,999) | (14,259) | -0.14 |
| 30 | (24,700) | (15,314) | -0.15 |

(1) Corporate tax rate = 38.0%
(2) Shares outstanding =100,000,000

Copyright 1993 The Evergreen Group

--A2--

Funding for Other Postretirement Employee Benefits Using An Indenture Plan

XYZ COMPANY
ILLUSTRATION 1
15-Sep-93
10:44 AM

SPECIMEN 3

ACCRUED RETIREE COST
(000's OMITTED)

| Year | Annual Retiree Medical Expense | After-Tax Annual Medical Expense (1) | Earnings per Share ($) (2) |
|---|---|---|---|
| 1 | ($11,301) | ($7,006) | -0.07 |
| 2 | (11,943) | (7,405) | -0.07 |
| 3 | (12,596) | (7,810) | -0.08 |
| 4 | (13,228) | (8,201) | -0.08 |
| 5 | (13,914) | (8,627) | -0.09 |
| 6 | (14,622) | (9,066) | -0.09 |
| 7 | (15,333) | (9,506) | -0.10 |
| 8 | (16,072) | (9,964) | -0.10 |
| 9 | (16,865) | (10,456) | -0.10 |
| 10 | (17,728) | (10,991) | -0.11 |
| 11 | (18,669) | (11,575) | -0.12 |
| 12 | (19,590) | (12,146) | -0.12 |
| 13 | (20,578) | (12,758) | -0.13 |
| 14 | (21,650) | (13,423) | -0.13 |
| 15 | (22,817) | (14,147) | -0.14 |
| 16 | (24,086) | (14,933) | -0.15 |
| 17 | (25,444) | (15,775) | -0.16 |
| 18 | (26,945) | (16,706) | -0.17 |
| 19 | (28,597) | (17,730) | -0.18 |
| 20 | (30,411) | (18,855) | -0.19 |
| 21 | (32,403) | (20,090) | -0.20 |
| 22 | (34,590) | (21,446) | -0.21 |
| 23 | (37,012) | (22,947) | -0.23 |
| 24 | (39,691) | (24,608) | -0.25 |
| 25 | (42,277) | (26,212) | -0.26 |
| 26 | (44,822) | (27,790) | -0.28 |
| 27 | (47,605) | (29,515) | -0.30 |
| 28 | (50,593) | (31,368) | -0.31 |
| 29 | (53,774) | (33,340) | -0.33 |
| 30 | (57,139) | (35,426) | -0.35 |

(1) Corporate tax rate = 38.0%
(2) Shares outstanding =100,000,000

Copyright 1993 The Evergreen Group

- - A 3 - -

Funding for Other Postretirement Employee Benefits Using An Indenture Plan

XYZ COMPANY
ILLUSTRATION 1
15-Sep-93
10:44 AM

SPECIMEN 4

CASH FLOW ANALYSIS
(000's OMITTED)

| Year | Annual Retiree Medical Cost | Indenture Plan Investment | Estimated Death Benefits Distributed | Corporate Cash Outlay (1) | Annual Tax Deduction | Annual Tax Savings (2) | After-Tax Cash Flow With Plan (3) |
|---|---|---|---|---|---|---|---|
| 1 | ($4,774) | ($69,648) | $551 | ($73,871) | $4,774 | $1,814 | ($72,057) |
| 2 | (5,329) | 0 | 616 | (4,713) | 5,329 | 2,025 | (2,688) |
| 3 | (6,005) | 0 | 715 | (5,290) | 6,005 | 2,282 | (3,008) |
| 4 | (6,645) | 0 | 829 | (5,816) | 6,645 | 2,525 | (3,291) |
| 5 | (7,052) | 0 | 964 | (6,088) | 7,052 | 2,680 | (3,408) |
| 6 | (7,454) | 0 | 1,121 | (6,333) | 7,454 | 2,832 | (3,500) |
| 7 | (8,136) | 0 | 1,307 | (6,829) | 8,136 | 3,092 | (3,737) |
| 8 | (8,819) | 0 | 1,624 | (7,195) | 8,819 | 3,351 | (3,844) |
| 9 | (9,498) | 0 | 1,778 | (7,720) | 9,498 | 3,609 | (4,111) |
| 10 | (10,153) | 0 | 2,074 | (8,079) | 10,153 | 3,858 | (4,221) |
| 11 | (10,786) | 0 | 2,413 | (8,373) | 10,786 | 4,099 | (4,274) |
| 12 | (11,561) | 0 | 2,800 | (8,761) | 11,561 | 4,393 | (4,368) |
| 13 | (12,255) | 0 | 3,240 | (9,015) | 12,255 | 4,657 | (4,358) |
| 14 | (12,827) | 0 | 3,744 | (9,083) | 12,827 | 4,874 | (4,209) |
| 15 | (13,413) | 0 | 4,318 | (9,095) | 13,413 | 5,097 | (3,998) |
| 16 | (14,020) | 0 | 4,971 | (9,049) | 14,020 | 5,328 | (3,721) |
| 17 | (14,534) | 0 | 5,721 | (8,813) | 14,534 | 5,523 | (3,290) |
| 18 | (15,056) | 0 | 6,567 | (8,489) | 15,056 | 5,721 | (2,768) |
| 19 | (15,600) | 0 | 7,516 | (8,084) | 15,600 | 5,928 | (2,156) |
| 20 | (16,164) | 0 | 8,570 | (7,594) | 16,164 | 6,142 | (1,452) |
| 21 | (16,764) | 0 | 9,730 | (7,034) | 16,764 | 6,370 | (664) |
| 22 | (17,213) | 0 | 10,996 | (6,217) | 17,213 | 6,541 | 324 |
| 23 | (17,686) | 0 | 12,361 | (5,325) | 17,686 | 6,721 | 1,396 |
| 24 | (18,184) | 0 | 13,626 | (4,558) | 18,184 | 6,910 | 2,352 |
| 25 | (18,786) | 0 | 15,386 | (3,400) | 18,786 | 7,138 | 3,739 |
| 26 | (19,543) | 0 | 17,040 | (2,503) | 19,543 | 7,426 | 4,923 |
| 27 | (20,431) | 0 | 18,776 | (1,655) | 20,431 | 7,764 | 6,109 |
| 28 | (21,582) | 0 | 20,622 | (960) | 21,582 | 8,201 | 7,241 |
| 29 | (22,999) | 0 | 22,648 | (351) | 22,999 | 8,740 | 8,389 |
| 30 | (24,700) | 0 | 24,546 | (154) | 24,700 | 9,386 | 9,232 |

(1) Corporate cash outlay equals annual retiree expense plus annual premium plus death benefits. Corporate cash outlay must always be less than or equal to zero.
(2) Corporate tax rate = 38.0%
(3) After-tax cash flow equals corporate cash outlay less tax savings.

Copyright 1993 The Evergreen Group

– – A 4 – –

Funding for Other Postretirement Employee Benefits Using An Indenture Plan

XYZ COMPANY
ILLUSTRATION 1
15-Sep-93
10:44 AM

SPECIMEN 5

EARNINGS AMOUNT
(000's OMITTED)

| Year | Year End Contract Cash Value | Accumulation of Cash Reserves (1) | Year-End Cash Value of Plan (2) | Indenture Plan Investment | Annual Investment Growth | Death Benefits Distributed | Indenture Plan Income | Corporate Earnings From Plan (3) | Market Related Value of Plan Assets |
|---|---|---|---|---|---|---|---|---|---|
| 1 | $69,510 | 0 | $69,510 | ($69,648) | ($138) | $551 | $413 | $6,485 | $74,367 |
| 2 | 75,489 | 0 | 75,489 | 0 | 5,979 | 616 | 6,595 | 6,924 | 79,395 |
| 3 | 81,961 | 0 | 81,961 | 0 | 6,472 | 715 | 7,187 | 7,392 | 84,751 |
| 4 | 88,920 | 0 | 88,920 | 0 | 6,959 | 829 | 7,788 | 7,891 | 90,471 |
| 5 | 96,426 | 0 | 96,426 | 0 | 7,506 | 964 | 8,470 | 8,423 | 96,598 |
| 6 | 104,498 | 0 | 104,498 | 0 | 8,072 | 1,121 | 9,193 | 8,994 | 104,393 |
| 7 | 113,171 | 0 | 113,171 | 0 | 8,673 | 1,307 | 9,980 | 9,719 | 112,845 |
| 8 | 122,482 | 0 | 122,482 | 0 | 9,311 | 1,624 | 10,935 | 10,506 | 121,894 |
| 9 | 132,457 | 0 | 132,457 | 0 | 9,975 | 1,778 | 11,753 | 11,349 | 131,732 |
| 10 | 143,120 | 0 | 143,120 | 0 | 10,663 | 2,074 | 12,737 | 12,265 | 142,276 |
| 11 | 154,351 | 0 | 154,351 | 0 | 11,231 | 2,413 | 13,644 | 13,247 | 153,502 |
| 12 | 166,158 | 0 | 166,158 | 0 | 11,807 | 2,800 | 14,607 | 14,292 | 165,398 |
| 13 | 178,690 | 0 | 178,690 | 0 | 12,532 | 3,240 | 15,772 | 15,399 | 177,949 |
| 14 | 191,956 | 0 | 191,956 | 0 | 13,266 | 3,744 | 17,010 | 16,568 | 191,173 |
| 15 | 205,958 | 0 | 205,958 | 0 | 14,002 | 4,318 | 18,320 | 17,799 | 205,064 |
| 16 | 220,684 | 0 | 220,684 | 0 | 14,726 | 4,971 | 19,697 | 19,092 | 219,636 |
| 17 | 236,118 | 0 | 236,118 | 0 | 15,434 | 5,721 | 21,155 | 20,449 | 234,894 |
| 18 | 252,231 | 0 | 252,231 | 0 | 16,113 | 6,567 | 22,680 | 21,870 | 250,813 |
| 19 | 268,986 | 0 | 268,986 | 0 | 16,755 | 7,516 | 24,271 | 23,352 | 267,361 |
| 20 | 286,353 | 0 | 286,353 | 0 | 17,367 | 8,570 | 25,937 | 24,892 | 284,500 |
| 21 | 304,285 | 0 | 304,285 | 0 | 17,932 | 9,730 | 27,662 | 26,488 | 302,189 |
| 22 | 322,732 | 0 | 322,732 | 0 | 18,447 | 10,996 | 29,443 | 28,135 | 320,380 |
| 23 | 341,643 | 0 | 341,643 | 0 | 18,911 | 12,361 | 31,272 | 29,829 | 339,025 |
| 24 | 360,967 | 0 | 360,967 | 0 | 19,324 | 13,626 | 32,950 | 31,565 | 358,235 |
| 25 | 380,649 | 0 | 380,649 | 0 | 19,682 | 15,386 | 35,068 | 33,353 | 377,607 |
| 26 | 400,632 | 0 | 400,632 | 0 | 19,983 | 17,040 | 37,023 | 35,157 | 397,267 |
| 27 | 420,860 | 0 | 420,860 | 0 | 20,228 | 18,776 | 39,004 | 36,987 | 417,164 |
| 28 | 441,250 | 0 | 441,250 | 0 | 20,390 | 20,622 | 41,012 | 38,840 | 437,213 |
| 29 | 461,737 | 0 | 461,737 | 0 | 20,487 | 22,648 | 43,135 | 40,706 | 457,311 |
| 30 | 482,257 | 0 | 482,257 | 0 | 20,520 | 24,546 | 45,066 | 42,578 | 477,537 |

(1) Cash reserve accumulated from death benefits (mid-year) that exceed annual retiree medical expenses (mid-year). Reserves invested in taxable investments. Interest rate = 10.00%
(2) Year-end cash value of plan equals contract cash value plus accumulated reserves.
(3) Computation made pursuant to paragraph 57 of Statement 106. Income differences are amortized straight line over five years. Expected earnings rate = 9.31%

Copyright 1993 The Evergreen Group

--A5--

Funding for Other Postretirement Employee Benefits Using An Indenture Plan

XYZ COMPANY
ILLUSTRATION 1
15-Sep-93
10:44 AM

SPECIMEN 6

RETIREE OPEB COST LIABILITY OFFSET
(000's OMITTED)

| Year | Market Related Value of Plan Assets | Book Accrued Liability | Net Book Liability |
|---|---|---|---|
| 1 | $74,367 | $106,798 | $32,431 |
| 2 | 79,395 | 113,413 | 34,018 |
| 3 | 84,751 | 120,003 | 35,252 |
| 4 | 90,471 | 126,586 | 36,115 |
| 5 | 96,598 | 133,448 | 36,850 |
| 6 | 104,393 | 140,617 | 36,224 |
| 7 | 112,845 | 147,813 | 34,969 |
| 8 | 121,894 | 155,066 | 33,172 |
| 9 | 131,732 | 162,432 | 30,700 |
| 10 | 142,276 | 170,007 | 27,731 |
| 11 | 153,502 | 177,890 | 24,388 |
| 12 | 165,398 | 185,920 | 20,522 |
| 13 | 177,949 | 194,243 | 16,294 |
| 14 | 191,173 | 203,066 | 11,893 |
| 15 | 205,064 | 212,470 | 7,406 |
| 16 | 219,636 | 222,535 | 2,899 |
| 17 | 234,894 | 233,446 | (1,448) |
| 18 | 250,813 | 245,335 | (5,478) |
| 19 | 267,361 | 258,332 | (9,029) |
| 20 | 284,500 | 272,579 | (11,922) |
| 21 | 302,189 | 288,218 | (13,972) |
| 22 | 320,380 | 305,594 | (14,786) |
| 23 | 339,025 | 324,921 | (14,105) |
| 24 | 358,235 | 346,427 | (11,808) |
| 25 | 377,607 | 369,918 | (7,689) |
| 26 | 397,267 | 395,197 | (2,070) |
| 27 | 417,164 | 422,371 | 5,207 |
| 28 | 437,213 | 451,383 | 14,170 |
| 29 | 457,311 | 482,157 | 24,847 |
| 30 | 477,537 | 514,596 | 37,060 |

Copyright 1993 The Evergreen Group

--A6--

Funding for Other Postretirement Employee Benefits Using An Indenture Plan

XYZ COMPANY
ILLUSTRATION 1
15-Sep-93
10:44 AM

SPECIMEN 7

ANNUAL INCOME STATEMENT EFFECT
(000's OMITTED)

| Year | Corporate Earnings From Indenture Plan | Annual Retiree Medical Expense | Income Effect Before Taxes (1) | Annual Tax Benefit (2) | Net P & L Effect with Plan | Earnings per Share ($) (3) |
|---|---|---|---|---|---|---|
| 1 | 6,485 | ($11,301) | ($4,816) | $4,294 | ($522) | -0.01 |
| 2 | 6,924 | (11,943) | (5,019) | 4,538 | (481) | -0.00 |
| 3 | 7,392 | (12,596) | (5,204) | 4,786 | (417) | -0.00 |
| 4 | 7,891 | (13,228) | (5,337) | 5,027 | (311) | -0.00 |
| 5 | 8,423 | (13,914) | (5,491) | 5,287 | (204) | -0.00 |
| 6 | 8,994 | (14,622) | (5,629) | 5,556 | (72) | -0.00 |
| 7 | 9,719 | (15,333) | (5,613) | 5,826 | 213 | 0.00 |
| 8 | 10,506 | (16,072) | (5,565) | 6,107 | 542 | 0.01 |
| 9 | 11,349 | (16,865) | (5,516) | 6,409 | 893 | 0.01 |
| 10 | 12,265 | (17,728) | (5,463) | 6,737 | 1,273 | 0.01 |
| 11 | 13,247 | (18,669) | (5,423) | 7,094 | 1,672 | 0.02 |
| 12 | 14,292 | (19,590) | (5,298) | 7,444 | 2,146 | 0.02 |
| 13 | 15,399 | (20,578) | (5,179) | 7,820 | 2,641 | 0.03 |
| 14 | 16,568 | (21,650) | (5,082) | 8,227 | 3,145 | 0.03 |
| 15 | 17,799 | (22,817) | (5,018) | 8,671 | 3,652 | 0.04 |
| 16 | 19,092 | (24,086) | (4,993) | 9,153 | 4,159 | 0.04 |
| 17 | 20,449 | (25,444) | (4,995) | 9,669 | 4,674 | 0.05 |
| 18 | 21,870 | (26,945) | (5,076) | 10,239 | 5,163 | 0.05 |
| 19 | 23,352 | (28,597) | (5,245) | 10,867 | 5,622 | 0.06 |
| 20 | 24,892 | (30,411) | (5,518) | 11,556 | 6,038 | 0.06 |
| 21 | 26,488 | (32,403) | (5,915) | 12,313 | 6,398 | 0.06 |
| 22 | 28,135 | (34,590) | (6,455) | 13,144 | 6,689 | 0.07 |
| 23 | 29,829 | (37,012) | (7,183) | 14,065 | 6,881 | 0.07 |
| 24 | 31,565 | (39,691) | (8,126) | 15,083 | 6,956 | 0.07 |
| 25 | 33,353 | (42,277) | (8,923) | 16,065 | 7,142 | 0.07 |
| 26 | 35,157 | (44,822) | (9,665) | 17,032 | 7,367 | 0.07 |
| 27 | 36,987 | (47,605) | (10,617) | 18,090 | 7,472 | 0.07 |
| 28 | 38,840 | (50,593) | (11,753) | 19,225 | 7,472 | 0.07 |
| 29 | 40,706 | (53,774) | (13,067) | 20,434 | 7,367 | 0.07 |
| 30 | 42,578 | (57,139) | (14,561) | 21,713 | 7,151 | 0.07 |

(1) Net income before taxes equals corporate earnings from Indenture Plan minus annual retiree medical expense.
(2) Accrued tax benefit from net book expense.
Corporate tax rate = 38.0%
(3) Shares outstanding =100,000,000

Copyright 1993 The Evergreen Group

— — A 7 — —

Funding for Other Postretirement Employee Benefits Using An Indenture Plan

XYZ COMPANY
ILLUSTRATION 1
15-Sep-93
10:44 AM

SPECIMEN 8

ANNUAL SAVINGS PER SHARE EFFECT
(000's OMITTED)

| Year | Net P & L Effect With Plan | Net P & L Effect Without Plan | Savings | Savings per Share ($) (1) |
|---|---|---|---|---|
| 1 | ($522) | ($7,006) | $6,485 | 0.06 |
| 2 | (481) | (7,405) | 6,924 | 0.07 |
| 3 | (417) | (7,810) | 7,392 | 0.07 |
| 4 | (311) | (8,201) | 7,891 | 0.08 |
| 5 | (204) | (8,627) | 8,423 | 0.08 |
| 6 | (72) | (9,066) | 8,994 | 0.09 |
| 7 | 213 | (9,506) | 9,719 | 0.10 |
| 8 | 542 | (9,964) | 10,506 | 0.11 |
| 9 | 893 | (10,456) | 11,349 | 0.11 |
| 10 | 1,273 | (10,991) | 12,265 | 0.12 |
| 11 | 1,672 | (11,575) | 13,247 | 0.13 |
| 12 | 2,146 | (12,146) | 14,292 | 0.14 |
| 13 | 2,641 | (12,758) | 15,399 | 0.15 |
| 14 | 3,145 | (13,423) | 16,568 | 0.17 |
| 15 | 3,652 | (14,147) | 17,799 | 0.18 |
| 16 | 4,159 | (14,933) | 19,092 | 0.19 |
| 17 | 4,674 | (15,775) | 20,449 | 0.20 |
| 18 | 5,163 | (16,706) | 21,870 | 0.22 |
| 19 | 5,622 | (17,730) | 23,352 | 0.23 |
| 20 | 6,038 | (18,855) | 24,892 | 0.25 |
| 21 | 6,398 | (20,090) | 26,488 | 0.26 |
| 22 | 6,689 | (21,446) | 28,135 | 0.28 |
| 23 | 6,881 | (22,947) | 29,829 | 0.30 |
| 24 | 6,956 | (24,608) | 31,565 | 0.32 |
| 25 | 7,142 | (26,212) | 33,353 | 0.33 |
| 26 | 7,367 | (27,790) | 35,157 | 0.35 |
| 27 | 7,472 | (29,515) | 36,987 | 0.37 |
| 28 | 7,472 | (31,368) | 38,840 | 0.39 |
| 29 | 7,367 | (33,340) | 40,706 | 0.41 |
| 30 | 7,151 | (35,426) | 42,578 | 0.43 |

(1) Shares outstanding =100,000,000

Copyright 1993 The Evergreen Group

Funding for Other Postretirement Employee Benefits Using An Indenture Plan

XYZ COMPANY
ILLUSTRATION 1
15-Sep-93
10:44 AM

SPECIMEN 9

DEFERRED TAX ANALYSIS
(000's OMITTED)

| Year | Deferred Tax Debit without Funding (1) | Deferred Tax Debit with Funding | Reduction in Deferred Tax Debit | Cumulative Reduction in Deferred Tax Debits |
|---|---|---|---|---|
| 1 | $40,583 | $40,583 | $0 | $0 |
| 2 | 2,514 | 2,514 | 0 | 0 |
| 3 | 2,504 | 2,504 | 0 | 0 |
| 4 | 2,501 | 2,501 | 0 | 0 |
| 5 | 2,608 | 2,608 | 0 | 0 |
| 6 | 2,724 | 2,724 | 0 | 0 |
| 7 | 2,735 | 2,735 | 0 | 0 |
| 8 | 2,756 | 2,756 | 0 | 0 |
| 9 | 2,799 | 2,799 | 0 | 0 |
| 10 | 2,878 | 2,878 | 0 | 0 |
| 11 | 2,996 | 2,996 | 0 | 0 |
| 12 | 3,051 | 3,051 | 0 | 0 |
| 13 | 3,163 | 3,163 | 0 | 0 |
| 14 | 3,353 | 3,353 | 0 | 0 |
| 15 | 3,574 | 3,574 | 0 | 0 |
| 16 | 3,825 | 3,825 | 0 | 0 |
| 17 | 4,146 | 4,146 | 0 | 0 |
| 18 | 4,518 | 4,518 | 0 | 0 |
| 19 | 4,939 | 4,939 | 0 | 0 |
| 20 | 5,414 | 5,414 | 0 | 0 |
| 21 | 5,943 | 5,943 | 0 | 0 |
| 22 | 6,603 | 6,603 | 0 | 0 |
| 23 | 7,344 | 7,344 | 0 | 0 |
| 24 | 8,172 | 8,172 | 0 | 0 |
| 25 | 8,927 | 8,927 | 0 | 0 |
| 26 | 9,606 | 9,606 | 0 | 0 |
| 27 | 10,326 | 10,326 | 0 | 0 |
| 28 | 11,024 | 11,024 | 0 | 0 |
| 29 | 11,694 | 11,694 | 0 | 0 |
| 30 | 12,327 | 12,327 | 0 | 0 |

(1) Deferred Tax amounts are computed at a corporate tax rate = 38.00%

Copyright 1993 The Evergreen Group

--A9--

Funding for Other Postretirement Employee Benefits Using An Indenture Plan

XYZ COMPANY
ILLUSTRATION 1
15-Sep-93
10:44 AM

SPECIMEN 10

RATE OF RETURN ON INDENTURE PLAN
(000's OMITTED)

| Year | Year End Cash Value of Plan | After-Tax Cash Flow with Plan | After-Tax Cash Retiree Medical Cost | Incremental Plan Investment (1) | IRR of Plan Investment |
|---|---|---|---|---|---|
| 1 | $69,510 | ($72,057) | ($2,960) | ($69,097) | 0.6% |
| 2 | 75,489 | (2,688) | (3,304) | 616 | 4.9% |
| 3 | 81,961 | (3,008) | (3,723) | 715 | 6.5% |
| 4 | 88,920 | (3,291) | (4,120) | 829 | 7.2% |
| 5 | 96,426 | (3,408) | (4,372) | 964 | 7.7% |
| 6 | 104,498 | (3,500) | (4,621) | 1,121 | 8.0% |
| 7 | 113,171 | (3,737) | (5,044) | 1,307 | 8.2% |
| 8 | 122,482 | (3,844) | (5,468) | 1,624 | 8.4% |
| 9 | 132,457 | (4,111) | (5,889) | 1,778 | 8.5% |
| 10 | 143,120 | (4,221) | (6,295) | 2,074 | 8.6% |
| 11 | 154,351 | (4,274) | (6,687) | 2,413 | 8.7% |
| 12 | 166,158 | (4,368) | (7,168) | 2,800 | 8.8% |
| 13 | 178,690 | (4,358) | (7,598) | 3,240 | 8.8% |
| 14 | 191,956 | (4,209) | (7,953) | 3,744 | 8.9% |
| 15 | 205,958 | (3,998) | (8,316) | 4,318 | 8.9% |
| 16 | 220,684 | (3,721) | (8,692) | 4,971 | 9.0% |
| 17 | 236,118 | (3,290) | (9,011) | 5,721 | 9.0% |
| 18 | 252,231 | (2,768) | (9,335) | 6,567 | 9.0% |
| 19 | 268,986 | (2,156) | (9,672) | 7,516 | 9.1% |
| 20 | 286,353 | (1,452) | (10,022) | 8,570 | 9.1% |
| 21 | 304,285 | (664) | (10,394) | 9,730 | 9.1% |
| 22 | 322,732 | 324 | (10,672) | 10,996 | 9.2% |
| 23 | 341,643 | 1,396 | (10,965) | 12,361 | 9.2% |
| 24 | 360,967 | 2,352 | (11,274) | 13,626 | 9.2% |
| 25 | 380,649 | 3,739 | (11,647) | 15,386 | 9.2% |
| 26 | 400,632 | 4,923 | (12,117) | 17,040 | 9.2% |
| 27 | 420,860 | 6,109 | (12,667) | 18,776 | 9.3% |
| 28 | 441,250 | 7,241 | (13,381) | 20,622 | 9.3% |
| 29 | 461,737 | 8,389 | (14,259) | 22,648 | 9.3% |
| 30 | 482,257 | 9,232 | (15,314) | 24,546 | 9.3% |

(1) Annual investment equals after-tax cash flow minus after-tax retiree medical expense.

Copyright 1993 The Evergreen Group

-- A10 --

Funding for Other Postretirement Employee Benefits Using An Indenture Plan

XYZ COMPANY
ILLUSTRATION 1
15-Sep-93
10:44 AM

SPECIMEN 11

INCOME STATEMENT EFFECT WITH BORROWING
(000's OMITTED)

| Year | P&L Effect without Plan | P&L Effect with Plan | Beginning Year Loan Balance (1) | Incremental Plan Cash Flow (2) | Annual Loan (3) | Loan Interest Accrued (4) | P&L Effect with Plan and Loan | Savings ($) (5) | Savings per Share ($) (5,6) |
|---|---|---|---|---|---|---|---|---|---|
| 1 | ($7,006) | ($522) | $0 | ($69,097) | $69,097 | ($2,999) | ($3,521) | $3,486 | 0.03 |
| 2 | (7,405) | (481) | 69,097 | 616 | 2,383 | (3,102) | (3,583) | 3,822 | 0.04 |
| 3 | (7,810) | (417) | 71,480 | 715 | 2,387 | (3,206) | (3,623) | 4,186 | 0.04 |
| 4 | (8,201) | (311) | 73,867 | 829 | 2,377 | (3,309) | (3,620) | 4,582 | 0.05 |
| 5 | (8,627) | (204) | 76,244 | 964 | 2,345 | (3,411) | (3,614) | 5,012 | 0.05 |
| 6 | (9,066) | (72) | 78,589 | 1,121 | 2,290 | (3,510) | (3,582) | 5,484 | 0.05 |
| 7 | (9,506) | 213 | 80,879 | 1,307 | 2,203 | (3,606) | (3,393) | 6,114 | 0.06 |
| 8 | (9,964) | 542 | 83,082 | 1,624 | 1,982 | (3,692) | (3,150) | 6,815 | 0.07 |
| 9 | (10,456) | 893 | 85,063 | 1,778 | 1,914 | (3,775) | (2,882) | 7,574 | 0.08 |
| 10 | (10,991) | 1,273 | 86,977 | 2,074 | 1,701 | (3,849) | (2,575) | 8,416 | 0.08 |
| 11 | (11,575) | 1,672 | 88,678 | 2,413 | 1,436 | (3,911) | (2,239) | 9,336 | 0.09 |
| 12 | (12,146) | 2,146 | 90,114 | 2,800 | 1,111 | (3,959) | (1,813) | 10,333 | 0.10 |
| 13 | (12,758) | 2,641 | 91,225 | 3,240 | 719 | (3,990) | (1,349) | 11,409 | 0.11 |
| 14 | (13,423) | 3,145 | 91,944 | 3,744 | 246 | (4,001) | (856) | 12,567 | 0.13 |
| 15 | (14,147) | 3,652 | 92,190 | 4,318 | (317) | (3,987) | (335) | 13,812 | 0.14 |
| 16 | (14,933) | 4,159 | 91,873 | 4,971 | (984) | (3,945) | 215 | 15,148 | 0.15 |
| 17 | (15,775) | 4,674 | 90,889 | 5,721 | (1,776) | (3,868) | 806 | 16,582 | 0.17 |
| 18 | (16,706) | 5,163 | 89,113 | 6,567 | (2,699) | (3,750) | 1,413 | 18,119 | 0.18 |
| 19 | (17,730) | 5,622 | 86,414 | 7,516 | (3,766) | (3,587) | 2,035 | 19,765 | 0.20 |
| 20 | (18,855) | 6,038 | 82,648 | 8,570 | (4,983) | (3,371) | 2,667 | 21,522 | 0.22 |
| 21 | (20,090) | 6,398 | 77,665 | 9,730 | (6,359) | (3,095) | 3,304 | 23,394 | 0.23 |
| 22 | (21,446) | 6,689 | 71,305 | 10,996 | (7,901) | (2,752) | 3,938 | 25,383 | 0.25 |
| 23 | (22,947) | 6,881 | 63,404 | 12,361 | (9,609) | (2,335) | 4,546 | 27,494 | 0.27 |
| 24 | (24,608) | 6,956 | 53,795 | 13,626 | (11,291) | (1,845) | 5,112 | 29,720 | 0.30 |
| 25 | (26,212) | 7,142 | 42,504 | 15,386 | (13,541) | (1,257) | 5,885 | 32,096 | 0.32 |
| 26 | (27,790) | 7,367 | 28,962 | 17,040 | (15,783) | (572) | 6,795 | 34,585 | 0.35 |
| 27 | (29,515) | 7,472 | 13,179 | 18,776 | (13,179) | 0 | 7,472 | 36,987 | 0.37 |
| 28 | (31,368) | 7,472 | 0 | 20,622 | 0 | 0 | 7,472 | 38,840 | 0.39 |
| 29 | (33,340) | 7,367 | 0 | 22,648 | 0 | 0 | 7,367 | 40,706 | 0.41 |
| 30 | (35,426) | 7,151 | 0 | 24,546 | 0 | 0 | 7,151 | 42,578 | 0.43 |

(1) Beginning year loan balance equals previous year's loan balance plus previous year's loan.
(2) Incremental plan cash flow assumed to be at beginning of year.
(3) Annual loan at beginning of year.
Annual loan equals previous year's accrued interest plus incremental Plan cash flow.
(4) Loan interest accrued equals beginning year loan balance plus annual loan times after-tax loan interest rate.
Loan interest rate = 7.0%
Tax rate = 38.0%
After-tax loan interest rate = 4.3%
(5) Shares outstanding = 100,000,000
(6) Savings per share versus net income without Indenture Plan.

Copyright 1993 The Evergreen Group

Funding for Other Postretirement Employee Benefits Using An Indenture Plan

XYZ COMPANY
ILLUSTRATION 1
15-Sep-93
10:44 AM

SPECIMEN 12

ASSET GROWTH IN A TAXABLE TRUST
(000's OMITTED)

| Year | Beginning Year Trust Balance | Annual Contribution to Trust (1) | Trust Interest Income (2) | Annual Expenditure of Trust Income (3) | Trust Cash Flow | Year End Trust Balance |
|---|---|---|---|---|---|---|
| 1 | $0 | $69,648 | $4,787 | ($551) | $4,236 | $73,884 |
| 2 | 73,884 | 0 | 5,077 | (616) | 4,461 | 78,345 |
| 3 | 78,345 | 0 | 5,382 | (715) | 4,667 | 83,012 |
| 4 | 83,012 | 0 | 5,700 | (829) | 4,871 | 87,882 |
| 5 | 87,882 | 0 | 6,031 | (964) | 5,067 | 92,950 |
| 6 | 92,950 | 0 | 6,375 | (1,121) | 5,254 | 98,204 |
| 7 | 98,204 | 0 | 6,732 | (1,307) | 5,425 | 103,629 |
| 8 | 103,629 | 0 | 7,095 | (1,624) | 5,471 | 109,100 |
| 9 | 109,100 | 0 | 7,468 | (1,778) | 5,690 | 114,790 |
| 10 | 114,790 | 0 | 7,850 | (2,074) | 5,776 | 120,566 |
| 11 | 120,566 | 0 | 8,237 | (2,413) | 5,824 | 126,390 |
| 12 | 126,390 | 0 | 8,626 | (2,800) | 5,826 | 132,216 |
| 13 | 132,216 | 0 | 9,013 | (3,240) | 5,773 | 137,989 |
| 14 | 137,989 | 0 | 9,394 | (3,744) | 5,650 | 143,639 |
| 15 | 143,639 | 0 | 9,765 | (4,318) | 5,447 | 149,086 |
| 16 | 149,086 | 0 | 10,118 | (4,971) | 5,147 | 154,233 |
| 17 | 154,233 | 0 | 10,448 | (5,721) | 4,727 | 158,960 |
| 18 | 158,960 | 0 | 10,745 | (6,567) | 4,178 | 163,138 |
| 19 | 163,138 | 0 | 11,002 | (7,516) | 3,486 | 166,624 |
| 20 | 166,624 | 0 | 11,206 | (8,570) | 2,636 | 169,260 |
| 21 | 169,260 | 0 | 11,349 | (9,730) | 1,619 | 170,879 |
| 22 | 170,879 | 0 | 11,418 | (10,996) | 422 | 171,301 |
| 23 | 171,301 | 0 | 11,400 | (12,361) | (961) | 170,340 |
| 24 | 170,340 | 0 | 11,291 | (13,626) | (2,335) | 168,005 |
| 25 | 168,005 | 0 | 11,070 | (15,386) | (4,316) | 163,690 |
| 26 | 163,690 | 0 | 10,717 | (17,040) | (6,323) | 157,366 |
| 27 | 157,366 | 0 | 10,221 | (18,776) | (8,555) | 148,812 |
| 28 | 148,812 | 0 | 9,568 | (20,622) | (11,054) | 137,758 |
| 29 | 137,758 | 0 | 8,737 | (22,648) | (13,911) | 123,847 |
| 30 | 123,847 | 0 | 7,713 | (24,546) | (16,833) | 107,014 |

(1) Contributions to the taxable trust match insurance premiums.
(2) Trust interest earned on beginning year balance, plus additions to the trust.
Trust income expense for mid-year death benefits distributed.
Trust interest rate 10.0%
Trust tax rate = 31.0%
(3) Expenditures of Trust income match insurance death benefits distributed.

Copyright 1993 The Evergreen Group

--A 12--

Funding for Other Postretirement Employee Benefits Using An Indenture Plan

XYZ COMPANY
ILLUSTRATION 1
15-Sep-93
10:44 AM

SPECIMEN 13

COMPARISON OF BALANCE SHEET ASSET GROWTHS
(000's OMITTED)

| Year | Market Related Value of Plan Assets | Year End Taxable Trust Asset | Difference Between Assets | Percentage Advantage of Funding with Indenture Plan |
|---|---|---|---|---|
| 1 | $74,367 | $73,884 | $483 | 0.7% |
| 2 | 79,395 | 78,345 | 1,050 | 1.3% |
| 3 | 84,751 | 83,012 | 1,739 | 2.1% |
| 4 | 90,471 | 87,882 | 2,589 | 2.9% |
| 5 | 96,598 | 92,950 | 3,648 | 3.9% |
| 6 | 104,393 | 98,204 | 6,189 | 6.3% |
| 7 | 112,845 | 103,629 | 9,216 | 8.9% |
| 8 | 121,894 | 109,100 | 12,794 | 11.7% |
| 9 | 131,732 | 114,790 | 16,943 | 14.8% |
| 10 | 142,276 | 120,566 | 21,710 | 18.0% |
| 11 | 153,502 | 126,390 | 27,112 | 21.5% |
| 12 | 165,398 | 132,216 | 33,182 | 25.1% |
| 13 | 177,949 | 137,989 | 39,960 | 29.0% |
| 14 | 191,173 | 143,639 | 47,534 | 33.1% |
| 15 | 205,064 | 149,086 | 55,978 | 37.5% |
| 16 | 219,636 | 154,233 | 65,403 | 42.4% |
| 17 | 234,894 | 158,960 | 75,934 | 47.8% |
| 18 | 250,813 | 163,138 | 87,675 | 53.7% |
| 19 | 267,361 | 166,624 | 100,737 | 60.5% |
| 20 | 284,500 | 169,260 | 115,240 | 68.1% |
| 21 | 302,189 | 170,879 | 131,310 | 76.8% |
| 22 | 320,380 | 171,301 | 149,079 | 87.0% |
| 23 | 339,025 | 170,340 | 168,685 | 99.0% |
| 24 | 358,235 | 168,005 | 190,229 | 113.2% |
| 25 | 377,607 | 163,690 | 213,917 | 130.7% |
| 26 | 397,267 | 157,366 | 239,901 | 152.4% |
| 27 | 417,164 | 148,812 | 268,352 | 180.3% |
| 28 | 437,213 | 137,758 | 299,455 | 217.4% |
| 29 | 457,311 | 123,847 | 333,464 | 269.3% |
| 30 | 477,537 | 107,014 | 370,523 | 346.2% |

Copyright 1993 The Evergreen Group

-- A 13 --

Funding for Other Postretirement Employee Benefits Using An Indenture Plan

XYZ COMPANY
ILLUSTRATION 1
15-Sep-93
10:44 AM

SPECIMEN 14

PRESENT VALUE OF INCREASE IN NET ASSETS WITH BORROWING
(000's OMITTED)

| Year | Market Related Value of Plan Assets | Year End Loan Balance | Net After-Tax Increase in Net Assets | Annual Increase in Net Assets (1) | Present Value (2) |
|---|---|---|---|---|---|
| 1 | $74,367 | $69,097 | $5,270 | $5,270 | $4,583 |
| 2 | 79,395 | 71,480 | 7,915 | 2,645 | 5,985 |
| 3 | 84,751 | 73,867 | 10,884 | 2,969 | 7,156 |
| 4 | 90,471 | 76,244 | 14,227 | 3,343 | 8,134 |
| 5 | 96,598 | 78,589 | 18,009 | 3,782 | 8,954 |
| 6 | 104,393 | 80,879 | 23,514 | 5,505 | 10,166 |
| 7 | 112,845 | 83,082 | 29,763 | 6,249 | 11,189 |
| 8 | 121,894 | 85,063 | 36,830 | 7,067 | 12,040 |
| 9 | 131,732 | 86,977 | 44,755 | 7,925 | 12,722 |
| 10 | 142,276 | 88,678 | 53,598 | 8,843 | 13,249 |
| 11 | 153,502 | 90,114 | 63,389 | 9,791 | 13,625 |
| 12 | 165,398 | 91,225 | 74,173 | 10,784 | 13,863 |
| 13 | 177,949 | 91,944 | 86,005 | 11,832 | 13,978 |
| 14 | 191,173 | 92,190 | 98,983 | 12,977 | 13,989 |
| 15 | 205,064 | 91,873 | 113,191 | 14,208 | 13,910 |
| 16 | 219,636 | 90,889 | 128,747 | 15,556 | 13,758 |
| 17 | 234,894 | 89,113 | 145,781 | 17,034 | 13,547 |
| 18 | 250,813 | 86,414 | 164,399 | 18,619 | 13,284 |
| 19 | 267,361 | 82,648 | 184,713 | 20,314 | 12,979 |
| 20 | 284,500 | 77,665 | 206,836 | 22,122 | 12,638 |
| 21 | 302,189 | 71,305 | 230,884 | 24,048 | 12,267 |
| 22 | 320,380 | 63,404 | 256,976 | 26,092 | 11,872 |
| 23 | 339,025 | 53,795 | 285,230 | 28,255 | 11,459 |
| 24 | 358,235 | 42,504 | 315,731 | 30,501 | 11,030 |
| 25 | 377,607 | 28,962 | 348,645 | 32,914 | 10,591 |
| 26 | 397,267 | 13,179 | 384,088 | 35,443 | 10,146 |
| 27 | 417,164 | 0 | 417,164 | 38,101 | 9,582 |
| 28 | 437,213 | 0 | 437,213 | 40,671 | 8,733 |
| 29 | 457,311 | 0 | 457,311 | 42,746 | 7,943 |
| 30 | 477,537 | 0 | 477,537 | 44,772 | 7,212 |

(1) Annual increase in net assets equals after tax cash flow net of debt service plus market related value of plan assets less the loan balance.

(2) Present value is calculated on net after tax increase in net worth for each year. The discount factor is 15.00%

Copyright 1993 The Evergreen Group

Funding for Other Postretirement Employee Benefits Using An Indenture Plan

XYZ COMPANY
ILLUSTRATION 1
15-Sep-93
10:44 AM

SPECIMEN 15

AFTER TAX CASH FLOW WITH BORROWING
(000's OMITTED)

| Year | Incremental Plan Cash Flow | Annual Loan | Loan Interest Accrued | After-Tax Cash Flow (1) |
|---|---|---|---|---|
| 1 | ($69,097) | $69,097 | $0 | $0 |
| 2 | 616 | 2,383 | (2,999) | 0 |
| 3 | 715 | 2,387 | (3,102) | 0 |
| 4 | 829 | 2,377 | (3,206) | 0 |
| 5 | 964 | 2,345 | (3,309) | 0 |
| 6 | 1,121 | 2,290 | (3,411) | 0 |
| 7 | 1,307 | 2,203 | (3,510) | 0 |
| 8 | 1,624 | 1,982 | (3,606) | 0 |
| 9 | 1,778 | 1,914 | (3,692) | 0 |
| 10 | 2,074 | 1,701 | (3,775) | 0 |
| 11 | 2,413 | 1,436 | (3,849) | 0 |
| 12 | 2,800 | 1,111 | (3,911) | 0 |
| 13 | 3,240 | 719 | (3,959) | 0 |
| 14 | 3,744 | 246 | (3,990) | 0 |
| 15 | 4,318 | (317) | (4,001) | 0 |
| 16 | 4,971 | (984) | (3,987) | 0 |
| 17 | 5,721 | (1,776) | (3,945) | 0 |
| 18 | 6,567 | (2,699) | (3,868) | 0 |
| 19 | 7,516 | (3,766) | (3,750) | 0 |
| 20 | 8,570 | (4,983) | (3,587) | 0 |
| 21 | 9,730 | (6,359) | (3,371) | 0 |
| 22 | 10,996 | (7,901) | (3,095) | 0 |
| 23 | 12,361 | (9,609) | (2,752) | (0) |
| 24 | 13,626 | (11,291) | (2,335) | (0) |
| 25 | 15,386 | (13,541) | (1,845) | (0) |
| 26 | 17,040 | (15,783) | (1,257) | (0) |
| 27 | 18,776 | (13,179) | (572) | 5,025 |
| 28 | 20,622 | 0 | 0 | 20,622 |
| 29 | 22,648 | 0 | 0 | 22,648 |
| 30 | 24,546 | 0 | 0 | 24,546 |

(1) The after-tax cash flow is computed assuming borrowing to fund all incremental cash flows required by the Indenture Plan.

Copyright 1993 The Evergreen Group

APPENDIX B

Funding for Other Postretirement Employee Benefits Using An Indenture Plan

```
A:A1: (D1) @NOW
A:A2: (D7) @NOW
A:A4: 'COMPANY NAME
A:D4: [W20] 'XYZ COMPANY
A:A5: 'ILLUSTRATION NAME
A:D5: [W20] 'ILLUSTRATION 1
A:A7: 'CORPORATE TAX RATE
A:D7: (P2) [W20] 0.38
A:A8: 'TRUST TAX RATE
A:D8: (P2) [W20] 0.31
A:A9: 'TAXABLE EARNINGS RATE
A:D9: (P2) [W20] 0.1
A:A10: 'LOAN INTEREST RATE
A:D10: (P2) [W20] 0.07
A:A11: 'DISCOUNT RATE
A:D11: (P2) [W20] 0.15
A:A12: 'RETURN ON PLAN ASSETS
A:D12: (P2) [W20] +K:G47
A:A14: 'CORPORATE SHARES OUTSTANDING
A:D14: (,0) [W20] 100000000
A:A17: 'ACTUARIAL AND FINANCIAL ASSUMPTIONS
A:E17: 'SPECIMEN 1
A:A18: 'PAY-AS-YOU-GO RETIREE COST
A:E18: 'SPECIMEN 2
A:A19: 'ACCRUED RETIREE COST
A:E19: 'SPECIMEN 3
A:A20: 'CASH FLOW ANALYSIS
A:E20: 'SPECIMEN 4
A:A21: 'EARNINGS AMOUNT
A:E21: 'SPECIMEN 5
A:A22: 'RETIREE OPEB COST LIABILITY OFFSET
A:E22: 'SPECIMEN 6
A:A23: 'ANNUAL INCOME STATEMENT EFFECT
A:E23: 'SPECIMEN 7
A:A24: 'ANNUAL SAVINGS PER SHARE EFFECT
A:E24: 'SPECIMEN 8
A:A25: 'DEFERRED TAX ANALYSIS
A:E25: 'SPECIMEN 9
A:A26: 'RATE OF RETURN ON  INDENTURE PLAN
A:E26: 'SPECIMEN 10
A:A27: (C0) 'INCOME STATEMENT EFFECT WITH BORROWING
A:E27: 'SPECIMEN 11
A:A28: 'ASSET GROWTH IN A TAXABLE TRUST
A:E28: 'SPECIMEN 12
A:A29: ^COMPARISON OF BALANCE SHEET ASSET GROWTHS
A:E29: 'SPECIMEN 13
A:A30: (C0) 'PRESENT VALUE OF INCREASE IN NET ASSETS WITH BORROWING
A:E30: 'SPECIMEN 14
A:A31: (C0) 'AFTER TAX CASH FLOW WITH BORROWING
A:E31: 'SPECIMEN 15
A:A61: |::
```

Copyright 1993 The Evergreen Group

Funding for Other Postretirement Employee Benefits Using An Indenture Plan

```
B:A1: +$A:$D$4
B:A2: +$A:$D$5
B:A3: (D1) @NOW
B:A4: (D7) @NOW
B:F5: "BOOK
B:E6: "BOOK
B:F6: "ACCRUED
B:B7: "YEAR
B:C7: "PAYG
B:E7: "EXPENSE
B:F7: "LIABILITY
B:G7: "PREMIUM
B:H7: "DBENS
B:I7: "CASHVAL
B:J7: "SURRVAL
B:B8: "-----
B:C8: (,0) "- - - -
B:E8: "- - - -
B:F8: "+ + + +
B:G8: (,0) "- - - -
B:H8: "+ + + +
B:I8: "+ + + +
B:J8: "+ + + +
B:B9: 1
B:C9: (,0) -4774.318
B:E9: (,0) -11300.54789
B:F9: (,0) 106798.106
B:G9: (,0) -69648
B:H9: (,0) 551
B:I9: (,0) 69510
B:J9: (C0) 0
B:B10: 2
B:C10: (,0) -5328.542
B:E10: (,0) -11943.152165
B:F10: (,0) 113412.716
B:G10: (,0) 0
B:H10: (,0) 616
B:I10: (,0) 75489
B:J10: (,0) 0
B:B11: 3
B:C11: (,0) -6005.413
B:E11: (,0) -12595.97984
B:F11: (,0) 120003.284
B:G11: (,0) 0
B:H11: (,0) 715
B:I11: (,0) 81961
B:J11: (,0) 0
B:B12: 4
B:C12: (,0) -6645.48
B:E12: (,0) -13228.01109
B:F12: (,0) 126585.814
B:G12: (,0) 0
B:H12: (,0) 829
B:I12: (,0) 88920
B:J12: (,0) 0
B:B13: 5
B:C13: (,0) -7052.084
B:E13: (,0) -13914.45403
B:F13: (,0) 133448.185
B:G13: (,0) 0
B:H13: (,0) 964
B:I13: (,0) 96426
B:J13: (,0) 0
B:B14: 6
B:C14: (,0) -7453.521
B:E14: (,0) -14622.239805
B:F14: (,0) 140616.903
B:G14: (,0) 0
B:H14: (,0) 1121
B:I14: (,0) 104498
```

Copyright 1993 The Evergreen Group

-- B2 --

Funding for Other Postretirement Employee Benefits Using An Indenture Plan

B:J14: (,0) 0
B:B15: 7
B:C15: (,0) -8136.279
B:E15: (,0) -15332.7452
B:F15: (,0) 147813.369
B:G15: (,0) 0
B:H15: (,0) 1307
B:I15: (,0) 113171
B:J15: (,0) 0
B:B16: 8
B:C16: (,0) -8819.182
B:E16: (,0) -16071.68676
B:F16: (,0) 155065.873
B:G16: (,0) 0
B:H16: (,0) 1624
B:I16: (,0) 122482
B:J16: (,0) 0
B:B17: 9
B:C17: (,0) -9497.941
B:E17: (,0) -16864.51888
B:F17: (,0) 162432.451
B:G17: (,0) 0
B:H17: (,0) 1778
B:I17: (,0) 132457
B:J17: (,0) 0
B:B18: 10
B:C18: (,0) -10153.499
B:E18: (,0) -17728.138855
B:F18: (,0) 170007.09
B:G18: (,0) 0
B:H18: (,0) 2074
B:I18: (,0) 143120
B:J18: (,0) 0
B:B19: 11
B:C19: (,0) -10785.889
B:E19: (,0) -18669.204735
B:F19: (,0) 177890.406
B:G19: (,0) 0
B:H19: (,0) 2413
B:I19: (,0) 154351
B:J19: (,0) 0
B:B20: 12
B:C20: (,0) -11560.75
B:E20: (,0) -19589.93527
B:F20: (,0) 185919.591
B:G20: (,0) 0
B:H20: (,0) 2800
B:I20: (,0) 166158
B:J20: (,0) 0
B:B21: 13
B:C21: (,0) -12254.731
B:E21: (,0) -20577.921425
B:F21: (,0) 194242.781
B:G21: (,0) 0
B:H21: (,0) 3240
B:I21: (,0) 178690
B:J21: (,0) 0
B:B22: 14
B:C22: (,0) -12827.395
B:E22: (,0) -21650.24761
B:F22: (,0) 203065.634
B:G22: (,0) 0
B:H22: (,0) 3744
B:I22: (,0) 191956
B:J22: (,0) 0
B:B23: 15
B:C23: (,0) -13413.316
B:E23: (,0) -22817.467395
B:F23: (,0) 212469.786
B:G23: (,0) 0

Copyright 1993 The Evergreen Group

--B3--

Funding for Other Postretirement Employee Benefits Using An Indenture Plan

```
B:H23: (,0) 4318
B:I23: (,0) 205958
B:J23: (,0) 0
B:B24: 16
B:C24: (,0) -14019.943
B:E24: (,0) -24085.593725
B:F24: (,0) 222535.436
B:G24: (,0) 0
B:H24: (,0) 4971
B:I24: (,0) 220684
B:J24: (,0) 0
B:B25: 17
B:C25: (,0) -14534.007
B:E25: (,0) -25444.1113
B:F25: (,0) 233445.54
B:G25: (,0) 0
B:H25: (,0) 5721
B:I25: (,0) 236118
B:J25: (,0) 0
B:B26: 18
B:C26: (,0) -15055.829
B:E26: (,0) -26945.37214
B:F26: (,0) 245335.082
B:G26: (,0) 0
B:H26: (,0) 6567
B:I26: (,0) 252231
B:J26: (,0) 0
B:B27: 19
B:C27: (,0) -15599.54
B:E27: (,0) -28596.739865
B:F27: (,0) 258332.282
B:G27: (,0) 0
B:H27: (,0) 7516
B:I27: (,0) 268986
B:J27: (,0) 0
B:B28: 20
B:C28: (,0) -16164.344
B:E28: (,0) -30410.641245
B:F28: (,0) 272578.58
B:G28: (,0) 0
B:H28: (,0) 8570
B:I28: (,0) 286353
B:J28: (,0) 0
B:B29: 21
B:C29: (,0) -16763.722
B:E29: (,0) -32402.809255
B:F29: (,0) 288217.666
B:G29: (,0) 0
B:H29: (,0) 9730
B:I29: (,0) 304285
B:J29: (,0) 0
B:B30: 22
B:C30: (,0) -17213.405
B:E30: (,0) -34589.718145
B:F30: (,0) 305593.978
B:G30: (,0) 0
B:H30: (,0) 10996
B:I30: (,0) 322732
B:J30: (,0) 0
B:B31: 23
B:C31: (,0) -17685.53
B:E31: (,0) -37012.076285
B:F31: (,0) 324920.524
B:G31: (,0) 0
B:H31: (,0) 12361
B:I31: (,0) 341643
B:J31: (,0) 0
B:B32: 24
B:C32: (,0) -18184.306
B:E32: (,0) -39690.805215
```

Copyright 1993 The Evergreen Group

Funding for Other Postretirement Employee Benefits Using An Indenture Plan

```
B:F32: (,0) 346427.023
B:G32: (,0) 0
B:H32: (,0) 13626
B:I32: (,0) 360967
B:J32: (,0) 0
B:B33: 25
B:C33: (,0) -18785.506
B:E33: (,0) -42276.62964
B:F33: (,0) 369918.147
B:G33: (,0) 0
B:H33: (,0) 15386
B:I33: (,0) 380649
B:J33: (,0) 0
B:B34: 26
B:C34: (,0) -19542.879
B:E34: (,0) -44821.906295
B:F34: (,0) 395197.174
B:G34: (,0) 0
B:H34: (,0) 17040
B:I34: (,0) 400632
B:J34: (,0) 0
B:B35: 27
B:C35: (,0) -20430.572
B:E35: (,0) -47604.50254
B:F35: (,0) 422371.103
B:G35: (,0) 0
B:H35: (,0) 18776
B:I35: (,0) 420860
B:J35: (,0) 0
B:B36: 28
B:C36: (,0) -21581.733
B:E36: (,0) -50593.18498
B:F36: (,0) 451382.555
B:G36: (,0) 0
B:H36: (,0) 20622
B:I36: (,0) 441250
B:J36: (,0) 0
B:B37: 29
B:C37: (,0) -22998.699
B:E37: (,0) -53773.62813
B:F37: (,0) 482157.483
B:G37: (,0) 0
B:H37: (,0) 22648
B:I37: (,0) 461737
B:J37: (,0) 0
B:B38: 30
B:C38: (,0) -24700.047
B:E38: (,0) -57138.877945
B:F38: (,0) 514596.322
B:G38: (,0) 0
B:H38: (,0) 24546
B:I38: (,0) 482257
B:J38: (,0) 0
B:B39: "--------
B:C39: "--------
B:E39: "--------
B:F39: "--------
B:G39: "--------
B:H39: "--------
B:I39: "--------
B:J39: "--------
B:B40: "Totals
B:C40: (,0) @SUM(C39..C8)
B:G40: (,0) @SUM(G39..G8)
B:A61: |::
```

Copyright 1993 The Evergreen Group

Funding for Other Postretirement Employee Benefits Using An Indenture Plan

```
C:A1: (D1) +B:A1
C:J1: +$A:E17
C:A2: +$A:$D$5
C:A3: (D1) +B:A3
C:D3: '       ACTUARIAL AND FINANCIAL ASSUMPTIONS
C:A4: (D7) +B:A4
C:B7: 'CENSUS PROJECTIONS:
C:C8: 'CENSUS TYPE
C:H8: 'OPEN
C:C9: 'NUMBER OF RETIREES
C:H9: ' 3,755
C:C10: 'NUMBER OF ACTIVE EMPLOYEES
C:H10: ' 8,041
C:C11: 'PERCENTAGE OF RETIREES WITH DEPENDENT COVERAGE
C:H11: '70.00%
C:B14: 'ACTUARIAL ASSUMPTIONS:
C:C15: 'TERMINATION RATES
C:H15: (,0) 'COMPANY SUPPLIED
C:C16: 'DISABILITY RATES
C:H16: (,0) 'COMPANY SUPPLIED
C:C17: 'RETIREMENT RATES
C:H17: (,0) 'COMPANY SUPPLIED
C:C18: 'MORTALITY RATES
C:H18: (,0) 'COMPANY SUPPLIED
C:B20: 'MEDICAL COST TREND:
C:C21: 'YEAR 1
C:H21: '12.00%
C:C22: 'YEAR 2
C:H22: '11.50%
C:C23: 'YEAR 3
C:H23: '11.00%
C:C24: 'YEAR 4
C:H24: '10.50%
C:C25: 'YEAR 5
C:H25: '10.00%
C:C26: 'YEAR 6
C:H26: ' 9.50%
C:C27: 'YEAR 7
C:H27: ' 9.00%
C:C28: 'YEAR 8
C:H28: ' 8.50%
C:C29: 'YEAR 9
C:H29: ' 8.00%
C:C30: 'YEAR 10
C:H30: ' 7.00%
C:C31: 'YEAR 11+
C:H31: ' 6.00%
C:B33: 'AVERAGE PRE-65 COSTS:
C:H33: '$3,500
C:B34: 'AVERAGE POST-65 COSTS:
C:H34: '  $500
C:B36: 'INTEREST RATES:
C:C38: 'MEDICAL COST DISCOUNT RATE
C:H38: ' 8.50%
C:C39: 'PRE-TAX CORPORATE BORROWING RATE
C:H39: (,0) ' 7.00%
C:B41: 'TAX RATES:
C:C42: 'TRUST TAX RATE
C:H42: '31.00%
C:C43: 'CORPORATE TAX RATE
C:H43: (,0) '38.00%
C:B45: 'EARNINGS RATES:
C:C46: 'VARIABLE CONTRACT ASSETS NET EARNINGS
C:H46: (P2) '10.00%
C:C47: 'TAXABLE TRUST ASSETS PRE-TAX EARNINGS
C:H47: (P2) '10.00%
C:B50: 'TRANSITION OBLIGATION:
C:H50: "$100,271,876
C:B51: '     1992 FULL RECOGNITION
C:B53: 'DEATH BENEFITS:
```

Copyright 1993 The Evergreen Group

-- B6 --

Funding for Other Postretirement Employee Benefits Using An Indenture Plan

C:H53: 'NONE REINVESTED
C:A61: |::

Copyright 1993 The Evergreen Group

Funding for Other Postretirement Employee Benefits Using An Indenture Plan

```
D:A1: [W12] +$A:$D$4
D:J1: +$A:E18
D:A2: [W12] +$A:$D$5
D:A3: (D1) [W12] @NOW
D:E3: 'PAY-AS-YOU-GO RETIREE COST
D:A4: (D7) [W12] @NOW
D:E4: '       (000's OMITTED)
D:F7: "After-Tax
D:E8: "Annual
D:F8: "Annual
D:G8: "Cost
D:E9: "Retiree
D:F9: "Medical
D:G9: "per Share
D:E10: "Medical
D:F10: "Cost
D:G10: "($)
D:D11: "Year
D:E11: "Cost
D:F11: "(1)
D:G11: "(2)
D:D12: "--------
D:E12: "--------
D:F12: "--------
D:G12: "--------
D:D13: 1
D:E13: (C0) +B:B9
D:F13: (C0) +E13*(1-$F$51)
D:G13: (F2) +F13/$F$52*1000
D:D14: 2
D:E14: (,0) +B:B10
D:F14: (,0) +E14*(1-$F$51)
D:G14: (F2) +F14/$F$52*1000
D:D15: 3
D:E15: (,0) +B:B11
D:F15: (,0) +E15*(1-$F$51)
D:G15: (F2) +F15/$F$52*1000
D:D16: 4
D:E16: (,0) +B:B12
D:F16: (,0) +E16*(1-$F$51)
D:G16: (F2) +F16/$F$52*1000
D:D17: 5
D:E17: (,0) +B:B13
D:F17: (,0) +E17*(1-$F$51)
D:G17: (F2) +F17/$F$52*1000
D:D19: 6
D:E19: (,0) +B:B14
D:F19: (,0) +E19*(1-$F$51)
D:G19: (F2) +F19/$F$52*1000
D:D20: 7
D:E20: (,0) +B:B15
D:F20: (,0) +E20*(1-$F$51)
D:G20: (F2) +F20/$F$52*1000
D:D21: 8
D:E21: (,0) +B:B16
D:F21: (,0) +E21*(1-$F$51)
D:G21: (F2) +F21/$F$52*1000
D:D22: 9
D:E22: (,0) +B:B17
D:F22: (,0) +E22*(1-$F$51)
D:G22: (F2) +F22/$F$52*1000
D:D23: 10
D:E23: (,0) +B:B18
D:F23: (,0) +E23*(1-$F$51)
D:G23: (F2) +F23/$F$52*1000
D:D25: 11
D:E25: (,0) +B:B19
D:F25: (,0) +E25*(1-$F$51)
D:G25: (F2) +F25/$F$52*1000
D:D26: 12
```

Copyright 1993 The Evergreen Group

-- B8 --

Funding for Other Postretirement Employee Benefits Using An Indenture Plan

```
D:E26: (,0) +B:B20
D:F26: (,0) +E26*(1-$F$51)
D:G26: (F2) +F26/$F$52*1000
D:D27: 13
D:E27: (,0) +B:B21
D:F27: (,0) +E27*(1-$F$51)
D:G27: (F2) +F27/$F$52*1000
D:D28: 14
D:E28: (,0) +B:B22
D:F28: (,0) +E28*(1-$F$51)
D:G28: (F2) +F28/$F$52*1000
D:D29: 15
D:E29: (,0) +B:B23
D:F29: (,0) +E29*(1-$F$51)
D:G29: (F2) +F29/$F$52*1000
D:D31: 16
D:E31: (,0) +B:B24
D:F31: (,0) +E31*(1-$F$51)
D:G31: (F2) +F31/$F$52*1000
D:D32: 17
D:E32: (,0) +B:B25
D:F32: (,0) +E32*(1-$F$51)
D:G32: (F2) +F32/$F$52*1000
D:D33: 18
D:E33: (,0) +B:B26
D:F33: (,0) +E33*(1-$F$51)
D:G33: (F2) +F33/$F$52*1000
D:D34: 19
D:E34: (,0) +B:B27
D:F34: (,0) +E34*(1-$F$51)
D:G34: (F2) +F34/$F$52*1000
D:D35: 20
D:E35: (,0) +B:B28
D:F35: (,0) +E35*(1-$F$51)
D:G35: (F2) +F35/$F$52*1000
D:D37: 21
D:E37: (,0) +B:B29
D:F37: (,0) +E37*(1-$F$51)
D:G37: (F2) +F37/$F$52*1000
D:D38: 22
D:E38: (,0) +B:B30
D:F38: (,0) +E38*(1-$F$51)
D:G38: (F2) +F38/$F$52*1000
D:D39: 23
D:E39: (,0) +B:B31
D:F39: (,0) +E39*(1-$F$51)
D:G39: (F2) +F39/$F$52*1000
D:D40: 24
D:E40: (,0) +B:B32
D:F40: (,0) +E40*(1-$F$51)
D:G40: (F2) +F40/$F$52*1000
D:D41: 25
D:E41: (,0) +B:B33
D:F41: (,0) +E41*(1-$F$51)
D:G41: (F2) +F41/$F$52*1000
D:D43: 26
D:E43: (,0) +B:B34
D:F43: (,0) +E43*(1-$F$51)
D:G43: (F2) +F43/$F$52*1000
D:D44: 27
D:E44: (,0) +B:B35
D:F44: (,0) +E44*(1-$F$51)
D:G44: (F2) +F44/$F$52*1000
D:D45: 28
D:E45: (,0) +B:B36
D:F45: (,0) +E45*(1-$F$51)
D:G45: (F2) +F45/$F$52*1000
D:D46: 29
D:E46: (,0) +B:B37
D:F46: (,0) +E46*(1-$F$51)
```

Copyright 1993 The Evergreen Group

Funding for Other Postretirement Employee Benefits Using An Indenture Plan

```
D:G46: (F2) +F46/$F$52*1000
D:D47: 30
D:E47: (,0) +B:B38
D:F47: (,0) +E47*(1-$F$51)
D:G47: (F2) +F47/$F$52*1000
D:D51: '(1) Corporate tax rate =
D:F51: (P1) +$CTAX
D:D52: '(2) Shares outstanding =
D:F52: (,0) +$SHARES
D:A61: [W12] |::
```

Copyright 1993 The Evergreen Group

-- B10 --

Funding for Other Postretirement Employee Benefits Using An Indenture Plan

```
E:A1: [W11] +$A:$D$4
E:J1: [W12] +$A:E19
E:A2: [W11] +$A:$D$5
E:A3: (D1) [W11] @NOW
E:E3: [W12] '    ACCRUED RETIREE COST
E:A4: (D7) [W11] @NOW
E:E4: [W12] '       (000's OMITTED)
E:F7: [W12] "After-Tax
E:E8: [W12] "Annual
E:F8: [W12] "Annual
E:G8: [W12] "Earnings
E:E9: [W12] "Retiree
E:F9: [W12] "Medical
E:G9: [W12] "per Share
E:E10: [W12] "Medical
E:F10: [W12] "Expense
E:G10: [W12] "($)
E:D11: [W12] "Year
E:E11: [W12] "Expense
E:F11: [W12] "(1)
E:G11: [W12] "(2)
E:D12: [W12] "--------
E:E12: [W12] "--------
E:F12: [W12] "--------
E:G12: [W12] "--------
E:D13: [W12] 1
E:E13: (C0) [W12] +B:E9
E:F13: (C0) [W12] +E13*(1-$D:$F$51)
E:G13: (F2) [W12] +F13/$D:$F$52*1000
E:D14: [W12] 2
E:E14: (,0) [W12] +B:E10
E:F14: (,0) [W12] +E14*(1-$D:$F$51)
E:G14: (F2) [W12] +F14/$D:$F$52*1000
E:D15: [W12] 3
E:E15: (,0) [W12] +B:E11
E:F15: (,0) [W12] +E15*(1-$D:$F$51)
E:G15: (F2) [W12] +F15/$D:$F$52*1000
E:D16: [W12] 4
E:E16: (,0) [W12] +B:E12
E:F16: (,0) [W12] +E16*(1-$D:$F$51)
E:G16: (F2) [W12] +F16/$D:$F$52*1000
E:D17: [W12] 5
E:E17: (,0) [W12] +B:E13
E:F17: (,0) [W12] +E17*(1-$D:$F$51)
E:G17: (F2) [W12] +F17/$D:$F$52*1000
E:D19: [W12] 6
E:E19: (,0) [W12] +B:E14
E:F19: (,0) [W12] +E19*(1-$D:$F$51)
E:G19: (F2) [W12] +F19/$D:$F$52*1000
E:D20: [W12] 7
E:E20: (,0) [W12] +B:E15
E:F20: (,0) [W12] +E20*(1-$D:$F$51)
E:G20: (F2) [W12] +F20/$D:$F$52*1000
E:D21: [W12] 8
E:E21: (,0) [W12] +B:E16
E:F21: (,0) [W12] +E21*(1-$D:$F$51)
E:G21: (F2) [W12] +F21/$D:$F$52*1000
E:D22: [W12] 9
E:E22: (,0) [W12] +B:E17
E:F22: (,0) [W12] +E22*(1-$D:$F$51)
E:G22: (F2) [W12] +F22/$D:$F$52*1000
E:D23: [W12] 10
E:E23: (,0) [W12] +B:E18
E:F23: (,0) [W12] +E23*(1-$D:$F$51)
E:G23: (F2) [W12] +F23/$D:$F$52*1000
E:D25: [W12] 11
E:E25: (,0) [W12] +B:E19
E:F25: (,0) [W12] +E25*(1-$D:$F$51)
E:G25: (F2) [W12] +F25/$D:$F$52*1000
E:D26: [W12] 12
```

Copyright 1993 The Evergreen Group

--B11--

Funding for Other Postretirement Employee Benefits Using An Indenture Plan

```
E:E26: (,0) [W12] +B:E20
E:F26: (,0) [W12] +E26*(1-$D:$F$51)
E:G26: (F2) [W12] +F26/$D:$F$52*1000
E:D27: [W12] 13
E:E27: (,0) [W12] +B:E21
E:F27: (,0) [W12] +E27*(1-$D:$F$51)
E:G27: (F2) [W12] +F27/$D:$F$52*1000
E:D28: [W12] 14
E:E28: (,0) [W12] +B:E22
E:F28: (,0) [W12] +E28*(1-$D:$F$51)
E:G28: (F2) [W12] +F28/$D:$F$52*1000
E:D29: [W12] 15
E:E29: (,0) [W12] +B:E23
E:F29: (,0) [W12] +E29*(1-$D:$F$51)
E:G29: (F2) [W12] +F29/$D:$F$52*1000
E:D31: [W12] 16
E:E31: (,0) [W12] +B:E24
E:F31: (,0) [W12] +E31*(1-$D:$F$51)
E:G31: (F2) [W12] +F31/$D:$F$52*1000
E:D32: [W12] 17
E:E32: (,0) [W12] +B:E25
E:F32: (,0) [W12] +E32*(1-$D:$F$51)
E:G32: (F2) [W12] +F32/$D:$F$52*1000
E:D33: [W12] 18
E:E33: (,0) [W12] +B:E26
E:F33: (,0) [W12] +E33*(1-$D:$F$51)
E:G33: (F2) [W12] +F33/$D:$F$52*1000
E:D34: [W12] 19
E:E34: (,0) [W12] +B:E27
E:F34: (,0) [W12] +E34*(1-$D:$F$51)
E:G34: (F2) [W12] +F34/$D:$F$52*1000
E:D35: [W12] 20
E:E35: (,0) [W12] +B:E28
E:F35: (,0) [W12] +E35*(1-$D:$F$51)
E:G35: (F2) [W12] +F35/$D:$F$52*1000
E:D37: [W12] 21
E:E37: (,0) [W12] +B:E29
E:F37: (,0) [W12] +E37*(1-$D:$F$51)
E:G37: (F2) [W12] +F37/$D:$F$52*1000
E:D38: [W12] 22
E:E38: (,0) [W12] +B:E30
E:F38: (,0) [W12] +E38*(1-$D:$F$51)
E:G38: (F2) [W12] +F38/$D:$F$52*1000
E:D39: [W12] 23
E:E39: (,0) [W12] +B:E31
E:F39: (,0) [W12] +E39*(1-$D:$F$51)
E:G39: (F2) [W12] +F39/$D:$F$52*1000
E:D40: [W12] 24
E:E40: (,0) [W12] +B:E32
E:F40: (,0) [W12] +E40*(1-$D:$F$51)
E:G40: (F2) [W12] +F40/$D:$F$52*1000
E:D41: [W12] 25
E:E41: (,0) [W12] +B:E33
E:F41: (,0) [W12] +E41*(1-$D:$F$51)
E:G41: (F2) [W12] +F41/$D:$F$52*1000
E:D43: [W12] 26
E:E43: (,0) [W12] +B:E34
E:F43: (,0) [W12] +E43*(1-$D:$F$51)
E:G43: (F2) [W12] +F43/$D:$F$52*1000
E:D44: [W12] 27
E:E44: (,0) [W12] +B:E35
E:F44: (,0) [W12] +E44*(1-$D:$F$51)
E:G44: (F2) [W12] +F44/$D:$F$52*1000
E:D45: [W12] 28
E:E45: (,0) [W12] +B:E36
E:F45: (,0) [W12] +E45*(1-$D:$F$51)
E:G45: (F2) [W12] +F45/$D:$F$52*1000
E:D46: [W12] 29
E:E46: (,0) [W12] +B:E37
E:F46: (,0) [W12] +E46*(1-$D:$F$51)
```

Copyright 1993 The Evergreen Group

Funding for Other Postretirement Employee Benefits Using An Indenture Plan

```
E:G46: (F2) [W12] +F46/$D:$F$52*1000
E:D47: [W12] 30
E:E47: (,0) [W12] +B:E38
E:F47: (,0) [W12] +E47*(1-$D:$F$51)
E:G47: (F2) [W12] +F47/$D:$F$52*1000
E:D51: [W12] '(1) Corporate tax rate =
E:F51: (P1) [W12] +$CTAX
E:D52: [W12] '(2) Shares outstanding =
E:F52: (,0) [W12] +$SHARES
E:A61: [W11] |::
```

Copyright 1993 The Evergreen Group

– – B 13 – –

Funding for Other Postretirement Employee Benefits Using An Indenture Plan

```
F:A1: +$A:$D$4
F:J1: +$A:E20
F:A2: +$A:$D$5
F:A3: (D1) @NOW
F:E3: '   CASH FLOW ANALYSIS
F:A4: (D7) @NOW
F:E4: '      (000's OMITTED)
F:I7: "After-Tax
F:C8: "Annual
F:D8: "
F:E8: "Estimated
F:F8: "Corporate
F:H8: "Annual
F:I8: "Cash Flow
F:C9: "Retiree
F:D9: "Indenture
F:E9: "Death
F:F9: "Cash
F:G9: "Annual
F:H9: "Tax
F:I9: "With
F:C10: "Medical
F:D10: "Plan
F:E10: "Benefits
F:F10: "Outlay
F:G10: "Tax
F:H10: "Savings
F:I10: "Plan
F:B11: "Year
F:C11: "Cost
F:D11: "Investment
F:E11: "Distributed
F:F11: "(1)
F:G11: "Deduction
F:H11: "(2)
F:I11: "(3)
F:B12: "--------
F:C12: "--------
F:D12: "--------
F:E12: "--------
F:F12: "--------
F:G12: "--------
F:H12: "--------
F:I12: "--------
F:B13: 1
F:C13: (C0) +B:B9
F:D13: (C0) +B:G9
F:E13: (C0) +B:H9
F:F13: (C0) @MIN(0,C13+D13+E13)
F:G13: (C0) +B:C9
F:H13: (C0) +G13*$D$53
F:I13: (C0) +F13+H13
F:B14: 2
F:C14: (,0) +B:B10
F:D14: (,0) +B:G10
F:E14: (,0) +B:H10
F:F14: (,0) @MIN(0,C14+D14+E14)
F:G14: (,0) +B:C10
F:H14: (,0) +G14*$D$53
F:I14: (,0) +F14+H14
F:B15: 3
F:C15: (,0) +B:B11
F:D15: (,0) +B:G11
F:E15: (,0) +B:H11
F:F15: (,0) @MIN(0,C15+D15+E15)
F:G15: (,0) +B:C11
F:H15: (,0) +G15*$D$53
F:I15: (,0) +F15+H15
F:B16: 4
F:C16: (,0) +B:B12
```

Copyright 1993 The Evergreen Group

Funding for Other Postretirement Employee Benefits Using An Indenture Plan

```
F:D16: (,0) +B:G12
F:E16: (,0) +B:H12
F:F16: (,0) @MIN(0,C16+D16+E16)
F:G16: (,0) +B:C12
F:H16: (,0) +G16*$D$53
F:I16: (,0) +F16+H16
F:B17: 5
F:C17: (,0) +B:B13
F:D17: (,0) +B:G13
F:E17: (,0) +B:H13
F:F17: (,0) @MIN(0,C17+D17+E17)
F:G17: (,0) +B:C13
F:H17: (,0) +G17*$D$53
F:I17: (,0) +F17+H17
F:B19: 6
F:C19: (,0) +B:B14
F:D19: (,0) +B:G14
F:E19: (,0) +B:H14
F:F19: (,0) @MIN(0,C19+D19+E19)
F:G19: (,0) +B:C14
F:H19: (,0) +G19*$D$53
F:I19: (,0) +F19+H19
F:B20: 7
F:C20: (,0) +B:B15
F:D20: (,0) +B:G15
F:E20: (,0) +B:H15
F:F20: (,0) @MIN(0,C20+D20+E20)
F:G20: (,0) +B:C15
F:H20: (,0) +G20*$D$53
F:I20: (,0) +F20+H20
F:B21: 8
F:C21: (,0) +B:B16
F:D21: (,0) +B:G16
F:E21: (,0) +B:H16
F:F21: (,0) @MIN(0,C21+D21+E21)
F:G21: (,0) +B:C16
F:H21: (,0) +G21*$D$53
F:I21: (,0) +F21+H21
F:B22: 9
F:C22: (,0) +B:B17
F:D22: (,0) +B:G17
F:E22: (,0) +B:H17
F:F22: (,0) @MIN(0,C22+D22+E22)
F:G22: (,0) +B:C17
F:H22: (,0) +G22*$D$53
F:I22: (,0) +F22+H22
F:B23: 10
F:C23: (,0) +B:B18
F:D23: (,0) +B:G18
F:E23: (,0) +B:H18
F:F23: (,0) @MIN(0,C23+D23+E23)
F:G23: (,0) +B:C18
F:H23: (,0) +G23*$D$53
F:I23: (,0) +F23+H23
F:B25: 11
F:C25: (,0) +B:B19
F:D25: (,0) +B:G19
F:E25: (,0) +B:H19
F:F25: (,0) @MIN(0,C25+D25+E25)
F:G25: (,0) +B:C19
F:H25: (,0) +G25*$D$53
F:I25: (,0) +F25+H25
F:B26: 12
F:C26: (,0) +B:B20
F:D26: (,0) +B:G20
F:E26: (,0) +B:H20
F:F26: (,0) @MIN(0,C26+D26+E26)
F:G26: (,0) +B:C20
F:H26: (,0) +G26*$D$53
F:I26: (,0) +F26+H26
```

Copyright 1993 The Evergreen Group

--B15--

Funding for Other Postretirement Employee Benefits Using An Indenture Plan

```
F:B27: 13
F:C27: (,0) +B:B21
F:D27: (,0) +B:G21
F:E27: (,0) +B:H21
F:F27: (,0) @MIN(0,C27+D27+E27)
F:G27: (,0) +B:C21
F:H27: (,0) +G27*$D$53
F:I27: (,0) +F27+H27
F:B28: 14
F:C28: (,0) +B:B22
F:D28: (,0) +B:G22
F:E28: (,0) +B:H22
F:F28: (,0) @MIN(0,C28+D28+E28)
F:G28: (,0) +B:C22
F:H28: (,0) +G28*$D$53
F:I28: (,0) +F28+H28
F:B29: 15
F:C29: (,0) +B:B23
F:D29: (,0) +B:G23
F:E29: (,0) +B:H23
F:F29: (,0) @MIN(0,C29+D29+E29)
F:G29: (,0) +B:C23
F:H29: (,0) +G29*$D$53
F:I29: (,0) +F29+H29
F:B31: 16
F:C31: (,0) +B:B24
F:D31: (,0) +B:G24
F:E31: (,0) +B:H24
F:F31: (,0) @MIN(0,C31+D31+E31)
F:G31: (,0) +B:C24
F:H31: (,0) +G31*$D$53
F:I31: (,0) +F31+H31
F:B32: 17
F:C32: (,0) +B:B25
F:D32: (,0) +B:G25
F:E32: (,0) +B:H25
F:F32: (,0) @MIN(0,C32+D32+E32)
F:G32: (,0) +B:C25
F:H32: (,0) +G32*$D$53
F:I32: (,0) +F32+H32
F:B33: 18
F:C33: (,0) +B:B26
F:D33: (,0) +B:G26
F:E33: (,0) +B:H26
F:F33: (,0) @MIN(0,C33+D33+E33)
F:G33: (,0) +B:C26
F:H33: (,0) +G33*$D$53
F:I33: (,0) +F33+H33
F:B34: 19
F:C34: (,0) +B:B27
F:D34: (,0) +B:G27
F:E34: (,0) +B:H27
F:F34: (,0) @MIN(0,C34+D34+E34)
F:G34: (,0) +B:C27
F:H34: (,0) +G34*$D$53
F:I34: (,0) +F34+H34
F:B35: 20
F:C35: (,0) +B:B28
F:D35: (,0) +B:G28
F:E35: (,0) +B:H28
F:F35: (,0) @MIN(0,C35+D35+E35)
F:G35: (,0) +B:C28
F:H35: (,0) +G35*$D$53
F:I35: (,0) +F35+H35
F:B37: 21
F:C37: (,0) +B:B29
F:D37: (,0) +B:G29
F:E37: (,0) +B:H29
F:F37: (,0) @MIN(0,C37+D37+E37)
F:G37: (,0) +B:C29
```

Copyright 1993 The Evergreen Group

-- B16 --

Funding for Other Postretirement Employee Benefits Using An Indenture Plan

```
F:H37: (,0) +G37*$D$53
F:I37: (,0) +F37+H37
F:B38: 22
F:C38: (,0) +B:B30
F:D38: (,0) +B:G30
F:E38: (,0) +B:H30
F:F38: (,0) @MIN(0,C38+D38+E38)
F:G38: (,0) +B:C30
F:H38: (,0) +G38*$D$53
F:I38: (,0) +F38+H38
F:B39: 23
F:C39: (,0) +B:B31
F:D39: (,0) +B:G31
F:E39: (,0) +B:H31
F:F39: (,0) @MIN(0,C39+D39+E39)
F:G39: (,0) +B:C31
F:H39: (,0) +G39*$D$53
F:I39: (,0) +F39+H39
F:B40: 24
F:C40: (,0) +B:B32
F:D40: (,0) +B:G32
F:E40: (,0) +B:H32
F:F40: (,0) @MIN(0,C40+D40+E40)
F:G40: (,0) +B:C32
F:H40: (,0) +G40*$D$53
F:I40: (,0) +F40+H40
F:B41: 25
F:C41: (,0) +B:B33
F:D41: (,0) +B:G33
F:E41: (,0) +B:H33
F:F41: (,0) @MIN(0,C41+D41+E41)
F:G41: (,0) +B:C33
F:H41: (,0) +G41*$D$53
F:I41: (,0) +F41+H41
F:B43: 26
F:C43: (,0) +B:B34
F:D43: (,0) +B:G34
F:E43: (,0) +B:H34
F:F43: (,0) @MIN(0,C43+D43+E43)
F:G43: (,0) +B:C34
F:H43: (,0) +G43*$D$53
F:I43: (,0) +F43+H43
F:B44: 27
F:C44: (,0) +B:B35
F:D44: (,0) +B:G35
F:E44: (,0) +B:H35
F:F44: (,0) @MIN(0,C44+D44+E44)
F:G44: (,0) +B:C35
F:H44: (,0) +G44*$D$53
F:I44: (,0) +F44+H44
F:B45: 28
F:C45: (,0) +B:B36
F:D45: (,0) +B:G36
F:E45: (,0) +B:H36
F:F45: (,0) @MIN(0,C45+D45+E45)
F:G45: (,0) +B:C36
F:H45: (,0) +G45*$D$53
F:I45: (,0) +F45+H45
F:B46: 29
F:C46: (,0) +B:B37
F:D46: (,0) +B:G37
F:E46: (,0) +B:H37
F:F46: (,0) @MIN(0,C46+D46+E46)
F:G46: (,0) +B:C37
F:H46: (,0) +G46*$D$53
F:I46: (,0) +F46+H46
F:B47: 30
F:C47: (,0) +B:B38
F:D47: (,0) +B:G38
F:E47: (,0) +B:H38
```

Copyright 1993 The Evergreen Group

Funding for Other Postretirement Employee Benefits Using An Indenture Plan

```
F:F47: (,0) @MIN(0,C47+D47+E47)
F:G47: (,0) +B:C38
F:H47: (,0) +G47*$D$53
F:I47: (,0) +F47+H47
F:B51: '(1) Corporate cash outlay equals annual retiree expense plus annual premium plus death benefits.
F:B52: '    Corporate cash outlay must always be less than or equal to zero.
F:B53: '(2) Corporate tax rate =
F:D53: (P1) +$CTAX
F:B54: '(3) After-tax cash flow equals corporate cash outlay less tax savings.
F:A61: |::
```

Copyright 1993 The Evergreen Group

-- B18 --

Funding for Other Postretirement Employee Benefits Using An Indenture Plan

```
G:A1: (D1) +$A:$D$4
G:J1: [W12] +$A:E21
G:A2: +$A:$D$5
G:A3: (D1) +F:A3
G:E3: '       EARNINGS AMOUNT
G:A4: (D7) +F:A4
G:E4: '       (000's OMITTED)
G:L4: 'Computation of Book P&L Effect Under SFAS # 106
G:L5: 'Asssuming a Level Rate of Return on Assets
G:I7: [W11] "Corporate
G:J7: [W12] "Market
G:L7: 'RATE OF RETURN
G:O7: (P2) +$A:$D$12
G:C8: "Accumulation
G:D8: "Year-End
G:E8: "
G:H8: [W11] "
G:I8: [W11] "Earnings
G:J8: [W12] "Related
G:L8: 'YEARS OF AMORTIZATION
G:O8: 5
G:B9: "Year End
G:C9: "of Cash
G:D9: "Cash Value
G:E9: "Indenture
G:F9: "Annual
G:G9: "Death
G:H9: [W11] "Indenture
G:I9: [W11] "From
G:J9: [W12] "Value of
G:B10: "Contract
G:C10: "Reserves
G:D10: "of Plan
G:E10: "Plan
G:F10: "Investment
G:G10: "Benefits
G:H10: [W11] "Plan
G:I10: [W11] "Plan
G:J10: [W12] "Plan
G:S10: ^ANNUAL
G:T10: ^AMORT.
G:A11: "Year
G:B11: "Cash Value
G:C11: "(1)
G:D11: "(2)
G:E11: "Investment
G:F11: "Growth
G:G11: "Distributed
G:H11: [W11] "Income
G:I11: [W11] "(3)
G:J11: [W12] "Assets
G:R11: ^YEAR
G:S11: ^DIFFERENCE
G:T11: ^AMOUNT
G:A12: "--------
G:B12: "--------
G:C12: "--------
G:D12: "--------
G:E12: "--------
G:F12: "--------
G:G12: "--------
G:H12: [W11] "--------
G:I12: [W11] "--------
G:J12: [W12] "--------
G:R12: \*
G:S12: \*
G:T12: \*
G:A13: 1
G:B13: (C0) +B:I9
G:C13: (,0) @MAX(0,(F:C13+F:E13))*((1+$F$53*(1-$F$63))^0.5)+C12*(1+$F$53*(1-$F$63))
```

Copyright 1993 The Evergreen Group

--B19--

Funding for Oth. Postretirement Employee Benefits Using An Indenture Plan

```
G:D13: (C0) +B13+C13
G:E13: (C0) +B:G9
G:F13: (C0) +D13-D12+E13
G:G13: (C0) @MIN(-F:C13,F:E13)
G:H13: (C0) [W11] +G13+F13
G:I13: (C0) [W11] (-B:G9+J12)*$O$7
G:J13: (C0) [W12] (-B:G9+J12)*(1+$O$7)-@SUM(T9..T13)-G13
G:R13: 1
G:S13: (,0) +I13-H13
G:T13: (,0) +S13/$O$8
G:A14: 2
G:B14: (,0) +B:I10
G:C14: (,0) @MAX(0,(F:C14+F:E14))*((1+$F$53*(1-$F$63))^0.5)+C13*(1+$F$53*(1-$F$63))
G:D14: (,0) +B14+C14
G:E14: (,0) +B:G10
G:F14: (,0) +D14-D13+E14
G:G14: (,0) @MIN(-F:C14,F:E14)
G:H14: (,0) [W11] +G14+F14
G:I14: (,0) [W11] (-B:G10+J13)*$O$7
G:J14: (,0) [W12] (-B:G10+J13)*(1+$O$7)-@SUM(T10..T14)-G14
G:R14: +R13+1
G:S14: (,0) +I14-H14
G:T14: (,0) +S14/$O$8
G:A15: 3
G:B15: (,0) +B:I11
G:C15: (,0) @MAX(0,(F:C15+F:E15))*((1+$F$53*(1-$F$63))^0.5)+C14*(1+$F$53*(1-$F$63))
G:D15: (,0) +B15+C15
G:E15: (,0) +B:G11
G:F15: (,0) +D15-D14+E15
G:G15: (,0) @MIN(-F:C15,F:E15)
G:H15: (,0) [W11] +G15+F15
G:I15: (,0) [W11] (-B:G11+J14)*$O$7
G:J15: (,0) [W12] (-B:G11+J14)*(1+$O$7)-@SUM(T11..T15)-G15
G:R15: +R14+1
G:S15: (,0) +I15-H15
G:T15: (,0) +S15/$O$8
G:A16: 4
G:B16: (,0) +B:I12
G:C16: (,0) @MAX(0,(F:C16+F:E16))*((1+$F$53*(1-$F$63))^0.5)+C15*(1+$F$53*(1-$F$63))
G:D16: (,0) +B16+C16
G:E16: (,0) +B:G12
G:F16: (,0) +D16-D15+E16
G:G16: (,0) @MIN(-F:C16,F:E16)
G:H16: (,0) [W11] +G16+F16
G:I16: (,0) [W11] (-B:G12+J15)*$O$7
G:J16: (,0) [W12] (-B:G12+J15)*(1+$O$7)-@SUM(T12..T16)-G16
G:R16: +R15+1
G:S16: (,0) +I16-H16
G:T16: (,0) +S16/$O$8
G:A17: 5
G:B17: (,0) +B:I13
G:C17: (,0) @MAX(0,(F:C17+F:E17))*((1+$F$53*(1-$F$63))^0.5)+C16*(1+$F$53*(1-$F$63))
G:D17: (,0) +B17+C17
G:E17: (,0) +B:G13
G:F17: (,0) +D17-D16+E17
G:G17: (,0) @MIN(-F:C17,F:E17)
G:H17: (,0) [W11] +G17+F17
G:I17: (,0) [W11] (-B:G13+J16)*$O$7
G:J17: (,0) [W12] (-B:G13+J16)*(1+$O$7)-@SUM(T13..T17)-G17
G:R17: +R16+1
G:S17: (,0) +I17-H17
G:T17: (,0) +S17/$O$8
G:R18: +R17+1
G:S18: (,0) +I19-H19
G:T18: (,0) +S18/$O$8
G:A19: 6
G:B19: (,0) +B:I14
G:C19: (,0) @MAX(0,(F:C19+F:E19))*((1+$F$53*(1-$F$63))^0.5)+C18*(1+$F$53*(1-$F$63))
G:D19: (,0) +B19+C19
G:E19: (,0) +B:G14
```

Copyright 1993 The Evergreen Group

-- B20 --

Funding for Oth. ostretirement Employee Benefits Using An I..enture Plan

```
G:F19: (,0) +D19-D17+E19
G:G19: (,0) @MIN(-F:C19,F:E19)
G:H19: (,0) [W11] +G19+F19
G:I19: (,0) [W11] (-B:G14+J17)*$O$7
G:J19: (,0) [W12] (-B:G14+J17)*(1+$O$7)-@SUM(T14..T18)-G19
G:R19: +R18+1
G:S19: (,0) +I20-H20
G:T19: (,0) +S19/$O$8
G:A20: 7
G:B20: (,0) +B:I15
G:C20: (,0) @MAX(0,(F:C20+F:E20))*((1+$F$53*(1-$F$63))^0.5)+C19*(1+$F$53*(1-$F$63))
G:D20: (,0) +B20+C20
G:E20: (,0) +B:G15
G:F20: (,0) +D20-D19+E20
G:G20: (,0) @MIN(-F:C20,F:E20)
G:H20: (,0) [W11] +G20+F20
G:I20: (,0) [W11] (-B:G15+J19)*$O$7
G:J20: (,0) [W12] (-B:G15+J19)*(1+$O$7)-@SUM(T15..T19)-G20
G:R20: +R19+1
G:S20: (,0) +I21-H21
G:T20: (,0) +S20/$O$8
G:A21: 8
G:B21: (,0) +B:I16
G:C21: (,0) @MAX(0,(F:C21+F:E21))*((1+$F$53*(1-$F$63))^0.5)+C20*(1+$F$53*(1-$F$63))
G:D21: (,0) +B21+C21
G:E21: (,0) +B:G16
G:F21: (,0) +D21-D20+E21
G:G21: (,0) @MIN(-F:C21,F:E21)
G:H21: (,0) [W11] +G21+F21
G:I21: (,0) [W11] (-B:G16+J20)*$O$7
G:J21: (,0) [W12] (-B:G16+J20)*(1+$O$7)-@SUM(T16..T20)-G21
G:R21: +R20+1
G:S21: (,0) +I22-H22
G:T21: (,0) +S21/$O$8
G:A22: 9
G:B22: (,0) +B:I17
G:C22: (,0) @MAX(0,(F:C22+F:E22))*((1+$F$53*(1-$F$63))^0.5)+C21*(1+$F$53*(1-$F$63))
G:D22: (,0) +B22+C22
G:E22: (,0) +B:G17
G:F22: (,0) +D22-D21+E22
G:G22: (,0) @MIN(-F:C22,F:E22)
G:H22: (,0) [W11] +G22+F22
G:I22: (,0) [W11] (-B:G17+J21)*$O$7
G:J22: (,0) [W12] (-B:G17+J21)*(1+$O$7)-@SUM(T17..T21)-G22
G:R22: +R21+1
G:S22: (,0) +I23-H23
G:T22: (,0) +S22/$O$8
G:A23: 10
G:B23: (,0) +B:I18
G:C23: (,0) @MAX(0,(F:C23+F:E23))*((1+$F$53*(1-$F$63))^0.5)+C22*(1+$F$53*(1-$F$63))
G:D23: (,0) +B23+C23
G:E23: (,0) +B:G18
G:F23: (,0) +D23-D22+E23
G:G23: (,0) @MIN(-F:C23,F:E23)
G:H23: (,0) [W11] +G23+F23
G:I23: (,0) [W11] (-B:G18+J22)*$O$7
G:J23: (,0) [W12] (-B:G18+J22)*(1+$O$7)-@SUM(T18..T22)-G23
G:R23: +R22+1
G:S23: (,0) +I25-H25
G:T23: (,0) +S23/$O$8
G:R24: +R23+1
G:S24: (,0) +I26-H26
G:T24: (,0) +S24/$O$8
G:A25: 11
G:B25: (,0) +B:I19
G:C25: (,0) @MAX(0,(F:C25+F:E25))*((1+$F$53*(1-$F$63))^0.5)+C24*(1+$F$53*(1-$F$63))
G:D25: (,0) +B25+C25
G:E25: (,0) +B:G19
G:F25: (,0) +D25-D23+E25
G:G25: (,0) @MIN(-F:C25,F:E25)
```

Copyright 1993 The Evergreen Group

Funding for Othe Postretirement Employee Benefits Using An Indenture Plan

```
G:H25: (,0) [W11] +G25+F25
G:I25: (,0) [W11] (-B:G19+J23)*$O$7
G:J25: (,0) [W12] (-B:G19+J23)*(1+$O$7)-@SUM(T19..T23)-G25
G:R25: +R24+1
G:S25: (,0) +I27-H27
G:T25: (,0) +S25/$O$8
G:A26: 12
G:B26: (,0) +B:I20
G:C26: (,0) @MAX(0,(F:C26+F:E26))*((1+$F$53*(1-$F$63))^0.5)+C25*(1+$F$53*(1-$F$63))
G:D26: (,0) +B26+C26
G:E26: (,0) +B:G20
G:F26: (,0) +D26-D25+E26
G:G26: (,0) @MIN(-F:C26,F:E26)
G:H26: (,0) [W11] +G26+F26
G:I26: (,0) [W11] (-B:G20+J25)*$O$7
G:J26: (,0) [W12] (-B:G20+J25)*(1+$O$7)-@SUM(T20..T24)-G26
G:R26: +R25+1
G:S26: (,0) +I28-H28
G:T26: (,0) +S26/$O$8
G:A27: 13
G:B27: (,0) +B:I21
G:C27: (,0) @MAX(0,(F:C27+F:E27))*((1+$F$53*(1-$F$63))^0.5)+C26*(1+$F$53*(1-$F$63))
G:D27: (,0) +B27+C27
G:E27: (,0) +B:G21
G:F27: (,0) +D27-D26+E27
G:G27: (,0) @MIN(-F:C27,F:E27)
G:H27: (,0) [W11] +G27+F27
G:I27: (,0) [W11] (-B:G21+J26)*$O$7
G:J27: (,0) [W12] (-B:G21+J26)*(1+$O$7)-@SUM(T21..T25)-G27
G:R27: +R26+1
G:S27: (,0) +I29-H29
G:T27: (,0) +S27/$O$8
G:A28: 14
G:B28: (,0) +B:I22
G:C28: (,0) @MAX(0,(F:C28+F:E28))*((1+$F$53*(1-$F$63))^0.5)+C27*(1+$F$53*(1-$F$63))
G:D28: (,0) +B28+C28
G:E28: (,0) +B:G22
G:F28: (,0) +D28-D27+E28
G:G28: (,0) @MIN(-F:C28,F:E28)
G:H28: (,0) [W11] +G28+F28
G:I28: (,0) [W11] (-B:G22+J27)*$O$7
G:J28: (,0) [W12] (-B:G22+J27)*(1+$O$7)-@SUM(T22..T26)-G28
G:R28: +R27+1
G:S28: (,0) +I31-H31
G:T28: (,0) +S28/$O$8
G:A29: 15
G:B29: (,0) +B:I23
G:C29: (,0) @MAX(0,(F:C29+F:E29))*((1+$F$53*(1-$F$63))^0.5)+C28*(1+$F$53*(1-$F$63))
G:D29: (,0) +B29+C29
G:E29: (,0) +B:G23
G:F29: (,0) +D29-D28+E29
G:G29: (,0) @MIN(-F:C29,F:E29)
G:H29: (,0) [W11] +G29+F29
G:I29: (,0) [W11] (-B:G23+J28)*$O$7
G:J29: (,0) [W12] (-B:G23+J28)*(1+$O$7)-@SUM(T23..T27)-G29
G:R29: +R28+1
G:S29: (,0) +I32-H32
G:T29: (,0) +S29/$O$8
G:R30: +R29+1
G:S30: (,0) +I33-H33
G:T30: (,0) +S30/$O$8
G:A31: 16
G:B31: (,0) +B:I24
G:C31: (,0) @MAX(0,(F:C31+F:E31))*((1+$F$53*(1-$F$63))^0.5)+C30*(1+$F$53*(1-$F$63))
G:D31: (,0) +B31+C31
G:E31: (,0) +B:G24
G:F31: (,0) +D31-D29+E31
G:G31: (,0) @MIN(-F:C31,F:E31)
G:H31: (,0) [W11] +G31+F31
G:I31: (,0) [W11] (-B:G24+J29)*$O$7
```

Copyright 1993 The Evergreen Group

— -B22 - -

Funding for Othe. ostretirement Employee Benefits Using An Indenture Plan

```
G:J31: (,0) [W12] (-B:G24+J29)*(1+$O$7)-@SUM(T24..T28)-G31
G:R31: +R30+1
G:S31: (,0) +I34-H34
G:T31: (,0) +S31/$O$8
G:A32: 17
G:B32: (,0) +B:I25
G:C32: (,0) @MAX(0,(F:C32+F:E32))*((1+$F$53*(1-$F$63))^0.5)+C31*(1+$F$53*(1-$F$63))
G:D32: (,0) +B32+C32
G:E32: (,0) +B:G25
G:F32: (,0) +D32-D31+E32
G:G32: (,0) @MIN(-F:C32,F:E32)
G:H32: (,0) [W11] +G32+F32
G:I32: (,0) [W11] (-B:G25+J31)*$O$7
G:J32: (,0) [W12] (-B:G25+J31)*(1+$O$7)-@SUM(T25..T29)-G32
G:R32: +R31+1
G:S32: (,0) +I35-H35
G:T32: (,0) +S32/$O$8
G:A33: 18
G:B33: (,0) +B:I26
G:C33: (,0) @MAX(0,(F:C33+F:E33))*((1+$F$53*(1-$F$63))^0.5)+C32*(1+$F$53*(1-$F$63))
G:D33: (,0) +B33+C33
G:E33: (,0) +B:G26
G:F33: (,0) +D33-D32+E33
G:G33: (,0) @MIN(-F:C33,F:E33)
G:H33: (,0) [W11] +G33+F33
G:I33: (,0) [W11] (-B:G26+J32)*$O$7
G:J33: (,0) [W12] (-B:G26+J32)*(1+$O$7)-@SUM(T26..T30)-G33
G:R33: +R32+1
G:S33: (,0) +I37-H37
G:T33: (,0) +S33/$O$8
G:A34: 19
G:B34: (,0) +B:I27
G:C34: (,0) @MAX(0,(F:C34+F:E34))*((1+$F$53*(1-$F$63))^0.5)+C33*(1+$F$53*(1-$F$63))
G:D34: (,0) +B34+C34
G:E34: (,0) +B:G27
G:F34: (,0) +D34-D33+E34
G:G34: (,0) @MIN(-F:C34,F:E34)
G:H34: (,0) [W11] +G34+F34
G:I34: (,0) [W11] (-B:G27+J33)*$O$7
G:J34: (,0) [W12] (-B:G27+J33)*(1+$O$7)-@SUM(T27..T31)-G34
G:R34: +R33+1
G:S34: (,0) +I38-H38
G:T34: (,0) +S34/$O$8
G:A35: 20
G:B35: (,0) +B:I28
G:C35: (,0) @MAX(0,(F:C35+F:E35))*((1+$F$53*(1-$F$63))^0.5)+C34*(1+$F$53*(1-$F$63))
G:D35: (,0) +B35+C35
G:E35: (,0) +B:G28
G:F35: (,0) +D35-D34+E35
G:G35: (,0) @MIN(-F:C35,F:E35)
G:H35: (,0) [W11] +G35+F35
G:I35: (,0) [W11] (-B:G28+J34)*$O$7
G:J35: (,0) [W12] (-B:G28+J34)*(1+$O$7)-@SUM(T28..T32)-G35
G:R35: +R34+1
G:S35: (,0) +I39-H39
G:T35: (,0) +S35/$O$8
G:R36: +R35+1
G:S36: (,0) +I40-H40
G:T36: (,0) +S36/$O$8
G:A37: 21
G:B37: (,0) +B:I29
G:C37: (,0) @MAX(0,(F:C37+F:E37))*((1+$F$53*(1-$F$63))^0.5)+C36*(1+$F$53*(1-$F$63))
G:D37: (,0) +B37+C37
G:E37: (,0) +B:G29
G:F37: (,0) +D37-D35+E37
G:G37: (,0) @MIN(-F:C37,F:E37)
G:H37: (,0) [W11] +G37+F37
G:I37: (,0) [W11] (-B:G29+J35)*$O$7
G:J37: (,0) [W12] (-B:G29+J35)*(1+$O$7)-@SUM(T29..T33)-G37
G:R37: +R36+1
```

Copyright 1993 The Evergreen Group

-- B23 --

Funding for Othe. ostretirement Employee Benefits Using An Inc ature Plan

```
G:S37: (,0) +I41-H41
G:T37: (,0) +S37/$O$8
G:A38: 22
G:B38: (,0) +B:I30
G:C38: (,0) @MAX(0,(F:C38+F:E38))*((1+$F$53*(1-$F$63))^0.5)+C37*(1+$F$53*(1-$F$63))
G:D38: (,0) +B38+C38
G:E38: (,0) +B:G30
G:F38: (,0) +D38-D37+E38
G:G38: (,0) @MIN(-F:C38,F:E38)
G:H38: (,0) [W11] +G38+F38
G:I38: (,0) [W11] (-B:G30+J37)*$O$7
G:J38: (,0) [W12] (-B:G30+J37)*(1+$O$7)-@SUM(T30..T34)-G38
G:R38: +R37+1
G:S38: (,0) +I43-H43
G:T38: (,0) +S38/$O$8
G:A39: 23
G:B39: (,0) +B:I31
G:C39: (,0) @MAX(0,(F:C39+F:E39))*((1+$F$53*(1-$F$63))^0.5)+C38*(1+$F$53*(1-$F$63))
G:D39: (,0) +B39+C39
G:E39: (,0) +B:G31
G:F39: (,0) +D39-D38+E39
G:G39: (,0) @MIN(-F:C39,F:E39)
G:H39: (,0) [W11] +G39+F39
G:I39: (,0) [W11] (-B:G31+J38)*$O$7
G:J39: (,0) [W12] (-B:G31+J38)*(1+$O$7)-@SUM(T31..T35)-G39
G:R39: +R38+1
G:S39: (,0) +I44-H44
G:T39: (,0) +S39/$O$8
G:A40: 24
G:B40: (,0) +B:I32
G:C40: (,0) @MAX(0,(F:C40+F:E40))*((1+$F$53*(1-$F$63))^0.5)+C39*(1+$F$53*(1-$F$63))
G:D40: (,0) +B40+C40
G:E40: (,0) +B:G32
G:F40: (,0) +D40-D39+E40
G:G40: (,0) @MIN(-F:C40,F:E40)
G:H40: (,0) [W11] +G40+F40
G:I40: (,0) [W11] (-B:G32+J39)*$O$7
G:J40: (,0) [W12] (-B:G32+J39)*(1+$O$7)-@SUM(T32..T36)-G40
G:R40: +R39+1
G:S40: (,0) +I45-H45
G:T40: (,0) +S40/$O$8
G:A41: 25
G:B41: (,0) +B:I33
G:C41: (,0) @MAX(0,(F:C41+F:E41))*((1+$F$53*(1-$F$63))^0.5)+C40*(1+$F$53*(1-$F$63))
G:D41: (,0) +B41+C41
G:E41: (,0) +B:G33
G:F41: (,0) +D41-D40+E41
G:G41: (,0) @MIN(-F:C41,F:E41)
G:H41: (,0) [W11] +G41+F41
G:I41: (,0) [W11] (-B:G33+J40)*$O$7
G:J41: (,0) [W12] (-B:G33+J40)*(1+$O$7)-@SUM(T33..T37)-G41
G:R41: +R40+1
G:S41: (,0) +I46-H46
G:T41: (,0) +S41/$O$8
G:R42: +R41+1
G:S42: (,0) +I47-H47
G:T42: (,0) +S42/$O$8
G:A43: 26
G:B43: (,0) +B:I34
G:C43: (,0) @MAX(0,(F:C43+F:E43))*((1+$F$53*(1-$F$63))^0.5)+C42*(1+$F$53*(1-$F$63))
G:D43: (,0) +B43+C43
G:E43: (,0) +B:G34
G:F43: (,0) +D43-D41+E43
G:G43: (,0) @MIN(-F:C43,F:E43)
G:H43: (,0) [W11] +G43+F43
G:I43: (,0) [W11] (-B:G34+J41)*$O$7
G:J43: (,0) [W12] (-B:G34+J41)*(1+$O$7)-@SUM(T34..T38)-G43
G:A44: 27
G:B44: (,0) +B:I35
G:C44: (,0) @MAX(0,(F:C44+F:E44))*((1+$F$53*(1-$F$63))^0.5)+C43*(1+$F$53*(1-$F$63))
```

Copyright 1993 The Evergreen Group

-- B24 --

Funding for Other Postretirement Employee Benefits Using An Indenture Plan

```
G:D44: (,0) +B44+C44
G:E44: (,0) +B:G35
G:F44: (,0) +D44-D43+E44
G:G44: (,0) @MIN(-F:C44,F:E44)
G:H44: (,0) [W11] +G44+F44
G:I44: (,0) [W11] (-B:G35+J43)*$O$7
G:J44: (,0) [W12] (-B:G35+J43)*(1+$O$7)-@SUM(T35..T39)-G44
G:A45: 28
G:B45: (,0) +B:I36
G:C45: (,0) @MAX(0,(F:C45+F:E45))*((1+$F$53*(1-$F$63))^0.5)+C44*(1+$F$53*(1-$F$63))
G:D45: (,0) +B45+C45
G:E45: (,0) +B:G36
G:F45: (,0) +D45-D44+E45
G:G45: (,0) @MIN(-F:C45,F:E45)
G:H45: (,0) [W11] +G45+F45
G:I45: (,0) [W11] (-B:G36+J44)*$O$7
G:J45: (,0) [W12] (-B:G36+J44)*(1+$O$7)-@SUM(T36..T40)-G45
G:A46: 29
G:B46: (,0) +B:I37
G:C46: (,0) @MAX(0,(F:C46+F:E46))*((1+$F$53*(1-$F$63))^0.5)+C45*(1+$F$53*(1-$F$63))
G:D46: (,0) +B46+C46
G:E46: (,0) +B:G37
G:F46: (,0) +D46-D45+E46
G:G46: (,0) @MIN(-F:C46,F:E46)
G:H46: (,0) [W11] +G46+F46
G:I46: (,0) [W11] (-B:G37+J45)*$O$7
G:J46: (,0) [W12] (-B:G37+J45)*(1+$O$7)-@SUM(T37..T41)-G46
G:A47: 30
G:B47: (,0) +B:I38
G:C47: (,0) @MAX(0,(F:C47+F:E47))*((1+$F$53*(1-$F$63))^0.5)+C46*(1+$F$53*(1-$F$63))
G:D47: (,0) +B47+C47
G:E47: (,0) +B:G38
G:F47: (,0) +D47-D46+E47
G:G47: (,0) @MIN(-F:C47,F:E47)
G:H47: (,0) [W11] +G47+F47
G:I47: (,0) [W11] (-B:G38+J46)*$O$7
G:J47: (,0) [W12] (-B:G38+J46)*(1+$O$7)-@SUM(T38..T42)-G47
G:B51: '(1) Cash reserve accumulated from death benefits (mid-year) that exceed annual
G:B52: '    retiree medical expenses (mid-year).  Reserves invested in taxable investments.
G:B53: '    Interest rate =
G:F53: (P2) +$TRATE
G:B54: '(2) Year-end cash value of plan equals contract cash value plus accumulated reserves.
G:B55: '(3) Computation made pursuant to paragraph 57 of Statement 106.  Income differences
G:B56: "    are amortized straight line over five years.
G:B57: '    Expected earnings rate =
G:E57: (P2) @ROUND(A:D12,4)
G:A61: |::
```

Copyright 1993 The Evergreen Group

-- B25 --

Funding for Other Postretirement Employee Benefits Using An Indenture Plan

```
H:A1: +$A:$D$4
H:J1: +$A:E22
H:A2: +$A:$D$5
H:A3: (D1) @NOW
H:D3: '     RETIREE OPEB COST LIABILITY OFFSET
H:A4: (D7) @NOW
H:E4: '     (000's OMITTED)
H:E7: "Market
H:E8: "Related
H:E9: "Value of
H:F9: "Book
H:G9: "Net
H:E10: "Plan
H:F10: "Accrued
H:G10: "Book
H:D11: "Year
H:E11: "Assets
H:F11: "Liability
H:G11: "Liability
H:D12: "--------
H:E12: "--------
H:F12: "--------
H:G12: "--------
H:D13: 1
H:E13: (C0) +G:J13
H:F13: (C0) +B:F9
H:G13: (C0) +F13-E13
H:D14: 2
H:E14: (,0) +G:J14
H:F14: (,0) +B:F10
H:G14: (,0) +F14-E14
H:D15: 3
H:E15: (,0) +G:J15
H:F15: (,0) +B:F11
H:G15: (,0) +F15-E15
H:D16: 4
H:E16: (,0) +G:J16
H:F16: (,0) +B:F12
H:G16: (,0) +F16-E16
H:D17: 5
H:E17: (,0) +G:J17
H:F17: (,0) +B:F13
H:G17: (,0) +F17-E17
H:D19: 6
H:E19: (,0) +G:J19
H:F19: (,0) +B:F14
H:G19: (,0) +F19-E19
H:D20: 7
H:E20: (,0) +G:J20
H:F20: (,0) +B:F15
H:G20: (,0) +F20-E20
H:D21: 8
H:E21: (,0) +G:J21
H:F21: (,0) +B:F16
H:G21: (,0) +F21-E21
H:D22: 9
H:E22: (,0) +G:J22
H:F22: (,0) +B:F17
H:G22: (,0) +F22-E22
H:D23: 10
H:E23: (,0) +G:J23
H:F23: (,0) +B:F18
H:G23: (,0) +F23-E23
H:D25: 11
H:E25: (,0) +G:J25
H:F25: (,0) +B:F19
H:G25: (,0) +F25-E25
H:D26: 12
H:E26: (,0) +G:J26
H:F26: (,0) +B:F20
```

Copyright 1993 The Evergreen Group

Funding for Othe. .ostretirement Employee Benefits Using An Indenture Plan

```
H:G26: (,0) +F26-E26
H:D27: 13
H:E27: (,0) +G:J27
H:F27: (,0) +B:F21
H:G27: (,0) +F27-E27
H:D28: 14
H:E28: (,0) +G:J28
H:F28: (,0) +B:F22
H:G28: (,0) +F28-E28
H:D29: 15
H:E29: (,0) +G:J29
H:F29: (,0) +B:F23
H:G29: (,0) +F29-E29
H:D31: 16
H:E31: (,0) +G:J31
H:F31: (,0) +B:F24
H:G31: (,0) +F31-E31
H:D32: 17
H:E32: (,0) +G:J32
H:F32: (,0) +B:F25
H:G32: (,0) +F32-E32
H:D33: 18
H:E33: (,0) +G:J33
H:F33: (,0) +B:F26
H:G33: (,0) +F33-E33
H:D34: 19
H:E34: (,0) +G:J34
H:F34: (,0) +B:F27
H:G34: (,0) +F34-E34
H:D35: 20
H:E35: (,0) +G:J35
H:F35: (,0) +B:F28
H:G35: (,0) +F35-E35
H:D37: 21
H:E37: (,0) +G:J37
H:F37: (,0) +B:F29
H:G37: (,0) +F37-E37
H:D38: 22
H:E38: (,0) +G:J38
H:F38: (,0) +B:F30
H:G38: (,0) +F38-E38
H:D39: 23
H:E39: (,0) +G:J39
H:F39: (,0) +B:F31
H:G39: (,0) +F39-E39
H:D40: 24
H:E40: (,0) +G:J40
H:F40: (,0) +B:F32
H:G40: (,0) +F40-E40
H:D41: 25
H:E41: (,0) +G:J41
H:F41: (,0) +B:F33
H:G41: (,0) +F41-E41
H:D43: 26
H:E43: (,0) +G:J43
H:F43: (,0) +B:F34
H:G43: (,0) +F43-E43
H:D44: 27
H:E44: (,0) +G:J44
H:F44: (,0) +B:F35
H:G44: (,0) +F44-E44
H:D45: 28
H:E45: (,0) +G:J45
H:F45: (,0) +B:F36
H:G45: (,0) +F45-E45
H:D46: 29
H:E46: (,0) +G:J46
H:F46: (,0) +B:F37
H:G46: (,0) +F46-E46
H:D47: 30
```

Copyright 1993 The Evergreen Group

-- B27 --

Funding for Othe .stretirement Employee Benefits Using An I: .ture Plan

```
H:E47: (,0) +G:J47
H:F47: (,0) +B:F38
H:G47: (,0) +F47-E47
H:A61: |::
```

Copyright 1993 The Evergreen Group

-- B28 --

Funding for Othe stretirement Employee Benefits Using An I: .iture Plan

```
I:A1: +$A:$D$4
I:J1: +$A:E23
I:A2: +$A:$D$5
I:A3: (D1) @NOW
I:D3: '   ANNUAL INCOME STATEMENT EFFECT
I:A4: (D7) @NOW
I:D4: '          (000's OMITTED)
I:C7: "Corporate
I:E7: "Income
I:G7: "Net
I:C8: "Earnings
I:D8: "Annual
I:E8: "Effect
I:F8: "Annual
I:G8: "P & L
I:H8: "Earnings
I:C9: "From
I:D9: "Retiree
I:E9: "Before
I:F9: "Tax
I:G9: "Effect
I:H9: "per Share
I:C10: "Indenture
I:D10: "Medical
I:E10: "Taxes
I:F10: "Benefit
I:G10: "with
I:H10: "($)
I:B11: "Year
I:C11: "Plan
I:D11: "Expense
I:E11: "(1)
I:F11: "(2)
I:G11: "Plan
I:H11: "(3)
I:B12: "--------
I:C12: "--------
I:D12: "--------
I:E12: "--------
I:F12: "--------
I:G12: "--------
I:H12: "--------
I:B13: 1
I:C13: (C0) +G:I13
I:D13: (C0) +B:E9
I:E13: (C0) +C13+D13
I:F13: (C0) -D13*$E$55
I:G13: (C0) +E13+F13
I:H13: (F2) +G13/$E$56*1000
I:B14: 2
I:C14: (,0) +G:I14
I:D14: (,0) +B:E10
I:E14: (,0) +C14+D14
I:F14: (,0) -D14*$E$55
I:G14: (,0) +E14+F14
I:H14: (F2) +G14/$E$56*1000
I:B15: 3
I:C15: (,0) +G:I15
I:D15: (,0) +B:E11
I:E15: (,0) +C15+D15
I:F15: (,0) -D15*$E$55
I:G15: (,0) +E15+F15
I:H15: (F2) +G15/$E$56*1000
I:B16: 4
I:C16: (,0) +G:I16
I:D16: (,0) +B:E12
I:E16: (,0) +C16+D16
I:F16: (,0) -D16*$E$55
I:G16: (,0) +E16+F16
I:H16: (F2) +G16/$E$56*1000
```

Copyright 1993 The Evergreen Group

Funding for Other Postretirement Employee Benefits Using An Insurance Plan

```
I:B17: 5
I:C17: (,0) +G:117
I:D17: (,0) +B:E13
I:E17: (,0) +C17+D17
I:F17: (,0) -D17*$E$55
I:G17: (,0) +E17+F17
I:H17: (F2) +G17/$E$56*1000
I:B19: 6
I:C19: (,0) +G:119
I:D19: (,0) +B:E14
I:E19: (,0) +C19+D19
I:F19: (,0) -D19*$E$55
I:G19: (,0) +E19+F19
I:H19: (F2) +G19/$E$56*1000
I:B20: 7
I:C20: (,0) +G:120
I:D20: (,0) +B:E15
I:E20: (,0) +C20+D20
I:F20: (,0) -D20*$E$55
I:G20: (,0) +E20+F20
I:H20: (F2) +G20/$E$56*1000
I:B21: 8
I:C21: (,0) +G:121
I:D21: (,0) +B:E16
I:E21: (,0) +C21+D21
I:F21: (,0) -D21*$E$55
I:G21: (,0) +E21+F21
I:H21: (F2) +G21/$E$56*1000
I:B22: 9
I:C22: (,0) +G:122
I:D22: (,0) +B:E17
I:E22: (,0) +C22+D22
I:F22: (,0) -D22*$E$55
I:G22: (,0) +E22+F22
I:H22: (F2) +G22/$E$56*1000
I:B23: 10
I:C23: (,0) +G:123
I:D23: (,0) +B:E18
I:E23: (,0) +C23+D23
I:F23: (,0) -D23*$E$55
I:G23: (,0) +E23+F23
I:H23: (F2) +G23/$E$56*1000
I:B25: 11
I:C25: (,0) +G:125
I:D25: (,0) +B:E19
I:E25: (,0) +C25+D25
I:F25: (,0) -D25*$E$55
I:G25: (,0) +E25+F25
I:H25: (F2) +G25/$E$56*1000
I:B26: 12
I:C26: (,0) +G:126
I:D26: (,0) +B:E20
I:E26: (,0) +C26+D26
I:F26: (,0) -D26*$E$55
I:G26: (,0) +E26+F26
I:H26: (F2) +G26/$E$56*1000
I:B27: 13
I:C27: (,0) +G:127
I:D27: (,0) +B:E21
I:E27: (,0) +C27+D27
I:F27: (,0) -D27*$E$55
I:G27: (,0) +E27+F27
I:H27: (F2) +G27/$E$56*1000
I:B28: 14
I:C28: (,0) +G:128
I:D28: (,0) +B:E22
I:E28: (,0) +C28+D28
I:F28: (,0) -D28*$E$55
I:G28: (,0) +E28+F28
I:H28: (F2) +G28/$E$56*1000
```

Copyright 1993 The Evergreen Group

Funding for Othei . ostretirement Employee Benefits Using An Inuenture Plan

```
I:B29: 15
I:C29: (,0) +G:I29
I:D29: (,0) +B:E23
I:E29: (,0) +C29+D29
I:F29: (,0) -D29*$E$55
I:G29: (,0) +E29+F29
I:H29: (F2) +G29/$E$56*1000
I:B31: 16
I:C31: (,0) +G:I31
I:D31: (,0) +B:E24
I:E31: (,0) +C31+D31
I:F31: (,0) -D31*$E$55
I:G31: (,0) +E31+F31
I:H31: (F2) +G31/$E$56*1000
I:B32: 17
I:C32: (,0) +G:I32
I:D32: (,0) +B:E25
I:E32: (,0) +C32+D32
I:F32: (,0) -D32*$E$55
I:G32: (,0) +E32+F32
I:H32: (F2) +G32/$E$56*1000
I:B33: 18
I:C33: (,0) +G:I33
I:D33: (,0) +B:E26
I:E33: (,0) +C33+D33
I:F33: (,0) -D33*$E$55
I:G33: (,0) +E33+F33
I:H33: (F2) +G33/$E$56*1000
I:B34: 19
I:C34: (,0) +G:I34
I:D34: (,0) +B:E27
I:E34: (,0) +C34+D34
I:F34: (,0) -D34*$E$55
I:G34: (,0) +E34+F34
I:H34: (F2) +G34/$E$56*1000
I:B35: 20
I:C35: (,0) +G:I35
I:D35: (,0) +B:E28
I:E35: (,0) +C35+D35
I:F35: (,0) -D35*$E$55
I:G35: (,0) +E35+F35
I:H35: (F2) +G35/$E$56*1000
I:B37: 21
I:C37: (,0) +G:I37
I:D37: (,0) +B:E29
I:E37: (,0) +C37+D37
I:F37: (,0) -D37*$E$55
I:G37: (,0) +E37+F37
I:H37: (F2) +G37/$E$56*1000
I:B38: 22
I:C38: (,0) +G:I38
I:D38: (,0) +B:E30
I:E38: (,0) +C38+D38
I:F38: (,0) -D38*$E$55
I:G38: (,0) +E38+F38
I:H38: (F2) +G38/$E$56*1000
I:B39: 23
I:C39: (,0) +G:I39
I:D39: (,0) +B:E31
I:E39: (,0) +C39+D39
I:F39: (,0) -D39*$E$55
I:G39: (,0) +E39+F39
I:H39: (F2) +G39/$E$56*1000
I:B40: 24
I:C40: (,0) +G:I40
I:D40: (,0) +B:E32
I:E40: (,0) +C40+D40
I:F40: (,0) -D40*$E$55
I:G40: (,0) +E40+F40
I:H40: (F2) +G40/$E$56*1000
```

Copyright 1993 The Evergreen Group

-- B31 --

Funding for Other Postretirement Employee Benefits Using An Indenture Plan

```
1:B41: 25
1:C41: (,0) +G:I41
1:D41: (,0) +B:E33
1:E41: (,0) +C41+D41
1:F41: (,0) -D41*$E$55
1:G41: (,0) +E41+F41
1:H41: (F2) +G41/$E$56*1000
1:B43: 26
1:C43: (,0) +G:I43
1:D43: (,0) +B:E34
1:E43: (,0) +C43+D43
1:F43: (,0) -D43*$E$55
1:G43: (,0) +E43+F43
1:H43: (F2) +G43/$E$56*1000
1:B44: 27
1:C44: (,0) +G:I44
1:D44: (,0) +B:E35
1:E44: (,0) +C44+D44
1:F44: (,0) -D44*$E$55
1:G44: (,0) +E44+F44
1:H44: (F2) +G44/$E$56*1000
1:B45: 28
1:C45: (,0) +G:I45
1:D45: (,0) +B:E36
1:E45: (,0) +C45+D45
1:F45: (,0) -D45*$E$55
1:G45: (,0) +E45+F45
1:H45: (F2) +G45/$E$56*1000
1:B46: 29
1:C46: (,0) +G:I46
1:D46: (,0) +B:E37
1:E46: (,0) +C46+D46
1:F46: (,0) -D46*$E$55
1:G46: (,0) +E46+F46
1:H46: (F2) +G46/$E$56*1000
1:B47: 30
1:C47: (,0) +G:I47
1:D47: (,0) +B:E38
1:E47: (,0) +C47+D47
1:F47: (,0) -D47*$E$55
1:G47: (,0) +E47+F47
1:H47: (F2) +G47/$E$56*1000
1:C52: '(1) Net income before taxes equals corporate earnings from
1:C53: '      Indenture Plan minus annual retiree medical expense.
1:C54: '(2) Accrued tax benefit from net book expense.
1:C55: '     Corporate tax rate =
1:E55: (P1) +$CTAX
1:C56: '(3) Shares outstanding =
1:E56: (,0) +$SHARES
1:A61: |::
```

Copyright 1993 The Evergreen Group

--B32--

Funding for Other Postretirement Employee Benefits Using An Indenture Plan

```
J:A1: +$A:$D$4
J:J1: +$A:E24
J:A2: +$A:$D$5
J:A3: (D1) @NOW
J:D3: '  ANNUAL SAVINGS PER SHARE EFFECT
J:A4: (D7) @NOW
J:D4: '          (000's OMITTED)
J:D7: "Net
J:E7: "Net
J:D8: "P & L
J:E8: "P & L
J:G8: "Savings
J:D9: "Effect
J:E9: "Effect
J:G9: "per Share
J:D10: "With
J:E10: "Without
J:G10: "($)
J:C11: "Year
J:D11: "Plan
J:E11: "Plan
J:F11: "Savings
J:G11: "(1)
J:C12: "--------
J:D12: "--------
J:E12: "--------
J:F12: "--------
J:G12: "--------
J:C13: 1
J:D13: (C0) +I:G13
J:E13: (C0) +E:F13
J:F13: (C0) +D13-E13
J:G13: (F2) +F13/$E$51*1000
J:C14: 2
J:D14: (,0) +I:G14
J:E14: (,0) +E:F14
J:F14: (,0) +D14-E14
J:G14: (F2) +F14/$E$51*1000
J:C15: 3
J:D15: (,0) +I:G15
J:E15: (,0) +E:F15
J:F15: (,0) +D15-E15
J:G15: (F2) +F15/$E$51*1000
J:C16: 4
J:D16: (,0) +I:G16
J:E16: (,0) +E:F16
J:F16: (,0) +D16-E16
J:G16: (F2) +F16/$E$51*1000
J:C17: 5
J:D17: (,0) +I:G17
J:E17: (,0) +E:F17
J:F17: (,0) +D17-E17
J:G17: (F2) +F17/$E$51*1000
J:C19: 6
J:D19: (,0) +I:G19
J:E19: (,0) +E:F19
J:F19: (,0) +D19-E19
J:G19: (F2) +F19/$E$51*1000
J:C20: 7
J:D20: (,0) +I:G20
J:E20: (,0) +E:F20
J:F20: (,0) +D20-E20
J:G20: (F2) +F20/$E$51*1000
J:C21: 8
J:D21: (,0) +I:G21
J:E21: (,0) +E:F21
J:F21: (,0) +D21-E21
J:G21: (F2) +F21/$E$51*1000
J:C22: 9
J:D22: (,0) +I:G22
```

Copyright 1993 The Evergreen Group

-- B33 --

Funding for Other Postretirement Employee Benefits Using An Indenture Plan

```
J:E22: (,0) +E:F22
J:F22: (,0) +D22-E22
J:G22: (F2) +F22/$E$51*1000
J:C23: 10
J:D23: (,0) +I:G23
J:E23: (,0) +E:F23
J:F23: (,0) +D23-E23
J:G23: (F2) +F23/$E$51*1000
J:C25: 11
J:D25: (,0) +I:G25
J:E25: (,0) +E:F25
J:F25: (,0) +D25-E25
J:G25: (F2) +F25/$E$51*1000
J:C26: 12
J:D26: (,0) +I:G26
J:E26: (,0) +E:F26
J:F26: (,0) +D26-E26
J:G26: (F2) +F26/$E$51*1000
J:C27: 13
J:D27: (,0) +I:G27
J:E27: (,0) +E:F27
J:F27: (,0) +D27-E27
J:G27: (F2) +F27/$E$51*1000
J:C28: 14
J:D28: (,0) +I:G28
J:E28: (,0) +E:F28
J:F28: (,0) +D28-E28
J:G28: (F2) +F28/$E$51*1000
J:C29: 15
J:D29: (,0) +I:G29
J:E29: (,0) +E:F29
J:F29: (,0) +D29-E29
J:G29: (F2) +F29/$E$51*1000
J:C31: 16
J:D31: (,0) +I:G31
J:E31: (,0) +E:F31
J:F31: (,0) +D31-E31
J:G31: (F2) +F31/$E$51*1000
J:C32: 17
J:D32: (,0) +I:G32
J:E32: (,0) +E:F32
J:F32: (,0) +D32-E32
J:G32: (F2) +F32/$E$51*1000
J:C33: 18
J:D33: (,0) +I:G33
J:E33: (,0) +E:F33
J:F33: (,0) +D33-E33
J:G33: (F2) +F33/$E$51*1000
J:C34: 19
J:D34: (,0) +I:G34
J:E34: (,0) +E:F34
J:F34: (,0) +D34-E34
J:G34: (F2) +F34/$E$51*1000
J:C35: 20
J:D35: (,0) +I:G35
J:E35: (,0) +E:F35
J:F35: (,0) +D35-E35
J:G35: (F2) +F35/$E$51*1000
J:C37: 21
J:D37: (,0) +I:G37
J:E37: (,0) +E:F37
J:F37: (,0) +D37-E37
J:G37: (F2) +F37/$E$51*1000
J:C38: 22
J:D38: (,0) +I:G38
J:E38: (,0) +E:F38
J:F38: (,0) +D38-E38
J:G38: (F2) +F38/$E$51*1000
J:C39: 23
J:D39: (,0) +I:G39
```

Copyright 1993 The Evergreen Group

Funding for Other Postretirement Employee Benefits Using An Indenture Plan

```
J:E39: (,0) +E:F39
J:F39: (,0) +D39-E39
J:G39: (F2) +F39/$E$51*1000
J:C40: 24
J:D40: (,0) +I:G40
J:E40: (,0) +E:F40
J:F40: (,0) +D40-E40
J:G40: (F2) +F40/$E$51*1000
J:C41: 25
J:D41: (,0) +I:G41
J:E41: (,0) +E:F41
J:F41: (,0) +D41-E41
J:G41: (F2) +F41/$E$51*1000
J:C43: 26
J:D43: (,0) +I:G43
J:E43: (,0) +E:F43
J:F43: (,0) +D43-E43
J:G43: (F2) +F43/$E$51*1000
J:C44: 27
J:D44: (,0) +I:G44
J:E44: (,0) +E:F44
J:F44: (,0) +D44-E44
J:G44: (F2) +F44/$E$51*1000
J:C45: 28
J:D45: (,0) +I:G45
J:E45: (,0) +E:F45
J:F45: (,0) +D45-E45
J:G45: (F2) +F45/$E$51*1000
J:C46: 29
J:D46: (,0) +I:G46
J:E46: (,0) +E:F46
J:F46: (,0) +D46-E46
J:G46: (F2) +F46/$E$51*1000
J:C47: 30
J:D47: (,0) +I:G47
J:E47: (,0) +E:F47
J:F47: (,0) +D47-E47
J:G47: (F2) +F47/$E$51*1000
J:C51: '(1) Shares outstanding =
J:E51: (,0) +$SHARES
J:A61: |::
```

Copyright 1993 The Evergreen Group

Funding for Other Postretirement Employee Benefits Using Indenture Plan

```
S:A1: [W10] +$A:$D$4
S:J1: [W10] +$A:E25
S:A2: [W10] +$A:$D$5
S:A3: (D1) [W10] @NOW
S:A4: (D7) [W10] @NOW
S:D4: [W13] '            DEFERRED TAX ANALYSIS
S:D5: [W13] '               (000's OMITTED)
S:D7: [W13] "Deferred
S:D8: [W13] "Tax Debit
S:E8: [W13] "Deferred
S:G8: [W13] "Cumulative
S:D9: [W13] "without
S:E9: [W13] "Tax Debit
S:F9: [W14] "Reduction
S:G9: [W13] "Reduction
S:D10: [W13] "Funding
S:E10: [W13] "with
S:F10: [W14] "in Deferred
S:G10: [W13] "in Deferred
S:C11: [W10] "Year
S:D11: [W13] "(1)
S:E11: [W13] "Funding
S:F11: [W14] "Tax Debit
S:G11: [W13] "Tax Debits
S:C12: [W10] "--------
S:D12: [W13] "--------
S:E12: [W13] "--------
S:F12: [W14] "--------
S:G12: [W13] "--------
S:C13: [W10] 1
S:D13: (C0) [W13] @IF(@SUM(S:$D$12..D12)+(H:F13-H:F12)*$E$51>=0,(H:F13-H:F12)*$E$51,@IF(@SUM(S:$D$12..D12)>0,-@SUM(S:$D$12..D12),0))
S:E13: (C0) [W13] +D13
S:F13: (C0) [W14] +D13-E13
S:G13: (C0) [W13] +G12+F13
S:C14: [W10] 2
S:D14: (,0) [W13] @IF(@SUM(S:$D$12..D13)+(H:F14-H:F13)*$E$51>=0,(H:F14-H:F13)*$E$51,@IF(@SUM(S:$D$12..D13)>0,-@SUM(S:$D$12..D13),0))
S:E14: (,0) [W13] +D14
S:F14: (,0) [W14] +D14-E14
S:G14: (,0) [W13] +G13+F14
S:C15: [W10] 3
S:D15: (,0) [W13] @IF(@SUM(S:$D$12..D14)+(H:F15-H:F14)*$E$51>=0,(H:F15-H:F14)*$E$51,@IF(@SUM(S:$D$12..D14)>0,-@SUM(S:$D$12..D14),0))
S:E15: (,0) [W13] +D15
S:F15: (,0) [W14] +D15-E15
S:G15: (,0) [W13] +G14+F15
S:C16: [W10] 4
S:D16: (,0) [W13] @IF(@SUM(S:$D$12..D15)+(H:F16-H:F15)*$E$51>=0,(H:F16-H:F15)*$E$51,@IF(@SUM(S:$D$12..D15)>0,-@SUM(S:$D$12..D15),0))
S:E16: (,0) [W13] +D16
S:F16: (,0) [W14] +D16-E16
S:G16: (,0) [W13] +G15+F16
```

Copyright 1993 The Evergreen Group

-- B36 --

Funding for Other Postretirement Employee Benefits Using Indenture Plan

```
S:C17: [W10] 5
S:D17: (,0) [W13] @IF(@SUM(S:$D$12..D16)+(H:F17-H:F16)*$E$51>=0,(H:F17-H:F16)*$E$51,@IF(@SUM(S:$D$12..D16)>0,-@SUM(S:$D$12..D16),0))
S:E17: (,0) [W13] +D17
S:F17: (,0) [W14] +D17-E17
S:G17: (,0) [W13] +G16+F17
S:C19: [W10] 6
S:D19: (,0) [W13] @IF(@SUM(S:$D$12..D18)+(H:F19-H:F17)*$E$51>=0,(H:F19-H:F17)*$E$51,@IF(@SUM(S:$D$12..D18)>0,-@SUM(S:$D$12..D18),0))
S:E19: (,0) [W13] +D19
S:F19: (,0) [W14] +D19-E19
S:G19: (,0) [W13] +G17+F19
S:C20: [W10] 7
S:D20: (,0) [W13] @IF(@SUM(S:$D$12..D19)+(H:F20-H:F19)*$E$51>=0,(H:F20-H:F19)*$E$51,@IF(@SUM(S:$D$12..D19)>0,-@SUM(S:$D$12..D19),0))
S:E20: (,0) [W13] +D20
S:F20: (,0) [W14] +D20-E20
S:G20: (,0) [W13] +G19+F20
S:C21: [W10] 8
S:D21: (,0) [W13] @IF(@SUM(S:$D$12..D20)+(H:F21-H:F20)*$E$51>=0,(H:F21-H:F20)*$E$51,@IF(@SUM(S:$D$12..D20)>0,-@SUM(S:$D$12..D20),0))
S:E21: (,0) [W13] +D21
S:F21: (,0) [W14] +D21-E21
S:G21: (,0) [W13] +G20+F21
S:C22: [W10] 9
S:D22: (,0) [W13] @IF(@SUM(S:$D$12..D21)+(H:F22-H:F21)*$E$51>=0,(H:F22-H:F21)*$E$51,@IF(@SUM(S:$D$12..D21)>0,-@SUM(S:$D$12..D21),0))
S:E22: (,0) [W13] +D22
S:F22: (,0) [W14] +D22-E22
S:G22: (,0) [W13] +G21+F22
S:C23: [W10] 10
S:D23: (,0) [W13] @IF(@SUM(S:$D$12..D22)+(H:F23-H:F22)*$E$51>=0,(H:F23-H:F22)*$E$51,@IF(@SUM(S:$D$12..D22)>0,-@SUM(S:$D$12..D22),0))
S:E23: (,0) [W13] +D23
S:F23: (,0) [W14] +D23-E23
S:G23: (,0) [W13] +G22+F23
S:C25: [W10] 11
S:D25: (,0) [W13] @IF(@SUM(S:$D$12..D24)+(H:F25-H:F23)*$E$51>=0,(H:F25-H:F23)*$E$51,@IF(@SUM(S:$D$12..D24)>0,-@SUM(S:$D$12..D24),0))
S:E25: (,0) [W13] +D25
S:F25: (,0) [W14] +D25-E25
S:G25: (,0) [W13] +G23+F25
S:C26: [W10] 12
S:D26: (,0) [W13] @IF(@SUM(S:$D$12..D25)+(H:F26-H:F25)*$E$51>=0,(H:F26-H:F25)*$E$51,@IF(@SUM(S:$D$12..D25)>0,-@SUM(S:$D$12..D25),0))
S:E26: (,0) [W13] +D26
S:F26: (,0) [W14] +D26-E26
S:G26: (,0) [W13] +G25+F26
S:C27: [W10] 13
S:D27: (,0) [W13] @IF(@SUM(S:$D$12..D26)+(H:F27-H:F26)*$E$51>=0,(H:F27-H:F26)*$E$51,@IF(@SUM(S:$D$12..D26)>0,-@SUM(S:$D$12..D26),0))
S:E27: (,0) [W13] +D27
S:F27: (,0) [W14] +D27-E27
S:G27: (,0) [W13] +G26+F27
S:C28: [W10] 14
S:D28: (,0) [W13] @IF(@SUM(S:$D$12..D27)+(H:F28-H:F27)*$E$51>=0,(H:F28-H:F27)*$E$51,@IF(@SUM(S:$D$12..D27)>0,-@SUM(S:$D$12..D27),0))
S:E28: (,0) [W13] +D28
S:F28: (,0) [W14] +D28-E28
```

Copyright 1993 The Evergreen Group

--B37--

Funding for Other Postretirement Employee Benefits Using Indenture Plan

```
S:G28: (,0) [W13] +G27+F28
S:C29: [W10] 15
S:D29: (,0) [W13] @IF(@SUM(S:$D$12..D28)+(H:F29-H:F28)*$E$51>=0,(H:F29-H:F28)*$E$51,@IF(@SUM(S:$D$12..D28)>0,-@SUM(S:$D$12..D28),0))
S:E29: (,0) [W13] +D29
S:F29: (,0) [W14] +D29-E29
S:G29: (,0) [W13] +G28+F29
S:C31: [W10] 16
S:D31: (,0) [W13] @IF(@SUM(S:$D$12..D30)+(H:F31-H:F29)*$E$51>=0,(H:F31-H:F29)*$E$51,@IF(@SUM(S:$D$12..D30)>0,-@SUM(S:$D$12..D30),0))
S:E31: (,0) [W13] +D31
S:F31: (,0) [W14] +D31-E31
S:G31: (,0) [W13] +G29+F31
S:C32: [W10] 17
S:D32: (,0) [W13] @IF(@SUM(S:$D$12..D31)+(H:F32-H:F31)*$E$51>=0,(H:F32-H:F31)*$E$51,@IF(@SUM(S:$D$12..D31)>0,-@SUM(S:$D$12..D31),0))
S:E32: (,0) [W13] +D32
S:F32: (,0) [W14] +D32-E32
S:G32: (,0) [W13] +G31+F32
S:C33: [W10] 18
S:D33: (,0) [W13] @IF(@SUM(S:$D$12..D32)+(H:F33-H:F32)*$E$51>=0,(H:F33-H:F32)*$E$51,@IF(@SUM(S:$D$12..D32)>0,-@SUM(S:$D$12..D32),0))
S:E33: (,0) [W13] +D33
S:F33: (,0) [W14] +D33-E33
S:G33: (,0) [W13] +G32+F33
S:C34: [W10] 19
S:D34: (,0) [W13] @IF(@SUM(S:$D$12..D33)+(H:F34-H:F33)*$E$51>=0,(H:F34-H:F33)*$E$51,@IF(@SUM(S:$D$12..D33)>0,-@SUM(S:$D$12..D33),0))
S:E34: (,0) [W13] +D34
S:F34: (,0) [W14] +D34-E34
S:G34: (,0) [W13] +G33+F34
S:C35: [W10] 20
S:D35: (,0) [W13] @IF(@SUM(S:$D$12..D34)+(H:F35-H:F34)*$E$51>=0,(H:F35-H:F34)*$E$51,@IF(@SUM(S:$D$12..D34)>0,-@SUM(S:$D$12..D34),0))
S:E35: (,0) [W13] +D35
S:F35: (,0) [W14] +D35-E35
S:G35: (,0) [W13] +G34+F35
S:C37: [W10] 21
S:D37: (,0) [W13] @IF(@SUM(S:$D$12..D36)+(H:F37-H:F35)*$E$51>=0,(H:F37-H:F35)*$E$51,@IF(@SUM(S:$D$12..D36)>0,-@SUM(S:$D$12..D36),0))
S:E37: (,0) [W13] +D37
S:F37: (,0) [W14] +D37-E37
S:G37: (,0) [W13] +G35+F37
S:C38: [W10] 22
S:D38: (,0) [W13] @IF(@SUM(S:$D$12..D37)+(H:F38-H:F37)*$E$51>=0,(H:F38-H:F37)*$E$51,@IF(@SUM(S:$D$12..D37)>0,-@SUM(S:$D$12..D37),0))
S:E38: (,0) [W13] +D38
S:F38: (,0) [W14] +D38-E38
S:G38: (,0) [W13] +G37+F38
S:C39: [W10] 23
S:D39: (,0) [W13] @IF(@SUM(S:$D$12..D38)+(H:F39-H:F38)*$E$51>=0,(H:F39-H:F38)*$E$51,@IF(@SUM(S:$D$12..D38)>0,-@SUM(S:$D$12..D38),0))
S:E39: (,0) [W13] +D39
S:F39: (,0) [W14] +D39-E39
S:G39: (,0) [W13] +G38+F39
S:A40: [W10] |::
S:C40: [W10] 24
S:D40: (,0) [W13] @IF(@SUM(S:$D$12..D39)+(H:F40-H:F39)*$E$51>=0,(H:F40-H:F39)*$E$51,@IF(@SUM(S:$D$12..D39)>0,-@SUM(S:$D$12..D39),0))
```

Copyright 1993 The Evergreen Group

--B38--

Funding for Other Postretirement Employee Benefits Using Indenture Plan

```
S:E40: (,0) [W13] +D40
S:F40: (,0) [W14] +D40-E40
S:G40: (,0) [W13] +G39+F40
S:C41: [W10] 25
S:D41: (,0) [W13] @IF(@SUM(S:$D$12..D40)+(H:F41-H:F40)*$E$51>=0,(H:F41-H:F40)*$E$51,@IF(@SUM(S:$D$12..D40)>0,-@SUM(S:$D$12..D40),0))
S:E41: (,0) [W13] +D41
S:F41: (,0) [W14] +D41-E41
S:G41: (,0) [W13] +G40+F41
S:C43: [W10] 26
S:D43: (,0) [W13] @IF(@SUM(S:$D$12..D42)+(H:F43-H:F41)*$E$51>=0,(H:F43-H:F41)*$E$51,@IF(@SUM(S:$D$12..D42)>0,-@SUM(S:$D$12..D42),0))
S:E43: (,0) [W13] +D43
S:F43: (,0) [W14] +D43-E43
S:G43: (,0) [W13] +G41+F43
S:C44: [W10] 27
S:D44: (,0) [W13] @IF(@SUM(S:$D$12..D43)+(H:F44-H:F43)*$E$51>=0,(H:F44-H:F43)*$E$51,@IF(@SUM(S:$D$12..D43)>0,-@SUM(S:$D$12..D43),0))
S:E44: (,0) [W13] +D44
S:F44: (,0) [W14] +D44-E44
S:G44: (,0) [W13] +G43+F44
S:C45: [W10] 28
S:D45: (,0) [W13] @IF(@SUM(S:$D$12..D44)+(H:F45-H:F44)*$E$51>=0,(H:F45-H:F44)*$E$51,@IF(@SUM(S:$D$12..D44)>0,-@SUM(S:$D$12..D44),0))
S:E45: (,0) [W13] +D45
S:F45: (,0) [W14] +D45-E45
S:G45: (,0) [W13] +G44+F45
S:C46: [W10] 29
S:D46: (,0) [W13] @IF(@SUM(S:$D$12..D45)+(H:F46-H:F45)*$E$51>=0,(H:F46-H:F45)*$E$51,@IF(@SUM(S:$D$12..D45)>0,-@SUM(S:$D$12..D45),0))
S:E46: (,0) [W13] +D46
S:F46: (,0) [W14] +D46-E46
S:G46: (,0) [W13] +G45+F46
S:C47: [W10] 30
S:D47: (,0) [W13] @IF(@SUM(S:$D$12..D46)+(H:F47-H:F46)*$E$51>=0,(H:F47-H:F46)*$E$51,@IF(@SUM(S:$D$12..D46)>0,-@SUM(S:$D$12..D46),0))
S:E47: (,0) [W13] +D47
S:F47: (,0) [W14] +D47-E47
S:G47: (,0) [W13] +G46+F47
S:C50: [W10] "(1) Deferred Tax amounts are computed at a corporate
S:C51: [W10] "    tax rate =
S:E51: (P2) [W13] +$A:$D$7
S:A61: [W10] |::
```

Copyright 1993 The Evergreen Group

--B39--

Funding for Other Postretirement Employee Benefits Using An Indenture Plan

```
L:A1: +$A:$D$4
L:J1: +A:E26
L:A2: +$A:$D$5
L:A3: (D1) @NOW
L:D3: '      RATE OF RETURN ON INDENTURE PLAN
L:A4: (D7) @NOW
L:E4: '    (000's OMITTED)
L:F7: "After-Tax
L:E8: "After-Tax
L:F8: "Cash
L:G8: "Incremental
L:D9: "Year End
L:E9: "Cash Flow
L:F9: "Retiree
L:G9: (C0) "Plan
L:H9: "IRR of
L:D10: "Cash Value
L:E10: "with
L:F10: "Medical
L:G10: "Investment
L:H10: "Plan
L:C11: "Year
L:D11: "of Plan
L:E11: (C0) "Plan
L:F11: (C0) "Cost
L:G11: (C0) "(1)
L:H11: "Investment
L:C12: "--------
L:D12: "--------
L:E12: "--------
L:F12: "--------
L:G12: "--------
L:H12: "--------
L:C13: 1
L:D13: (C0) +G:D13
L:E13: (C0) +F:I13
L:F13: (C0) +D:F13
L:G13: (C0) +E13-F13
L:H13: (P1) +K:G13
L:C14: 2
L:D14: (,0) +G:D14
L:E14: (,0) +F:I14
L:F14: (,0) +D:F14
L:G14: (,0) +E14-F14
L:H14: (P1) +K:G14
L:C15: 3
L:D15: (,0) +G:D15
L:E15: (,0) +F:I15
L:F15: (,0) +D:F15
L:G15: (,0) +E15-F15
L:H15: (P1) +K:G15
L:C16: 4
L:D16: (,0) +G:D16
L:E16: (,0) +F:I16
L:F16: (,0) +D:F16
L:G16: (,0) +E16-F16
L:H16: (P1) +K:G16
L:C17: 5
L:D17: (,0) +G:D17
L:E17: (,0) +F:I17
L:F17: (,0) +D:F17
L:G17: (,0) +E17-F17
L:H17: (P1) +K:G17
L:C19: 6
L:D19: (,0) +G:D19
L:E19: (,0) +F:I19
L:F19: (,0) +D:F19
L:G19: (,0) +E19-F19
L:H19: (P1) +K:G19
L:C20: 7
```

Copyright 1993 The Evergreen Group

--B40--

Funding for Other Postretirement Employee Benefits Using An Indenture Plan

```
L:D20: (,0) +G:D20
L:E20: (,0) +F:I20
L:F20: (,0) +D:F20
L:G20: (,0) +E20-F20
L:H20: (P1) +K:G20
L:C21: 8
L:D21: (,0) +G:D21
L:E21: (,0) +F:I21
L:F21: (,0) +D:F21
L:G21: (,0) +E21-F21
L:H21: (P1) +K:G21
L:C22: 9
L:D22: (,0) +G:D22
L:E22: (,0) +F:I22
L:F22: (,0) +D:F22
L:G22: (,0) +E22-F22
L:H22: (P1) +K:G22
L:C23: 10
L:D23: (,0) +G:D23
L:E23: (,0) +F:I23
L:F23: (,0) +D:F23
L:G23: (,0) +E23-F23
L:H23: (P1) +K:G23
L:C25: 11
L:D25: (,0) +G:D25
L:E25: (,0) +F:I25
L:F25: (,0) +D:F25
L:G25: (,0) +E25-F25
L:H25: (P1) +K:G25
L:C26: 12
L:D26: (,0) +G:D26
L:E26: (,0) +F:I26
L:F26: (,0) +D:F26
L:G26: (,0) +E26-F26
L:H26: (P1) +K:G26
L:C27: 13
L:D27: (,0) +G:D27
L:E27: (,0) +F:I27
L:F27: (,0) +D:F27
L:G27: (,0) +E27-F27
L:H27: (P1) +K:G27
L:C28: 14
L:D28: (,0) +G:D28
L:E28: (,0) +F:I28
L:F28: (,0) +D:F28
L:G28: (,0) +E28-F28
L:H28: (P1) +K:G28
L:C29: 15
L:D29: (,0) +G:D29
L:E29: (,0) +F:I29
L:F29: (,0) +D:F29
L:G29: (,0) +E29-F29
L:H29: (P1) +K:G29
L:C31: 16
L:D31: (,0) +G:D31
L:E31: (,0) +F:I31
L:F31: (,0) +D:F31
L:G31: (,0) +E31-F31
L:H31: (P1) +K:G31
L:C32: 17
L:D32: (,0) +G:D32
L:E32: (,0) +F:I32
L:F32: (,0) +D:F32
L:G32: (,0) +E32-F32
L:H32: (P1) +K:G32
L:C33: 18
L:D33: (,0) +G:D33
L:E33: (,0) +F:I33
L:F33: (,0) +D:F33
L:G33: (,0) +E33-F33
```

Copyright 1993 The Evergreen Group

-- B41 --

Funding for Other Postretirement Employee Benefits Using An Indenture Plan

```
L:H33: (P1) +K:G33
L:C34: 19
L:D34: (,0) +G:D34
L:E34: (,0) +F:I34
L:F34: (,0) +D:F34
L:G34: (,0) +E34-F34
L:H34: (P1) +K:G34
L:C35: 20
L:D35: (,0) +G:D35
L:E35: (,0) +F:I35
L:F35: (,0) +D:F35
L:G35: (,0) +E35-F35
L:H35: (P1) +K:G35
L:C37: 21
L:D37: (,0) +G:D37
L:E37: (,0) +F:I37
L:F37: (,0) +D:F37
L:G37: (,0) +E37-F37
L:H37: (P1) +K:G37
L:C38: 22
L:D38: (,0) +G:D38
L:E38: (,0) +F:I38
L:F38: (,0) +D:F38
L:G38: (,0) +E38-F38
L:H38: (P1) +K:G38
L:C39: 23
L:D39: (,0) +G:D39
L:E39: (,0) +F:I39
L:F39: (,0) +D:F39
L:G39: (,0) +E39-F39
L:H39: (P1) +K:G39
L:C40: 24
L:D40: (,0) +G:D40
L:E40: (,0) +F:I40
L:F40: (,0) +D:F40
L:G40: (,0) +E40-F40
L:H40: (P1) +K:G40
L:C41: 25
L:D41: (,0) +G:D41
L:E41: (,0) +F:I41
L:F41: (,0) +D:F41
L:G41: (,0) +E41-F41
L:H41: (P1) +K:G41
L:C43: 26
L:D43: (,0) +G:D43
L:E43: (,0) +F:I43
L:F43: (,0) +D:F43
L:G43: (,0) +E43-F43
L:H43: (P1) +K:G43
L:C44: 27
L:D44: (,0) +G:D44
L:E44: (,0) +F:I44
L:F44: (,0) +D:F44
L:G44: (,0) +E44-F44
L:H44: (P1) +K:G44
L:C45: 28
L:D45: (,0) +G:D45
L:E45: (,0) +F:I45
L:F45: (,0) +D:F45
L:G45: (,0) +E45-F45
L:H45: (P1) +K:G45
L:C46: 29
L:D46: (,0) +G:D46
L:E46: (,0) +F:I46
L:F46: (,0) +D:F46
L:G46: (,0) +E46-F46
L:H46: (P1) +K:G46
L:C47: 30
L:D47: (,0) +G:D47
L:E47: (,0) +F:I47
```

Copyright 1993 The Evergreen Group

Funding for Other Postretirement Employee Benefits Using An Indenture Plan

```
L:F47: (,0) +D:F47
L:G47: (,0) +E47-F47
L:H47: (P1) +K:G47
L:C51: '(1) Annual investment equals after-tax cash flow minus after-tax retiree medical expense.
L:A61: |::
```

Copyright 1993 The Evergreen Group

Funding for Other Postretirement Employee Benefits Using An Indenture Plan

```
K:K9: "Premiums
K:L9: "After-Tax
K:N9: "After-Tax
K:O9: "Pre-Tax
K:P9: "After-Tax
K:Q9: "Pre-Tax
K:S9: [W60] 'the macro
K:K10: "and Death
K:L10: "Surrender
K:M10: "EOY Pre-Tax
K:N10: "Cash Flow
K:O10: "Cash Flow
K:P10: "Half-Year
K:Q10: "Half-Year
K:S10: [W60] '"alt-a"
K:T10: 'comments
K:K11: "Benefits
K:L11: "Value
K:M11: "Cash Value
K:N11: "Stream
K:O11: "Stream
K:P11: "IRRs
K:Q11: "IRRs
K:S11: [W60] '=====
K:T11: '=====
K:K12: "--------
K:L12: "--------
K:M12: "--------
K:N12: "--------
K:O12: "--------
K:P12: "--------
K:Q12: "--------
K:K13: (,0) +C13
K:L13: 0
K:M13: 0
K:N13: (,0) +K13
K:O13: (,0) +K13
K:R13: "\a:
K:S13: [W60] '{goto}THISYR~1~/rncAFTERTAX~~/rncPRETAX~~
K:T13: 'initialize ranges
K:K14: (,0) +D13
K:L14: (,0) 0
K:M14: (,0) 0
K:N14: (,0) +K14
K:O14: (,0) +K14
K:S14: [W60] '{goto}YEAR1~
K:T14: 'go to top of first cash flow column
K:K15: (,0) +C14
K:L15: (,0) +E13
K:M15: (,0) +F13
K:N15: (,0) +K15
K:O15: (,0) +K15
K:P15: (P2) ERR
K:Q15: (P2) 0.00297224917007671557
K:S15: [W60] '/re.{right 3}{down @cell("contents",YEARS)*2}~
K:T15: 'erase calculation and IRR columns
K:K16: (,0) +D14
K:L16: (,0) 0
K:M16: (,0) 0
K:N16: (,0) +K16
K:O16: (,0) +K16
K:R16: "label:
K:S16: [W60] '/rndPRETAX~/rndAFTERTAX~
K:T16: 'start new round of calculations
K:K17: (,0) +C15
K:L17: (,0) +E14
K:M17: (,0) +F14
K:N17: (,0) +K17
K:O17: (,0) +K17
K:P17: (P2) -0.668587091323650475
```

Copyright 1993 The Evergreen Group

Funding for Other Postretirement Employee Benefits Using An Indenture Plan

```
K:Q17: (P2) 0.0244465929988518962
K:S17: [W60] '{goto}YEAR1~/rncAFTERTAX~.{down @cell("contents",THISYR)*2}~
K:T17: 'create new ranges for cash flow streams
K:K18: (,0) +D15
K:L18: (,0) 0
K:M18: (,0) 0
K:N18: (,0) +K18
K:O18: (,0) +K18
K:S18: [W60] '{right}/rncPRETAX~.{down @cell("contents",THISYR)*2}~
K:T18: 'create new ranges for cash flow streams
K:K19: (,0) +C16
K:L19: (,0) +E15
K:M19: (,0) +F15
K:N19: (,0) +K19
K:O19: (,0) +K19
K:P19: (P2) -0.493530526417079419
K:Q19: (P2) 0.0317597712748640679
K:S19: [W60] '{left}+{left 3}~
K:T19: 'copy investment flow into cash flow column
K:K20: (,0) +D16
K:L20: (,0) 0
K:M20: (,0) 0
K:N20: (,0) +K20
K:O20: (,0) +K20
K:S20: [W60] '/c~.{down @cell("contents",THISYR)*2}{up}~
K:T20: 'copy investment flow into cash flow column
K:K21: (,0) +C17
K:L21: (,0) +E16
K:M21: (,0) +F16
K:N21: (,0) +K21
K:O21: (,0) +K21
K:P21: (P2) -0.376131258608999429
K:Q21: (P2) 0.0354155789740699265
K:S21: [W60] '{right}+{left 4}~
K:T21: 'copy investment flow into cash flow column
K:K22: (,0) +D17
K:L22: (,0) 0
K:M22: (,0) 0
K:N22: (,0) +K22
K:O22: (,0) +K22
K:S22: [W60] '/c~.{down @cell("contents",THISYR)*2}{up}~
K:T22: 'copy investment flow into cash flow column
K:K23: (,0) +C19
K:L23: (,0) +E17
K:M23: (,0) +F17
K:N23: (,0) +K23
K:O23: (,0) +K23
K:P23: (P2) -0.294117192185125817
K:Q23: (P2) 0.0376383499867433853
K:S23: [W60] '{left}{down @cell("contents",THISYR)*2}
K:T23: 'go to last year
K:K24: (,0) +D19
K:L24: (,0) 0
K:M24: (,0) 0
K:N24: (,0) +K24
K:O24: (,0) +K24
K:S24: [W60] '+{left 2}~/c~{right}~
K:T24: 'copy surrender values inot cash flow columns
K:K25: (,0) +C20
K:L25: (,0) +E19
K:M25: (,0) +F19
K:N25: (,0) +K25
K:O25: (,0) +K25
K:P25: (P2) -0.234385776789140741
K:Q25: (P2) 0.039130401354048959
K:S25: [W60] '{right 2}@irr(0.1,AFTERTAX)~{calc}/rv~~
K:T25: "fix IRR value in cell
K:K26: (,0) +D20
K:L26: (,0) 0
K:M26: (,0) 0
```

Copyright 1993 The Evergreen Group

Funding for Other Postretirement Employee Benefits Using An Indenture Plan

```
K:N26: (,0) +K26
K:O26: (,0) +K26
K:S26: [W60] '{right}@irr(0.1,PRETAX)~{calc}/rv~~
K:T26: "fix IRR value in cell
K:K27: (,0) +C21
K:L27: (,0) +E20
K:M27: (,0) +F20
K:N27: (,0) +K27
K:O27: (,0) +K27
K:P27: (P2) -0.18914619948234383
K:Q27: (P2) 0.0402096068851777884
K:S27: [W60] '{goto}THISYR~{right}+{left}+1~
K:T27: 'calculate next year
K:K28: (,0) +D21
K:L28: (,0) 0
K:M28: (,0) 0
K:N28: (,0) +K28
K:O28: (,0) +K28
K:S28: [W60] '/rv~{left}~/re~
K:T28: 'copy new value into THISYR
K:K29: (,0) +C22
K:L29: (,0) +E21
K:M29: (,0) +F21
K:N29: (,0) +K29
K:O29: (,0) +K29
K:P29: (P2) -0.15153405585577818
K:Q29: (P2) 0.0410872652744349066
K:S29: [W60] "{if @cell("contents",YEARS)>=@cell("contents",THISYR)}{branch LABEL}
K:T29: 'go to next round
K:K30: (,0) +D22
K:L30: (,0) 0
K:M30: (,0) 0
K:N30: (,0) +K30
K:O30: (,0) +K30
K:S30: [W60] '{goto}YEAR1~
K:T30: 'finish up
K:K31: (,0) +C23
K:L31: (,0) +E22
K:M31: (,0) +F22
K:N31: (,0) +K31
K:O31: (,0) +K31
K:P31: (P2) -0.125157800380170273
K:Q31: (P2) 0.0417351502432598771
K:K32: (,0) +D23
K:L32: (,0) 0
K:M32: (,0) 0
K:N32: (,0) +K32
K:O32: (,0) +K32
K:K33: (,0) +C25
K:L33: (,0) +E23
K:M33: (,0) +F23
K:N33: (,0) +K33
K:O33: (,0) +K33
K:P33: (P2) -0.10249852939158926
K:Q33: (P2) 0.0422639668157945 96
K:K34: (,0) +D25
K:L34: (,0) 0
K:M34: (,0) 0
K:N34: (,0) +K34
K:O34: (,0) +K34
K:K35: (,0) +C26
K:L35: (,0) +E25
K:M35: (,0) +F25
K:N35: (,0) +K35
K:O35: (,0) +K35
K:P35: (P2) -0.0837388557346172709
K:Q35: (P2) 0.0426638992822425366
K:K36: (,0) +D26
K:L36: (,0) 0
K:M36: (,0) 0
```

Copyright 1993 The Evergreen Group

Funding for Other Postretirement Employee Benefits Using An Indenture Plan

```
K:N36: (,0) +K36
K:O36: (,0) +K36
K:K37: (,0) +C27
K:L37: (,0) +E26
K:M37: (,0) +F26
K:N37: (,0) +K37
K:O37: (,0) +K37
K:P37: (P2) -0.0680252884686977959
K:Q37: (P2) 0.0429722716058210387
K:K38: (,0) +D27
K:L38: (,0) 0
K:M38: (,0) 0
K:N38: (,0) +K38
K:O38: (,0) +K38
K:K39: (,0) +C28
K:L39: (,0) +E27
K:M39: (,0) +F27
K:N39: (,0) +K39
K:O39: (,0) +K39
K:P39: (P2) -0.0547251582970618576
K:Q39: (P2) 0.043243968299034667
K:K40: (,0) +D28
K:L40: (,0) 0
K:M40: (,0) 0
K:N40: (,0) +K40
K:O40: (,0) +K40
K:K41: (,0) +C29
K:L41: (,0) +E28
K:M41: (,0) +F28
K:N41: (,0) +K41
K:O41: (,0) +K41
K:P41: (P2) -0.0433391175163569584
K:Q41: (P2) 0.0434862546661268662
K:K42: (,0) +D29
K:L42: (,0) 0
K:M42: (,0) 0
K:N42: (,0) +K42
K:O42: (,0) +K42
K:K43: (,0) +C31
K:L43: (,0) +E29
K:M43: (,0) +F29
K:N43: (,0) +K43
K:O43: (,0) +K43
K:P43: (P2) -0.0335120878168698446
K:Q43: (P2) 0.0437041660654558825
K:K44: (,0) +D31
K:L44: (,0) 0
K:M44: (,0) 0
K:N44: (,0) +K44
K:O44: (,0) +K44
K:K45: (,0) +C32
K:L45: (,0) +E31
K:M45: (,0) +F31
K:N45: (,0) +K45
K:O45: (,0) +K45
K:P45: (P2) -0.0249643056833801869
K:Q45: (P2) 0.0439008824424989483
K:K46: (,0) +D32
K:L46: (,0) 0
K:M46: (,0) 0
K:N46: (,0) +K46
K:O46: (,0) +K46
K:K47: (,0) +C33
K:L47: (,0) +E32
K:M47: (,0) +F32
K:N47: (,0) +K47
K:O47: (,0) +K47
K:P47: (P2) -0.0174617091987132766
K:Q47: (P2) 0.0440807810318942428
K:K48: (,0) +D33
```

Copyright 1993 The Evergreen Group

Funding for Other Postretirement Employee Benefits Using An Indenture Plan

```
K:L48: (,0) 0
K:M48: (,0) 0
K:N48: (,0) +K48
K:O48: (,0) +K48
K:K49: (,0) +C34
K:L49: (,0) +E33
K:M49: (,0) +F33
K:N49: (,0) +K49
K:O49: (,0) +K49
K:P49: (P2) -0.0108544694938261138
K:Q49: (P2) 0.0442457927232962207
K:K50: (,0) +D34
K:L50: (,0) 0
K:M50: (,0) 0
K:N50: (,0) +K50
K:O50: (,0) +K50
K:K51: (,0) +C35
K:L51: (,0) +E34
K:M51: (,0) +F34
K:N51: (,0) +K51
K:O51: (,0) +K51
K:P51: (P2) -0.00501067866618274592
K:Q51: (P2) 0.0443976939445010073
K:K52: (,0) +D35
K:L52: (,0) 0
K:M52: (,0) 0
K:N52: (,0) +K52
K:O52: (,0) +K52
K:K53: (,0) +C37
K:L53: (,0) +E35
K:M53: (,0) +F35
K:N53: (,0) +K53
K:O53: (,0) +K53
K:P53: (P2) 0.000172903893662444902
K:Q53: (P2) 0.0445388698118964427
K:K54: (,0) +D37
K:L54: (,0) 0
K:M54: (,0) 0
K:N54: (,0) +K54
K:O54: (,0) +K54
K:K55: (,0) +C38
K:L55: (,0) +E37
K:M55: (,0) +F37
K:N55: (,0) +K55
K:O55: (,0) +K55
K:P55: (P2) 0.00478208632874369346
K:Q55: (P2) 0.0446702291291322816
K:K56: (,0) +D38
K:L56: (,0) 0
K:M56: (,0) 0
K:N56: (,0) +K56
K:O56: (,0) +K56
K:K57: (,0) +C39
K:L57: (,0) +E38
K:M57: (,0) +F38
K:N57: (,0) +K57
K:O57: (,0) +K57
K:P57: (P2) 0.00888922798985573219
K:Q57: (P2) 0.0447926557002814198
K:K58: (,0) +D39
K:L58: (,0) 0
K:M58: (,0) 0
K:N58: (,0) +K58
K:O58: (,0) +K58
K:K59: (,0) +C40
K:L59: (,0) +E39
K:M59: (,0) +F39
K:N59: (,0) +K59
K:O59: (,0) +K59
K:P59: (P2) 0.0125530221614922607
```

Copyright 1993 The Evergreen Group

-- B48 --

Funding for Other Postretirement Employee Benefits Using An Indenture Plan

```
K:Q59: (P2) 0.0449067341786740373
K:K60: (,0) +D40
K:L60: (,0) 0
K:M60: (,0) 0
K:N60: (,0) +K60
K:O60: (,0) +K60
K:K61: (,0) +C41
K:L61: (,0) +E40
K:M61: (,0) +F40
K:N61: (,0) +K61
K:O61: (,0) +K61
K:P61: (P2) 0.0157481610332265853
K:Q61: (P2) 0.045004019103139777
```

Copyright 1993 The Evergreen Group

Funding for Other Postretirement Employee Benefits Using An Indenture Plan

```
M:A1: +$A:$D$4
M:J1: +$A:E27
M:A2: +$A:$D$5
M:A3: (D1) @NOW
M:D3: (C0) '     INCOME STATEMENT EFFECT WITH BORROWING
M:A4: (D7) @NOW
M:E4: (C0) '     (000's OMITTED)
M:H7: (C0) "P&L
M:B8: (C0) "P&L
M:C8: (C0) "P&L
M:D8: "Beginning
M:E8: "Incremental
M:G8: (C0) "Loan
M:H8: (C0) "Effect
M:J8: "Savings
M:B9: (C0) "Effect
M:C9: (C0) "Effect
M:D9: "Year Loan
M:E9: (C0) "Plan
M:F9: (C0) "Annual
M:G9: (C0) "Interest
M:H9: (C0) "with
M:I9: "Savings
M:J9: "per Share
M:B10: (C0) "without
M:C10: (C0) "with
M:D10: "Balance
M:E10: "Cash Flow
M:F10: (C0) "Loan
M:G10: "Accrued
M:H10: (C0) "Plan
M:I10: "($)
M:J10: "($)
M:A11: "Year
M:B11: (C0) "Plan
M:C11: (C0) "Plan
M:D11: "(1)
M:E11: "(2)
M:F11: (C0) "(3)
M:G11: (C0) "(4)
M:H11: (C0) "and Loan
M:I11: "(5)
M:J11: "(5,6)
M:A12: "--------
M:B12: "--------
M:C12: "--------
M:D12: "--------
M:E12: "--------
M:F12: "--------
M:G12: "--------
M:H12: "--------
M:I12: "--------
M:J12: "--------
M:A13: 1
M:B13: (C0) +E:F13
M:C13: (C0) +I:G13
M:D13: (C0) @MAX(D11+F11,0)
M:E13: (C0) +L:G13
M:F13: (C0) @IF(E13>D13-G11,-D13,-E13-G11)
M:G13: (C0) @MIN(-(D13+F13)*M:$D$57,0)
M:H13: (C0) +C13+G13
M:I13: (C0) +H13-B13
M:J13: (F2) (H13-B13)/$D$58*1000
M:A14: 2
M:B14: (,0) +E:F14
M:C14: (,0) +I:G14
M:D14: (,0) @MAX(D13+F13,0)
M:E14: (,0) +L:G14
M:F14: (,0) @IF(E14>D14-G13,-D14,-E14-G13)
M:G14: (,0) @MIN(-(D14+F14)*M:$D$57,0)
```

Copyright 1993 The Evergreen Group

Funding for Other Postretirement Employee Benefits Using An Indenture Plan

```
M:H14: (,0) +C14+G14
M:I14: (,0) +H14-B14
M:J14: (F2) (H14-B14)/$D$58*1000
M:A15: 3
M:B15: (,0) +E:F15
M:C15: (,0) +I:G15
M:D15: (,0) @MAX(D14+F14,0)
M:E15: (,0) +L:G15
M:F15: (,0) @IF(E15>D15-G14,-D15,-E15-G14)
M:G15: (,0) @MIN(-(D15+F15)*M:$D$57,0)
M:H15: (,0) +C15+G15
M:I15: (,0) +H15-B15
M:J15: (F2) (H15-B15)/$D$58*1000
M:A16: 4
M:B16: (,0) +E:F16
M:C16: (,0) +I:G16
M:D16: (,0) @MAX(D15+F15,0)
M:E16: (,0) +L:G16
M:F16: (,0) @IF(E16>D16-G15,-D16,-E16-G15)
M:G16: (,0) @MIN(-(D16+F16)*M:$D$57,0)
M:H16: (,0) +C16+G16
M:I16: (,0) +H16-B16
M:J16: (F2) (H16-B16)/$D$58*1000
M:A17: 5
M:B17: (,0) +E:F17
M:C17: (,0) +I:G17
M:D17: (,0) @MAX(D16+F16,0)
M:E17: (,0) +L:G17
M:F17: (,0) @IF(E17>D17-G16,-D17,-E17-G16)
M:G17: (,0) @MIN(-(D17+F17)*M:$D$57,0)
M:H17: (,0) +C17+G17
M:I17: (,0) +H17-B17
M:J17: (F2) (H17-B17)/$D$58*1000
M:A19: 6
M:B19: (,0) +E:F19
M:C19: (,0) +I:G19
M:D19: (,0) @MAX(D17+F17,0)
M:E19: (,0) +L:G19
M:F19: (,0) @IF(E19>D19-G17,-D19,-E19-G17)
M:G19: (,0) @MIN(-(D19+F19)*M:$D$57,0)
M:H19: (,0) +C19+G19
M:I19: (,0) +H19-B19
M:J19: (F2) (H19-B19)/$D$58*1000
M:A20: 7
M:B20: (,0) +E:F20
M:C20: (,0) +I:G20
M:D20: (,0) @MAX(D19+F19,0)
M:E20: (,0) +L:G20
M:F20: (,0) @IF(E20>D20-G19,-D20,-E20-G19)
M:G20: (,0) @MIN(-(D20+F20)*M:$D$57,0)
M:H20: (,0) +C20+G20
M:I20: (,0) +H20-B20
M:J20: (F2) (H20-B20)/$D$58*1000
M:A21: 8
M:B21: (,0) +E:F21
M:C21: (,0) +I:G21
M:D21: (,0) @MAX(D20+F20,0)
M:E21: (,0) +L:G21
M:F21: (,0) @IF(E21>D21-G20,-D21,-E21-G20)
M:G21: (,0) @MIN(-(D21+F21)*M:$D$57,0)
M:H21: (,0) +C21+G21
M:I21: (,0) +H21-B21
M:J21: (F2) (H21-B21)/$D$58*1000
M:A22: 9
M:B22: (,0) +E:F22
M:C22: (,0) +I:G22
M:D22: (,0) @MAX(D21+F21,0)
M:E22: (,0) +L:G22
M:F22: (,0) @IF(E22>D22-G21,-D22,-E22-G21)
M:G22: (,0) @MIN(-(D22+F22)*M:$D$57,0)
```

Copyright 1993 The Evergreen Group

Funding for Other Postretirement Employee Benefits Using An Indenture Plan

```
M:H22: (,0) +C22+G22
M:I22: (,0) +H22-B22
M:J22: (F2) (H22-B22)/$D$58*1000
M:A23: 10
M:B23: (,0) +E:F23
M:C23: (,0) +I:G23
M:D23: (,0) @MAX(D22+F22,0)
M:E23: (,0) +L:G23
M:F23: (,0) @IF(E23>D23-G22,-D23,-E23-G22)
M:G23: (,0) @MIN(-(D23+F23)*M:$D$57,0)
M:H23: (,0) +C23+G23
M:I23: (,0) +H23-B23
M:J23: (F2) (H23-B23)/$D$58*1000
M:A25: 11
M:B25: (,0) +E:F25
M:C25: (,0) +I:G25
M:D25: (,0) @MAX(D23+F23,0)
M:E25: (,0) +L:G25
M:F25: (,0) @IF(E25>D25-G23,-D25,-E25-G23)
M:G25: (,0) @MIN(-(D25+F25)*M:$D$57,0)
M:H25: (,0) +C25+G25
M:I25: (,0) +H25-B25
M:J25: (F2) (H25-B25)/$D$58*1000
M:A26: 12
M:B26: (,0) +E:F26
M:C26: (,0) +I:G26
M:D26: (,0) @MAX(D25+F25,0)
M:E26: (,0) +L:G26
M:F26: (,0) @IF(E26>D26-G25,-D26,-E26-G25)
M:G26: (,0) @MIN(-(D26+F26)*M:$D$57,0)
M:H26: (,0) +C26+G26
M:I26: (,0) +H26-B26
M:J26: (F2) (H26-B26)/$D$58*1000
M:A27: 13
M:B27: (,0) +E:F27
M:C27: (,0) +I:G27
M:D27: (,0) @MAX(D26+F26,0)
M:E27: (,0) +L:G27
M:F27: (,0) @IF(E27>D27-G26,-D27,-E27-G26)
M:G27: (,0) @MIN(-(D27+F27)*M:$D$57,0)
M:H27: (,0) +C27+G27
M:I27: (,0) +H27-B27
M:J27: (F2) (H27-B27)/$D$58*1000
M:A28: 14
M:B28: (,0) +E:F28
M:C28: (,0) +I:G28
M:D28: (,0) @MAX(D27+F27,0)
M:E28: (,0) +L:G28
M:F28: (,0) @IF(E28>D28-G27,-D28,-E28-G27)
M:G28: (,0) @MIN(-(D28+F28)*M:$D$57,0)
M:H28: (,0) +C28+G28
M:I28: (,0) +H28-B28
M:J28: (F2) (H28-B28)/$D$58*1000
M:A29: 15
M:B29: (,0) +E:F29
M:C29: (,0) +I:G29
M:D29: (,0) @MAX(D28+F28,0)
M:E29: (,0) +L:G29
M:F29: (,0) @IF(E29>D29-G28,-D29,-E29-G28)
M:G29: (,0) @MIN(-(D29+F29)*M:$D$57,0)
M:H29: (,0) +C29+G29
M:I29: (,0) +H29-B29
M:J29: (F2) (H29-B29)/$D$58*1000
M:A31: 16
M:B31: (,0) +E:F31
M:C31: (,0) +I:G31
M:D31: (,0) @MAX(D29+F29,0)
M:E31: (,0) +L:G31
M:F31: (,0) @IF(E31>D31-G29,-D31,-E31-G29)
M:G31: (,0) @MIN(-(D31+F31)*M:$D$57,0)
```

Copyright 1993 The Evergreen Group

-- B52 --

Funding for Other Postretirement Employee Benefits Using An Indenture Plan

```
M:H31: (,0) +C31+G31
M:I31: (,0) +H31-B31
M:J31: (F2) (H31-B31)/$D$58*1000
M:A32: 17
M:B32: (,0) +E:F32
M:C32: (,0) +I:G32
M:D32: (,0) @MAX(D31+F31,0)
M:E32: (,0) +L:G32
M:F32: (,0) @IF(E32>D32-G31,-D32,-E32-G31)
M:G32: (,0) @MIN(-(D32+F32)*M:$D$57,0)
M:H32: (,0) +C32+G32
M:I32: (,0) +H32-B32
M:J32: (F2) (H32-B32)/$D$58*1000
M:A33: 18
M:B33: (,0) +E:F33
M:C33: (,0) +I:G33
M:D33: (,0) @MAX(D32+F32,0)
M:E33: (,0) +L:G33
M:F33: (,0) @IF(E33>D33-G32,-D33,-E33-G32)
M:G33: (,0) @MIN(-(D33+F33)*M:$D$57,0)
M:H33: (,0) +C33+G33
M:I33: (,0) +H33-B33
M:J33: (F2) (H33-B33)/$D$58*1000
M:A34: 19
M:B34: (,0) +E:F34
M:C34: (,0) +I:G34
M:D34: (,0) @MAX(D33+F33,0)
M:E34: (,0) +L:G34
M:F34: (,0) @IF(E34>D34-G33,-D34,-E34-G33)
M:G34: (,0) @MIN(-(D34+F34)*M:$D$57,0)
M:H34: (,0) +C34+G34
M:I34: (,0) +H34-B34
M:J34: (F2) (H34-B34)/$D$58*1000
M:A35: 20
M:B35: (,0) +E:F35
M:C35: (,0) +I:G35
M:D35: (,0) @MAX(D34+F34,0)
M:E35: (,0) +L:G35
M:F35: (,0) @IF(E35>D35-G34,-D35,-E35-G34)
M:G35: (,0) @MIN(-(D35+F35)*M:$D$57,0)
M:H35: (,0) +C35+G35
M:I35: (,0) +H35-B35
M:J35: (F2) (H35-B35)/$D$58*1000
M:A37: 21
M:B37: (,0) +E:F37
M:C37: (,0) +I:G37
M:D37: (,0) @MAX(D35+F35,0)
M:E37: (,0) +L:G37
M:F37: (,0) @IF(E37>D37-G35,-D37,-E37-G35)
M:G37: (,0) @MIN(-(D37+F37)*M:$D$57,0)
M:H37: (,0) +C37+G37
M:I37: (,0) +H37-B37
M:J37: (F2) (H37-B37)/$D$58*1000
M:A38: 22
M:B38: (,0) +E:F38
M:C38: (,0) +I:G38
M:D38: (,0) @MAX(D37+F37,0)
M:E38: (,0) +L:G38
M:F38: (,0) @IF(E38>D38-G37,-D38,-E38-G37)
M:G38: (,0) @MIN(-(D38+F38)*M:$D$57,0)
M:H38: (,0) +C38+G38
M:I38: (,0) +H38-B38
M:J38: (F2) (H38-B38)/$D$58*1000
M:A39: 23
M:B39: (,0) +E:F39
M:C39: (,0) +I:G39
M:D39: (,0) @MAX(D38+F38,0)
M:E39: (,0) +L:G39
M:F39: (,0) @IF(E39>D39-G38,-D39,-E39-G38)
M:G39: (,0) @MIN(-(D39+F39)*M:$D$57,0)
```

Copyright 1993 The Evergreen Group

-- B53 --

Funding for Other Postretirement Employee Benefits Using An Indenture Plan

```
M:H39: (,0) +C39+G39
M:I39: (,0) +H39-B39
M:J39: (F2) (H39-B39)/$D$58*1000
M:A40: 24
M:B40: (,0) +E:F40
M:C40: (,0) +I:G40
M:D40: (,0) @MAX(D39+F39,0)
M:E40: (,0) +L:G40
M:F40: (,0) @IF(E40>D40-G39,-D40,-E40-G39)
M:G40: (,0) @MIN(-(D40+F40)*M:$D$57,0)
M:H40: (,0) +C40+G40
M:I40: (,0) +H40-B40
M:J40: (F2) (H40-B40)/$D$58*1000
M:A41: 25
M:B41: (,0) +E:F41
M:C41: (,0) +I:G41
M:D41: (,0) @MAX(D40+F40,0)
M:E41: (,0) +L:G41
M:F41: (,0) @IF(E41>D41-G40,-D41,-E41-G40)
M:G41: (,0) @MIN(-(D41+F41)*M:$D$57,0)
M:H41: (,0) +C41+G41
M:I41: (,0) +H41-B41
M:J41: (F2) (H41-B41)/$D$58*1000
M:A43: 26
M:B43: (,0) +E:F43
M:C43: (,0) +I:G43
M:D43: (,0) @MAX(D41+F41,0)
M:E43: (,0) +L:G43
M:F43: (,0) @IF(E43>D43-G41,-D43,-E43-G41)
M:G43: (,0) @MIN(-(D43+F43)*M:$D$57,0)
M:H43: (,0) +C43+G43
M:I43: (,0) +H43-B43
M:J43: (F2) (H43-B43)/$D$58*1000
M:A44: 27
M:B44: (,0) +E:F44
M:C44: (,0) +I:G44
M:D44: (,0) @MAX(D43+F43,0)
M:E44: (,0) +L:G44
M:F44: (,0) @IF(E44>D44-G43,-D44,-E44-G43)
M:G44: (,0) @MIN(-(D44+F44)*M:$D$57,0)
M:H44: (,0) +C44+G44
M:I44: (,0) +H44-B44
M:J44: (F2) (H44-B44)/$D$58*1000
M:A45: 28
M:B45: (,0) +E:F45
M:C45: (,0) +I:G45
M:D45: (,0) @MAX(D44+F44,0)
M:E45: (,0) +L:G45
M:F45: (,0) @IF(E45>D45-G44,-D45,-E45-G44)
M:G45: (,0) @MIN(-(D45+F45)*M:$D$57,0)
M:H45: (,0) +C45+G45
M:I45: (,0) +H45-B45
M:J45: (F2) (H45-B45)/$D$58*1000
M:A46: 29
M:B46: (,0) +E:F46
M:C46: (,0) +I:G46
M:D46: (,0) @MAX(D45+F45,0)
M:E46: (,0) +L:G46
M:F46: (,0) @IF(E46>D46-G45,-D46,-E46-G45)
M:G46: (,0) @MIN(-(D46+F46)*M:$D$57,0)
M:H46: (,0) +C46+G46
M:I46: (,0) +H46-B46
M:J46: (F2) (H46-B46)/$D$58*1000
M:A47: 30
M:B47: (,0) +E:F47
M:C47: (,0) +I:G47
M:D47: (,0) @MAX(D46+F46,0)
M:E47: (,0) +L:G47
M:F47: (,0) @IF(E47>D47-G46,-D47,-E47-G46)
M:G47: (,0) @MIN(-(D47+F47)*M:$D$57,0)
```

Copyright 1993 The Evergreen Group

Funding for Other Postretirement Employee Benefits Using An Indenture Plan

```
M:H47: (,0) +C47+G47
M:I47: (,0) +H47-B47
M:J47: (F2) (H47-B47)/$D$58*1000
M:A50: '(1) Beginning year loan balance equals previous year's loan balance plus previous year's loan.
M:A51: '(2) Incremental plan cash flow assumed to be at beginning of year.
M:A52: '(3) Annual loan at beginning of year.
M:A53: '    Annual loan equals previous year's accrued interest plus incremental Plan cash flow.
M:A54: '(4) Loan interest accrued equals beginning year loan balance plus annual loan times after-tax loan interest rate.
M:A55: '    Loan interest rate =
M:D55: (P1) +$LRATE
M:A56: '    Tax rate =
M:D56: (P1) +$CTAX
M:A57: '    After-tax loan interest rate =
M:D57: (P1) +D55*(1-D56)
M:A58: '(5) Shares outstanding =
M:D58: (,0) +$SHARES
M:A59: '(6) Savings per share versus net income without Indenture Plan.
M:A61: |::
```

Copyright 1993 The Evergreen Group

-- B55 --

Funding for Other Postretirement Employee Benefits Using An Indenture Plan

```
Q:A1: +$A:$D$4
Q:J1: +$A:E28
Q:A2: +$A:$D$5
Q:A3: (D1) @NOW
Q:D3: '    ASSET GROWTH IN A TAXABLE TRUST
Q:A4: (D7) @NOW
Q:E4: ^(000's OMITTED)
Q:F7: "Annual
Q:D8: "Annual
Q:E8: "Trust
Q:F8: "Expenditure
Q:C9: "Beginning
Q:D9: "Contribution
Q:E9: "Interest
Q:F9: "of Trust
Q:H9: "Year End
Q:C10: "Year Trust
Q:D10: "to Trust
Q:E10: "Income
Q:F10: "Income
Q:G10: "Trust
Q:H10: "Trust
Q:B11: "Year
Q:C11: "Balance
Q:D11: "(1)
Q:E11: "(2)
Q:F11: "(3)
Q:G11: "Cash Flow
Q:H11: "Balance
Q:B12: "--------
Q:C12: "--------
Q:D12: "--------
Q:E12: "--------
Q:F12: "--------
Q:G12: "--------
Q:H12: "--------
Q:B13: 1
Q:C13: (C0) 0
Q:D13: (C0) -B:G9
Q:E13: (C0) (C13+D13)*Q:$D$54*(1-Q:$D$55)+F13*((1+Q:$D$54*(1-Q:$D$55))^0.5-1)
Q:F13: (C0) @MAX(B:B9,-B:H9)
Q:G13: (C0) +E13+F13
Q:H13: (C0) +C13+D13+G13
Q:B14: 2
Q:C14: (,0) +H13
Q:D14: (,0) -B:G10
Q:E14: (,0) (C14+D14)*Q:$D$54*(1-Q:$D$55)+F14*((1+Q:$D$54*(1-Q:$D$55))^0.5-1)
Q:F14: (,0) @MAX(B:B10,-B:H10)
Q:G14: (,0) +E14+F14
Q:H14: (,0) +C14+D14+G14
Q:B15: 3
Q:C15: (,0) +H14
Q:D15: (,0) -B:G11
Q:E15: (,0) (C15+D15)*Q:$D$54*(1-Q:$D$55)+F15*((1+Q:$D$54*(1-Q:$D$55))^0.5-1)
Q:F15: (,0) @MAX(B:B11,-B:H11)
Q:G15: (,0) +E15+F15
Q:H15: (,0) +C15+D15+G15
Q:B16: 4
Q:C16: (,0) +H15
Q:D16: (,0) -B:G12
Q:E16: (,0) (C16+D16)*Q:$D$54*(1-Q:$D$55)+F16*((1+Q:$D$54*(1-Q:$D$55))^0.5-1)
Q:F16: (,0) @MAX(B:B12,-B:H12)
Q:G16: (,0) +E16+F16
Q:H16: (,0) +C16+D16+G16
Q:B17: 5
Q:C17: (,0) +H16
Q:D17: (,0) -B:G13
Q:E17: (,0) (C17+D17)*Q:$D$54*(1-Q:$D$55)+F17*((1+Q:$D$54*(1-Q:$D$55))^0.5-1)
Q:F17: (,0) @MAX(B:B13,-B:H13)
Q:G17: (,0) +E17+F17
```

Copyright 1993 The Evergreen Group

-- B56 --

Funding for Other Postretirement Employee Benefits Using An Indenture Plan

```
Q:H17: (,0) +C17+D17+G17
Q:B19: 6
Q:C19: (,0) +H17
Q:D19: (,0) -B:G14
Q:E19: (,0) (C19+D19)*Q:$D$54*(1-Q:$D$55)+F19*((1+Q:$D$54*(1-Q:$D$55))^0.5-1)
Q:F19: (,0) @MAX(B:B14,-B:H14)
Q:G19: (,0) +E19+F19
Q:H19: (,0) +C19+D19+G19
Q:B20: 7
Q:C20: (,0) +H19
Q:D20: (,0) -B:G15
Q:E20: (,0) (C20+D20)*Q:$D$54*(1-Q:$D$55)+F20*((1+Q:$D$54*(1-Q:$D$55))^0.5-1)
Q:F20: (,0) @MAX(B:B15,-B:H15)
Q:G20: (,0) +E20+F20
Q:H20: (,0) +C20+D20+G20
Q:B21: 8
Q:C21: (,0) +H20
Q:D21: (,0) -B:G16
Q:E21: (,0) (C21+D21)*Q:$D$54*(1-Q:$D$55)+F21*((1+Q:$D$54*(1-Q:$D$55))^0.5-1)
Q:F21: (,0) @MAX(B:B16,-B:H16)
Q:G21: (,0) +E21+F21
Q:H21: (,0) +C21+D21+G21
Q:B22: 9
Q:C22: (,0) +H21
Q:D22: (,0) -B:G17
Q:E22: (,0) (C22+D22)*Q:$D$54*(1-Q:$D$55)+F22*((1+Q:$D$54*(1-Q:$D$55))^0.5-1)
Q:F22: (,0) @MAX(B:B17,-B:H17)
Q:G22: (,0) +E22+F22
Q:H22: (,0) +C22+D22+G22
Q:B23: 10
Q:C23: (,0) +H22
Q:D23: (,0) -B:G18
Q:E23: (,0) (C23+D23)*Q:$D$54*(1-Q:$D$55)+F23*((1+Q:$D$54*(1-Q:$D$55))^0.5-1)
Q:F23: (,0) @MAX(B:B18,-B:H18)
Q:G23: (,0) +E23+F23
Q:H23: (,0) +C23+D23+G23
Q:B25: 11
Q:C25: (,0) +H23
Q:D25: (,0) -B:G19
Q:E25: (,0) (C25+D25)*Q:$D$54*(1-Q:$D$55)+F25*((1+Q:$D$54*(1-Q:$D$55))^0.5-1)
Q:F25: (,0) @MAX(B:B19,-B:H19)
Q:G25: (,0) +E25+F25
Q:H25: (,0) +C25+D25+G25
Q:B26: 12
Q:C26: (,0) +H25
Q:D26: (,0) -B:G20
Q:E26: (,0) (C26+D26)*Q:$D$54*(1-Q:$D$55)+F26*((1+Q:$D$54*(1-Q:$D$55))^0.5-1)
Q:F26: (,0) @MAX(B:B20,-B:H20)
Q:G26: (,0) +E26+F26
Q:H26: (,0) +C26+D26+G26
Q:B27: 13
Q:C27: (,0) +H26
Q:D27: (,0) -B:G21
Q:E27: (,0) (C27+D27)*Q:$D$54*(1-Q:$D$55)+F27*((1+Q:$D$54*(1-Q:$D$55))^0.5-1)
Q:F27: (,0) @MAX(B:B21,-B:H21)
Q:G27: (,0) +E27+F27
Q:H27: (,0) +C27+D27+G27
Q:B28: 14
Q:C28: (,0) +H27
Q:D28: (,0) -B:G22
Q:E28: (,0) (C28+D28)*Q:$D$54*(1-Q:$D$55)+F28*((1+Q:$D$54*(1-Q:$D$55))^0.5-1)
Q:F28: (,0) @MAX(B:B22,-B:H22)
Q:G28: (,0) +E28+F28
Q:H28: (,0) +C28+D28+G28
Q:B29: 15
Q:C29: (,0) +H28
Q:D29: (,0) -B:G23
Q:E29: (,0) (C29+D29)*Q:$D$54*(1-Q:$D$55)+F29*((1+Q:$D$54*(1-Q:$D$55))^0.5-1)
Q:F29: (,0) @MAX(B:B23,-B:H23)
Q:G29: (,0) +E29+F29
```

Copyright 1993 The Evergreen Group

Funding for Other Postretirement Employee Benefits Using An Indenture Plan

```
Q:H29: (,0) +C29+D29+G29
Q:B31: 16
Q:C31: (,0) +H29
Q:D31: (,0) -B:G24
Q:E31: (,0) (C31+D31)*Q:$D$54*(1-Q:$D$55)+F31*((1+Q:$D$54*(1-Q:$D$55))^0.5-1)
Q:F31: (,0) @MAX(B:B24,-B:H24)
Q:G31: (,0) +E31+F31
Q:H31: (,0) +C31+D31+G31
Q:B32: 17
Q:C32: (,0) +H31
Q:D32: (,0) -B:G25
Q:E32: (,0) (C32+D32)*Q:$D$54*(1-Q:$D$55)+F32*((1+Q:$D$54*(1-Q:$D$55))^0.5-1)
Q:F32: (,0) @MAX(B:B25,-B:H25)
Q:G32: (,0) +E32+F32
Q:H32: (,0) +C32+D32+G32
Q:B33: 18
Q:C33: (,0) +H32
Q:D33: (,0) -B:G26
Q:E33: (,0) (C33+D33)*Q:$D$54*(1-Q:$D$55)+F33*((1+Q:$D$54*(1-Q:$D$55))^0.5-1)
Q:F33: (,0) @MAX(B:B26,-B:H26)
Q:G33: (,0) +E33+F33
Q:H33: (,0) +C33+D33+G33
Q:B34: 19
Q:C34: (,0) +H33
Q:D34: (,0) -B:G27
Q:E34: (,0) (C34+D34)*Q:$D$54*(1-Q:$D$55)+F34*((1+Q:$D$54*(1-Q:$D$55))^0.5-1)
Q:F34: (,0) @MAX(B:B27,-B:H27)
Q:G34: (,0) +E34+F34
Q:H34: (,0) +C34+D34+G34
Q:B35: 20
Q:C35: (,0) +H34
Q:D35: (,0) -B:G28
Q:E35: (,0) (C35+D35)*Q:$D$54*(1-Q:$D$55)+F35*((1+Q:$D$54*(1-Q:$D$55))^0.5-1)
Q:F35: (,0) @MAX(B:B28,-B:H28)
Q:G35: (,0) +E35+F35
Q:H35: (,0) +C35+D35+G35
Q:B37: 21
Q:C37: (,0) +H35
Q:D37: (,0) -B:G29
Q:E37: (,0) (C37+D37)*Q:$D$54*(1-Q:$D$55)+F37*((1+Q:$D$54*(1-Q:$D$55))^0.5-1)
Q:F37: (,0) @MAX(B:B29,-B:H29)
Q:G37: (,0) +E37+F37
Q:H37: (,0) +C37+D37+G37
Q:B38: 22
Q:C38: (,0) +H37
Q:D38: (,0) -B:G30
Q:E38: (,0) (C38+D38)*Q:$D$54*(1-Q:$D$55)+F38*((1+Q:$D$54*(1-Q:$D$55))^0.5-1)
Q:F38: (,0) @MAX(B:B30,-B:H30)
Q:G38: (,0) +E38+F38
Q:H38: (,0) +C38+D38+G38
Q:B39: 23
Q:C39: (,0) +H38
Q:D39: (,0) -B:G31
Q:E39: (,0) (C39+D39)*Q:$D$54*(1-Q:$D$55)+F39*((1+Q:$D$54*(1-Q:$D$55))^0.5-1)
Q:F39: (,0) @MAX(B:B31,-B:H31)
Q:G39: (,0) +E39+F39
Q:H39: (,0) +C39+D39+G39
Q:B40: 24
Q:C40: (,0) +H39
Q:D40: (,0) -B:G32
Q:E40: (,0) (C40+D40)*Q:$D$54*(1-Q:$D$55)+F40*((1+Q:$D$54*(1-Q:$D$55))^0.5-1)
Q:F40: (,0) @MAX(B:B32,-B:H32)
Q:G40: (,0) +E40+F40
Q:H40: (,0) +C40+D40+G40
Q:B41: 25
Q:C41: (,0) +H40
Q:D41: (,0) -B:G33
Q:E41: (,0) (C41+D41)*Q:$D$54*(1-Q:$D$55)+F41*((1+Q:$D$54*(1-Q:$D$55))^0.5-1)
Q:F41: (,0) @MAX(B:B33,-B:H33)
Q:G41: (,0) +E41+F41
```

Copyright 1993 The Evergreen Group

Funding for Other Postretirement Employee Benefits Using An Indenture Plan

```
Q:H41: (,0) +C41+D41+G41
Q:B43: 26
Q:C43: (,0) +H41
Q:D43: (,0) -B:G34
Q:E43: (,0) (C43+D43)*Q:$D$54*(1-Q:$D$55)+F43*((1+Q:$D$54*(1-Q:$D$55))^0.5-1)
Q:F43: (,0) @MAX(B:B34,-B:H34)
Q:G43: (,0) +E43+F43
Q:H43: (,0) +C43+D43+G43
Q:B44: 27
Q:C44: (,0) +H43
Q:D44: (,0) -B:G35
Q:E44: (,0) (C44+D44)*Q:$D$54*(1-Q:$D$55)+F44*((1+Q:$D$54*(1-Q:$D$55))^0.5-1)
Q:F44: (,0) @MAX(B:B35,-B:H35)
Q:G44: (,0) +E44+F44
Q:H44: (,0) +C44+D44+G44
Q:B45: 28
Q:C45: (,0) +H44
Q:D45: (,0) -B:G36
Q:E45: (,0) (C45+D45)*Q:$D$54*(1-Q:$D$55)+F45*((1+Q:$D$54*(1-Q:$D$55))^0.5-1)
Q:F45: (,0) @MAX(B:B36,-B:H36)
Q:G45: (,0) +E45+F45
Q:H45: (,0) +C45+D45+G45
Q:B46: 29
Q:C46: (,0) +H45
Q:D46: (,0) -B:G37
Q:E46: (,0) (C46+D46)*Q:$D$54*(1-Q:$D$55)+F46*((1+Q:$D$54*(1-Q:$D$55))^0.5-1)
Q:F46: (,0) @MAX(B:B37,-B:H37)
Q:G46: (,0) +E46+F46
Q:H46: (,0) +C46+D46+G46
Q:B47: 30
Q:C47: (,0) +H46
Q:D47: (,0) -B:G38
Q:E47: (,0) (C47+D47)*Q:$D$54*(1-Q:$D$55)+F47*((1+Q:$D$54*(1-Q:$D$55))^0.5-1)
Q:F47: (,0) @MAX(B:B38,-B:H38)
Q:G47: (,0) +E47+F47
Q:H47: (,0) +C47+D47+G47
Q:B51: '(1) Contributions to the taxable trust match insurance premiums.
Q:B52: '(2) Trust interest earned on beginning year balance, plus additions to the trust.
Q:B53: '    Trust income expense for mid-year death benefits distributed.
Q:B54: '    Trust interest rate =
Q:D54: (P1) +$TRATE
Q:B55: '    Trust tax rate =
Q:D55: (P1) +$VTAX
Q:B56: '(3) Expenditures of Trust income match insurance death benefits distributed.
Q:A61: |::
```

Copyright 1993 The Evergreen Group

-- B59 --

Funding for Other Postretirement Employee Benefits Using An Indenture Plan

```
R:A1: +$A:$D$4
R:J1: +$A:E29
R:A2: +$A:$D$5
R:A3: (D1) @NOW
R:D3: ^COMPARISON OF BALANCE SHEET ASSET GROWTHS
R:A4: (D7) @NOW
R:E4: ^(000's OMITTED)
R:G6: "Percentage
R:D7: "Market
R:G7: "Advantage
R:D8: "Related
R:E8: "Year End
R:G8: "of Funding
R:D9: "Value of
R:E9: "Taxable
R:F9: "Difference
R:G9: '      with
R:D10: "Plan
R:E10: "Trust
R:F10: "Between
R:G10: "Indenture
R:C11: "Year
R:D11: "Assets
R:E11: "Asset
R:F11: "Assets
R:G11: "Plan
R:C12: "--------
R:D12: "--------
R:E12: "--------
R:F12: "--------
R:G12: "--------
R:C13: 1
R:D13: (C0) +G:J13
R:E13: (C0) +Q:H13
R:F13: (C0) +D13-E13
R:G13: (P1) +F13/@ABS(E13)
R:C14: 2
R:D14: (,0) +G:J14
R:E14: (,0) +Q:H14
R:F14: (,0) +D14-E14
R:G14: (P1) +F14/@ABS(E14)
R:C15: 3
R:D15: (,0) +G:J15
R:E15: (,0) +Q:H15
R:F15: (,0) +D15-E15
R:G15: (P1) +F15/@ABS(E15)
R:C16: 4
R:D16: (,0) +G:J16
R:E16: (,0) +Q:H16
R:F16: (,0) +D16-E16
R:G16: (P1) +F16/@ABS(E16)
R:C17: 5
R:D17: (,0) +G:J17
R:E17: (,0) +Q:H17
R:F17: (,0) +D17-E17
R:G17: (P1) +F17/@ABS(E17)
R:C19: 6
R:D19: (,0) +G:J19
R:E19: (,0) +Q:H19
R:F19: (,0) +D19-E19
R:G19: (P1) +F19/@ABS(E19)
R:C20: 7
R:D20: (,0) +G:J20
R:E20: (,0) +Q:H20
R:F20: (,0) +D20-E20
R:G20: (P1) +F20/@ABS(E20)
R:C21: 8
R:D21: (,0) +G:J21
R:E21: (,0) +Q:H21
R:F21: (,0) +D21-E21
```

Copyright 1993 The Evergreen Group

--B60--

Funding for Other Postretirement Employee Benefits Using An Indenture Plan

```
R:G21: (P1) +F21/@ABS(E21)
R:C22: 9
R:D22: (,0) +G:J22
R:E22: (,0) +Q:H22
R:F22: (,0) +D22-E22
R:G22: (P1) +F22/@ABS(E22)
R:C23: 10
R:D23: (,0) +G:J23
R:E23: (,0) +Q:H23
R:F23: (,0) +D23-E23
R:G23: (P1) +F23/@ABS(E23)
R:C25: 11
R:D25: (,0) +G:J25
R:E25: (,0) +Q:H25
R:F25: (,0) +D25-E25
R:G25: (P1) +F25/@ABS(E25)
R:C26: 12
R:D26: (,0) +G:J26
R:E26: (,0) +Q:H26
R:F26: (,0) +D26-E26
R:G26: (P1) +F26/@ABS(E26)
R:C27: 13
R:D27: (,0) +G:J27
R:E27: (,0) +Q:H27
R:F27: (,0) +D27-E27
R:G27: (P1) +F27/@ABS(E27)
R:C28: 14
R:D28: (,0) +G:J28
R:E28: (,0) +Q:H28
R:F28: (,0) +D28-E28
R:G28: (P1) +F28/@ABS(E28)
R:C29: 15
R:D29: (,0) +G:J29
R:E29: (,0) +Q:H29
R:F29: (,0) +D29-E29
R:G29: (P1) +F29/@ABS(E29)
R:C31: 16
R:D31: (,0) +G:J31
R:E31: (,0) +Q:H31
R:F31: (,0) +D31-E31
R:G31: (P1) +F31/@ABS(E31)
R:C32: 17
R:D32: (,0) +G:J32
R:E32: (,0) +Q:H32
R:F32: (,0) +D32-E32
R:G32: (P1) +F32/@ABS(E32)
R:C33: 18
R:D33: (,0) +G:J33
R:E33: (,0) +Q:H33
R:F33: (,0) +D33-E33
R:G33: (P1) +F33/@ABS(E33)
R:C34: 19
R:D34: (,0) +G:J34
R:E34: (,0) +Q:H34
R:F34: (,0) +D34-E34
R:G34: (P1) +F34/@ABS(E34)
R:C35: 20
R:D35: (,0) +G:J35
R:E35: (,0) +Q:H35
R:F35: (,0) +D35-E35
R:G35: (P1) +F35/@ABS(E35)
R:C37: 21
R:D37: (,0) +G:J37
R:E37: (,0) +Q:H37
R:F37: (,0) +D37-E37
R:G37: (P1) +F37/@ABS(E37)
R:C38: 22
R:D38: (,0) +G:J38
R:E38: (,0) +Q:H38
R:F38: (,0) +D38-E38
```

Copyright 1993 The Evergreen Group

Funding for Other Postretirement Employee Benefits Using An Indenture Plan

```
R:G38: (P1) +F38/@ABS(E38)
R:C39: 23
R:D39: (,0) +G:J39
R:E39: (,0) +Q:H39
R:F39: (,0) +D39-E39
R:G39: (P1) +F39/@ABS(E39)
R:C40: 24
R:D40: (,0) +G:J40
R:E40: (,0) +Q:H40
R:F40: (,0) +D40-E40
R:G40: (P1) +F40/@ABS(E40)
R:C41: 25
R:D41: (,0) +G:J41
R:E41: (,0) +Q:H41
R:F41: (,0) +D41-E41
R:G41: (P1) +F41/@ABS(E41)
R:C43: 26
R:D43: (,0) +G:J43
R:E43: (,0) +Q:H43
R:F43: (,0) +D43-E43
R:G43: (P1) +F43/@ABS(E43)
R:C44: 27
R:D44: (,0) +G:J44
R:E44: (,0) +Q:H44
R:F44: (,0) +D44-E44
R:G44: (P1) +F44/@ABS(E44)
R:C45: 28
R:D45: (,0) +G:J45
R:E45: (,0) +Q:H45
R:F45: (,0) +D45-E45
R:G45: (P1) +F45/@ABS(E45)
R:C46: 29
R:D46: (,0) +G:J46
R:E46: (,0) +Q:H46
R:F46: (,0) +D46-E46
R:G46: (P1) +F46/@ABS(E46)
R:C47: 30
R:D47: (,0) +G:J47
R:E47: (,0) +Q:H47
R:F47: (,0) +D47-E47
R:G47: (P1) +F47/@ABS(E47)
R:A61: |::
```

Copyright 1993 The Evergreen Group

Funding for Other Postretirement Employee Benefits Using An Indenture Plan

```
P:A1: [W11] +$A:$D$4
P:J1: [W12] +A:E30
P:A2: [W11] +$A:$D$5
P:A3: (D1) [W11] @NOW
P:D3: (C0) [W14] 'PRESENT VALUE OF INCREASE IN NET ASSETS WITH BORROWING
P:A4: (D7) [W11] @NOW
P:E4: (C0) [W11] '     (000's OMITTED)
P:F7: [W12] "Net
P:G7: [W10] "Annual
P:F8: [W12] "After-Tax
P:G8: [W10] "Increase
P:D9: [W14] "Market Related
P:E9: (C0) [W11] "Year End
P:F9: [W12] "Increase
P:G9: [W10] "in Net
P:H9: [W12] "Present
P:D10: [W14] "Value of
P:E10: (C0) [W11] "Loan
P:F10: [W12] "in Net
P:G10: [W10] "Assets
P:H10: [W12] "Value
P:C11: [W11] "Year
P:D11: [W14] "Plan Assets
P:E11: [W11] "Balance
P:F11: [W12] "Assets
P:G11: [W10] '      (1)
P:H11: [W12] '      (2)
P:C12: [W11] "--------
P:D12: [W14] "--------
P:E12: [W11] "--------
P:F12: [W12] "--------
P:G12: [W10] "--------
P:H12: [W12] "--------
P:C13: [W11] 1
P:D13: (C0) [W14] +G:J13
P:E13: (C0) [W11] +M:D14
P:F13: (C0) [W12] +D13-E13
P:G13: (C0) [W10] +F13-F12+O:G13
P:H13: (C0) [W12] +F13/((1+$A:$D$11)^C13)
P:C14: [W11] 2
P:D14: (,0) [W14] +G:J14
P:E14: (,0) [W11] +M:D15
P:F14: (,0) [W12] +D14-E14
P:G14: (,0) [W10] +F14-F13+O:G14
P:H14: (,0) [W12] +F14/((1+$A:$D$11)^C14)
P:C15: [W11] 3
P:D15: (,0) [W14] +G:J15
P:E15: (,0) [W11] +M:D16
P:F15: (,0) [W12] +D15-E15
P:G15: (,0) [W10] +F15-F14+O:G15
P:H15: (,0) [W12] +F15/((1+$A:$D$11)^C15)
P:C16: [W11] 4
P:D16: (,0) [W14] +G:J16
P:E16: (,0) [W11] +M:D17
P:F16: (,0) [W12] +D16-E16
P:G16: (,0) [W10] +F16-F15+O:G16
P:H16: (,0) [W12] +F16/((1+$A:$D$11)^C16)
P:C17: [W11] 5
P:D17: (,0) [W14] +G:J17
P:E17: (,0) [W11] +M:D19
P:F17: (,0) [W12] +D17-E17
P:G17: (,0) [W10] +F17-F16+O:G17
P:H17: (,0) [W12] +F17/((1+$A:$D$11)^C17)
P:C19: [W11] 6
P:D19: (,0) [W14] +G:J19
P:E19: (,0) [W11] +M:D20
P:F19: (,0) [W12] +D19-E19
P:G19: (,0) [W10] +F19-F17+O:G19
P:H19: (,0) [W12] +F19/((1+$A:$D$11)^C19)
P:C20: [W11] 7
```

Copyright 1993 The Evergreen Group

Funding for Other Postretirement Employee Benefits Using An Indenture Plan

```
P:D20: (,0) [W14] +G:J20
P:E20: (,0) [W11] +M:D21
P:F20: (,0) [W12] +D20-E20
P:G20: (,0) [W10] +F20-F19+O:G20
P:H20: (,0) [W12] +F20/((1+$A:$D$11)^C20)
P:C21: [W11] 8
P:D21: (,0) [W14] +G:J21
P:E21: (,0) [W11] +M:D22
P:F21: (,0) [W12] +D21-E21
P:G21: (,0) [W10] +F21-F20+O:G21
P:H21: (,0) [W12] +F21/((1+$A:$D$11)^C21)
P:C22: [W11] 9
P:D22: (,0) [W14] +G:J22
P:E22: (,0) [W11] +M:D23
P:F22: (,0) [W12] +D22-E22
P:G22: (,0) [W10] +F22-F21+O:G22
P:H22: (,0) [W12] +F22/((1+$A:$D$11)^C22)
P:C23: [W11] 10
P:D23: (,0) [W14] +G:J23
P:E23: (,0) [W11] +M:D25
P:F23: (,0) [W12] +D23-E23
P:G23: (,0) [W10] +F23-F22+O:G23
P:H23: (,0) [W12] +F23/((1+$A:$D$11)^C23)
P:C25: [W11] 11
P:D25: (,0) [W14] +G:J25
P:E25: (,0) [W11] +M:D26
P:F25: (,0) [W12] +D25-E25
P:G25: (,0) [W10] +F25-F23+O:G25
P:H25: (,0) [W12] +F25/((1+$A:$D$11)^C25)
P:C26: [W11] 12
P:D26: (,0) [W14] +G:J26
P:E26: (,0) [W11] +M:D27
P:F26: (,0) [W12] +D26-E26
P:G26: (,0) [W10] +F26-F25+O:G26
P:H26: (,0) [W12] +F26/((1+$A:$D$11)^C26)
P:C27: [W11] 13
P:D27: (,0) [W14] +G:J27
P:E27: (,0) [W11] +M:D28
P:F27: (,0) [W12] +D27-E27
P:G27: (,0) [W10] +F27-F26+O:G27
P:H27: (,0) [W12] +F27/((1+$A:$D$11)^C27)
P:C28: [W11] 14
P:D28: (,0) [W14] +G:J28
P:E28: (,0) [W11] +M:D29
P:F28: (,0) [W12] +D28-E28
P:G28: (,0) [W10] +F28-F27+O:G28
P:H28: (,0) [W12] +F28/((1+$A:$D$11)^C28)
P:C29: [W11] 15
P:D29: (,0) [W14] +G:J29
P:E29: (,0) [W11] +M:D31
P:F29: (,0) [W12] +D29-E29
P:G29: (,0) [W10] +F29-F28+O:G29
P:H29: (,0) [W12] +F29/((1+$A:$D$11)^C29)
P:C31: [W11] 16
P:D31: (,0) [W14] +G:J31
P:E31: (,0) [W11] +M:D32
P:F31: (,0) [W12] +D31-E31
P:G31: (,0) [W10] +F31-F29+O:G31
P:H31: (,0) [W12] +F31/((1+$A:$D$11)^C31)
P:C32: [W11] 17
P:D32: (,0) [W14] +G:J32
P:E32: (,0) [W11] +M:D33
P:F32: (,0) [W12] +D32-E32
P:G32: (,0) [W10] +F32-F31+O:G32
P:H32: (,0) [W12] +F32/((1+$A:$D$11)^C32)
P:C33: [W11] 18
P:D33: (,0) [W14] +G:J33
P:E33: (,0) [W11] +M:D34
P:F33: (,0) [W12] +D33-E33
P:G33: (,0) [W10] +F33-F32+O:G33
```

Copyright 1993 The Evergreen Group

Funding for Other Postretirement Employee Benefits Using An Indenture Plan

```
P:H33: (,0) [W12] +F33/((1+$A:$D$11)^C33)
P:C34: [W11] 19
P:D34: (,0) [W14] +G:J34
P:E34: (,0) [W11] +M:D35
P:F34: (,0) [W12] +D34-E34
P:G34: (,0) [W10] +F34-F33+O:G34
P:H34: (,0) [W12] +F34/((1+$A:$D$11)^C34)
P:C35: [W11] 20
P:D35: (,0) [W14] +G:J35
P:E35: (,0) [W11] +M:D37
P:F35: (,0) [W12] +D35-E35
P:G35: (,0) [W10] +F35-F34+O:G35
P:H35: (,0) [W12] +F35/((1+$A:$D$11)^C35)
P:C37: [W11] 21
P:D37: (,0) [W14] +G:J37
P:E37: (,0) [W11] +M:D38
P:F37: (,0) [W12] +D37-E37
P:G37: (,0) [W10] +F37-F35+O:G37
P:H37: (,0) [W12] +F37/((1+$A:$D$11)^C37)
P:C38: [W11] 22
P:D38: (,0) [W14] +G:J38
P:E38: (,0) [W11] +M:D39
P:F38: (,0) [W12] +D38-E38
P:G38: (,0) [W10] +F38-F37+O:G38
P:H38: (,0) [W12] +F38/((1+$A:$D$11)^C38)
P:C39: [W11] 23
P:D39: (,0) [W14] +G:J39
P:E39: (,0) [W11] +M:D40
P:F39: (,0) [W12] +D39-E39
P:G39: (,0) [W10] +F39-F38+O:G39
P:H39: (,0) [W12] +F39/((1+$A:$D$11)^C39)
P:C40: [W11] 24
P:D40: (,0) [W14] +G:J40
P:E40: (,0) [W11] +M:D41
P:F40: (,0) [W12] +D40-E40
P:G40: (,0) [W10] +F40-F39+O:G40
P:H40: (,0) [W12] +F40/((1+$A:$D$11)^C40)
P:C41: [W11] 25
P:D41: (,0) [W14] +G:J41
P:E41: (,0) [W11] +M:D43
P:F41: (,0) [W12] +D41-E41
P:G41: (,0) [W10] +F41-F40+O:G41
P:H41: (,0) [W12] +F41/((1+$A:$D$11)^C41)
P:C43: [W11] 26
P:D43: (,0) [W14] +G:J43
P:E43: (,0) [W11] +M:D44
P:F43: (,0) [W12] +D43-E43
P:G43: (,0) [W10] +F43-F41+O:G43
P:H43: (,0) [W12] +F43/((1+$A:$D$11)^C43)
P:C44: [W11] 27
P:D44: (,0) [W14] +G:J44
P:E44: (,0) [W11] +M:D45
P:F44: (,0) [W12] +D44-E44
P:G44: (,0) [W10] +F44-F43+O:G44
P:H44: (,0) [W12] +F44/((1+$A:$D$11)^C44)
P:C45: [W11] 28
P:D45: (,0) [W14] +G:J45
P:E45: (,0) [W11] +M:D46
P:F45: (,0) [W12] +D45-E45
P:G45: (,0) [W10] +F45-F44+O:G45
P:H45: (,0) [W12] +F45/((1+$A:$D$11)^C45)
P:C46: [W11] 29
P:D46: (,0) [W14] +G:J46
P:E46: (,0) [W11] +M:D47
P:F46: (,0) [W12] +D46-E46
P:G46: (,0) [W10] +F46-F45+O:G46
P:H46: (,0) [W12] +F46/((1+$A:$D$11)^C46)
P:C47: [W11] 30
P:D47: (,0) [W14] +G:J47
P:E47: (,0) [W11] @MAX(M:D47+M:F47,0)
```

Copyright 1993 The Evergreen Group

Funding for Other Postretirement Employee Benefits Using An Indenture Plan

```
P:F47: (,0) [W12] +D47-E47
P:G47: (,0) [W10] +F47-F46+O:G47
P:H47: (,0) [W12] +F47/((1+$A:$D$11)^C47)
P:D53: [W14] '(1) Annual increase in net assets equals after tax cash flow net of debt
P:D54: [W14] '    service plus market related value of plan assets less the loan balance.
P:D56: (P1) [W14] '(2) Present value is calculated on net after tax increase in net worth for
P:D57: (P1) [W14] '    each year.  The discount factor is
P:G57: (P2) [W10] +$A:D$11
P:A61: [W11] |::
```

Copyright 1993 The Evergreen Group

Funding for Other Postretirement Employee Benefits Using An Indenture Plan

```
O:A1: [W11] +$A:$D$4
O:J1: [W11] +A:E31
O:A2: [W11] +$A:$D$5
O:A3: (D1) [W11] @NOW
O:D3: (C0) [W14] '         AFTER TAX CASH FLOW WITH BORROWING
O:A4: (D7) [W11] @NOW
O:E4: (C0) [W13] '     (000's OMITTED)
O:D9: [W14] "Incremental
O:F9: [W13] "Loan
O:G9: [W13] "   After-Tax
O:D10: [W14] "Plan
O:E10: (C0) [W13] "Annual
O:F10: [W13] "Interest
O:G10: [W13] "Cash Flow
O:C11: [W9] "Year
O:D11: [W14] "Cash Flow
O:E11: (C0) [W13] "Loan
O:F11: [W13] "Accrued
O:G11: [W13] "(1)
O:C12: [W9] "--------
O:D12: [W14] "--------
O:E12: [W13] "--------
O:F12: [W13] "--------
O:G12: [W13] "--------
O:C13: [W9] 1
O:D13: (C0) [W14] +L:G13
O:E13: (C0) [W13] +M:F13
O:F13: (C0) [W13] 0
O:G13: (C0) [W13] +D13+E13+F13
O:C14: [W9] 2
O:D14: (,0) [W14] +L:G14
O:E14: (,0) [W13] +M:F14
O:F14: (,0) [W13] +M:G13
O:G14: (,0) [W13] +D14+E14+F14
O:C15: [W9] 3
O:D15: (,0) [W14] +L:G15
O:E15: (,0) [W13] +M:F15
O:F15: (,0) [W13] +M:G14
O:G15: (,0) [W13] +D15+E15+F15
O:C16: [W9] 4
O:D16: (,0) [W14] +L:G16
O:E16: (,0) [W13] +M:F16
O:F16: (,0) [W13] +M:G15
O:G16: (,0) [W13] +D16+E16+F16
O:C17: [W9] 5
O:D17: (,0) [W14] +L:G17
O:E17: (,0) [W13] +M:F17
O:F17: (,0) [W13] +M:G16
O:G17: (,0) [W13] +D17+E17+F17
O:C19: [W9] 6
O:D19: (,0) [W14] +L:G19
O:E19: (,0) [W13] +M:F19
O:F19: (,0) [W13] +M:G17
O:G19: (,0) [W13] +D19+E19+F19
O:C20: [W9] 7
O:D20: (,0) [W14] +L:G20
O:E20: (,0) [W13] +M:F20
O:F20: (,0) [W13] +M:G19
O:G20: (,0) [W13] +D20+E20+F20
O:C21: [W9] 8
O:D21: (,0) [W14] +L:G21
O:E21: (,0) [W13] +M:F21
O:F21: (,0) [W13] +M:G20
O:G21: (,0) [W13] +D21+E21+F21
O:C22: [W9] 9
O:D22: (,0) [W14] +L:G22
O:E22: (,0) [W13] +M:F22
O:F22: (,0) [W13] +M:G21
O:G22: (,0) [W13] +D22+E22+F22
O:C23: [W9] 10
```

Copyright 1993 The Evergreen Group

--B67--

Funding for Other Postretirement Employee Benefits Using An Indenture Plan

```
O:D23: (,0) [W14] +L:G23
O:E23: (,0) [W13] +M:F23
O:F23: (,0) [W13] +M:G22
O:G23: (,0) [W13] +D23+E23+F23
O:C25: [W9] 11
O:D25: (,0) [W14] +L:G25
O:E25: (,0) [W13] +M:F25
O:F25: (,0) [W13] +M:G23
O:G25: (,0) [W13] +D25+E25+F25
O:C26: [W9] 12
O:D26: (,0) [W14] +L:G26
O:E26: (,0) [W13] +M:F26
O:F26: (,0) [W13] +M:G25
O:G26: (,0) [W13] +D26+E26+F26
O:C27: [W9] 13
O:D27: (,0) [W14] +L:G27
O:E27: (,0) [W13] +M:F27
O:F27: (,0) [W13] +M:G26
O:G27: (,0) [W13] +D27+E27+F27
O:C28: [W9] 14
O:D28: (,0) [W14] +L:G28
O:E28: (,0) [W13] +M:F28
O:F28: (,0) [W13] +M:G27
O:G28: (,0) [W13] +D28+E28+F28
O:C29: [W9] 15
O:D29: (,0) [W14] +L:G29
O:E29: (,0) [W13] +M:F29
O:F29: (,0) [W13] +M:G28
O:G29: (,0) [W13] +D29+E29+F29
O:C31: [W9] 16
O:D31: (,0) [W14] +L:G31
O:E31: (,0) [W13] +M:F31
O:F31: (,0) [W13] +M:G29
O:G31: (,0) [W13] +D31+E31+F31
O:C32: [W9] 17
O:D32: (,0) [W14] +L:G32
O:E32: (,0) [W13] +M:F32
O:F32: (,0) [W13] +M:G31
O:G32: (,0) [W13] +D32+E32+F32
O:C33: [W9] 18
O:D33: (,0) [W14] +L:G33
O:E33: (,0) [W13] +M:F33
O:F33: (,0) [W13] +M:G32
O:G33: (,0) [W13] +D33+E33+F33
O:C34: [W9] 19
O:D34: (,0) [W14] +L:G34
O:E34: (,0) [W13] +M:F34
O:F34: (,0) [W13] +M:G33
O:G34: (,0) [W13] +D34+E34+F34
O:C35: [W9] 20
O:D35: (,0) [W14] +L:G35
O:E35: (,0) [W13] +M:F35
O:F35: (,0) [W13] +M:G34
O:G35: (,0) [W13] +D35+E35+F35
O:C37: [W9] 21
O:D37: (,0) [W14] +L:G37
O:E37: (,0) [W13] +M:F37
O:F37: (,0) [W13] +M:G35
O:G37: (,0) [W13] +D37+E37+F37
O:C38: [W9] 22
O:D38: (,0) [W14] +L:G38
O:E38: (,0) [W13] +M:F38
O:F38: (,0) [W13] +M:G37
O:G38: (,0) [W13] +D38+E38+F38
O:C39: [W9] 23
O:D39: (,0) [W14] +L:G39
O:E39: (,0) [W13] +M:F39
O:F39: (,0) [W13] +M:G38
O:G39: (,0) [W13] +D39+E39+F39
O:C40: [W9] 24
```

Copyright 1993 The Evergreen Group

Funding for Other Postretirement Employee Benefits Using An Indenture Plan

```
O:D40: (,0) [W14] +L:G40
O:E40: (,0) [W13] +M:F40
O:F40: (,0) [W13] +M:G39
O:G40: (,0) [W13] +D40+E40+F40
O:C41: [W9] 25
O:D41: (,0) [W14] +L:G41
O:E41: (,0) [W13] +M:F41
O:F41: (,0) [W13] +M:G40
O:G41: (,0) [W13] +D41+E41+F41
O:C43: [W9] 26
O:D43: (,0) [W14] +L:G43
O:E43: (,0) [W13] +M:F43
O:F43: (,0) [W13] +M:G41
O:G43: (,0) [W13] +D43+E43+F43
O:C44: [W9] 27
O:D44: (,0) [W14] +L:G44
O:E44: (,0) [W13] +M:F44
O:F44: (,0) [W13] +M:G43
O:G44: (,0) [W13] +D44+E44+F44
O:C45: [W9] 28
O:D45: (,0) [W14] +L:G45
O:E45: (,0) [W13] +M:F45
O:F45: (,0) [W13] +M:G44
O:G45: (,0) [W13] +D45+E45+F45
O:C46: [W9] 29
O:D46: (,0) [W14] +L:G46
O:E46: (,0) [W13] +M:F46
O:F46: (,0) [W13] +M:G45
O:G46: (,0) [W13] +D46+E46+F46
O:C47: [W9] 30
O:D47: (,0) [W14] +L:G47
O:E47: (,0) [W13] +M:F47
O:F47: (,0) [W13] +M:G46
O:G47: (,0) [W13] +D47+E47+F47
O:C50: [W9] '(1)  The after-tax cash flow is computed assuming borrowing to fund all
O:C51: [W9] '     incremental cash flows required by the Indenture Plan.
O:A61: [W11] |::
```

Copyright 1993 The Evergreen Group

We claim:

1. A method implemented on a machine comprising an electrical digital computer having a processor programmed to electrically process input data into output data, the digital computer being electrically connected to a keyboard and to a printer, the method comprising the steps of:

entering a first forecast of an employee benefit at the keyboard to convert the entered first forecast into a portion of the input data that is electrically conveyed to the digital electrical computer to electrically process;

entering a second forecast of a segregated and restricted investment subject to an indenture agreement at the keyboard to convert the entered second forecast into an other portion of the input data that is electrically conveyed to the digital computer to electrically process;

engaging the digital computer to process the input data add to generate the output data that is electrically conveyed to the printer, the output data representing an illustration of the segregated and restricted investment subject to an indenture agreement providing prefunding for the employee benefit; and printing said illustration at the printer from the electrically conveyed output data.

2. The method of claim 1, wherein said steps are carried out with said investment including a life insurance contract.

3. The method of claim 2, wherein:

the step of engaging the digital computer to process the input data that is electrically conveyed to the digital computer includes engaging the digital computer to compute the prefunding as applied to accrued liabilities and expense charges pursuant to a Financial Accounting Standards Board accounting standard, the computed prefunding being a portion of the output data.

4. The method of claim 2, wherein:

the step of engaging the digital computer to process the input data that is electrically conveyed to the digital computer includes engaging the digital computer to compute the prefunding as applied to accrued liabilities and expense charges in accordance with Employers' Accounting for Postemployment Benefits accounting standards prescribed in Financial Accounting Standards Board Statement of Financial Accounting Standard Number 112, the computed prefunding being a portion of the output data.

5. The method of claim 2, wherein:

the step of engaging the digital computer to process the input data that is electrically conveyed to the digital computer includes engaging the digital computer to compute the prefunding as applied to accrued liabilities and expense charges in accordance with Employers' Accounting for Postretirement Benefits Other Than Pensions accounting standards prescribed in Financial Accounting Standards Board Statement of Financial Accounting Standards Number 106, the computed prefunding being a portion of the output data.

6. The method of claim 2, wherein:

the step of engaging the digital computer to process the input data that is electrically conveyed to the digital computer includes engaging the digital computer to compute the prefunding as applied to accrued liabilities and expense charges in accordance with Employers' Accounting for Pensions accounting standards as prescribed in Financial Accounting Standards Board Statement of Financial Accounting Standard Number 87.

7. The method of claim 2, further comprising the step of:

entering book expense, accrued book liability, premium for insurance, death benefit, and year-end cash value for the insurance at the keyboard so as to convert the book expense, accrued book liability, premium for insurance, death benefit, and year-end cash value for the insurance into a further portion of the input data that is electrically conveyed to the digital electrical computer to electrically process.

8. The method of claim 7, wherein:

the output data and the printed illustration both include a savings per share amount computed from the input data.

9. The method of claim 7, wherein:

the output data and the printed illustration both include an internal rate of return amount computed from the input data.

10. The method of claim 7, wherein:

the output data and the printed illustration both include a savings per share amount computed from the input data with borrowing.

11. The method of claim 7, wherein:

the output data and the printed illustration both include a liability offset amount computed from the input data.

12. The method of claim 7, wherein:

the output data and the illustration both include after tax cash flow, earnings, and balance sheet amounts computed from the input data.

13. The method of claim 2, wherein:

the step of engaging the digital computer to process the input data that is electrically conveyed to the digital computer includes engaging the digital computer to compute $NBL_t=BL_t-MVA_t$, wherein NBL represents annual net book liability, BL represents accrued book liability, MVA represents a market related value of assets or similar book value of assets, and t represents a time period.

14. The method of claim 2, wherein:

the step of engaging the digital computer to process the input data that is electrically conveyed to the digital computer includes engaging the digital computer to compute $PL_t=IBT_t+TB_t$, wherein PL represents profit and loss effect, IBT represents income before taxes, TB represents tax benefit and t represents a time period.

15. The method of claim 14, wherein:

the step of engaging the digital computer to process the input data that is electrically conveyed to the digital computer includes engaging the digital computer to compute $EPS_t=PL_t/{*}SO$, wherein EPS represents earnings per share and *SO represents shares outstanding.

16. The method of claim 2, wherein:

the step of engaging the digital computer to process the input data that is electrically conveyed to the digital computer includes engaging the digital computer to compute $CFI_t=CO_t+TS_t+AMTE_t+AMTAS_t$, wherein CFI represents after-tax cash flow with insurance, CO represents corporate before-tax cash outlay, TS represents tax savings, AMTE represents alternative minimum tax rate effect, AMTAS represents an alternative minimum tax rate amortization schedule, and t represents a time period.

17. The method of claim 2, wherein:

the step of engaging the digital computer to process the input data that is electrically conveyed to the digital computer includes engaging the digital computer to compute $$0=\frac{*CV_t}{(1+III_t)^t}+\sum_{r=1}^{t}\frac{II_r}{(1+III_t)^r},$$

wherein CV represents year-end cash value of the life insurance contract, II represents incremental investment, III represents internal rate of return, r represents a rate, and t represents a time period.

18. The method of claim 2, wherein:

the step of engaging the digital computer to process the input data that is electrically conveyed to the digital computer includes engaging the digital computer to compute $$SB_t=PLB_t-ATFE_t,$$

wherein SB represents savings with borrowing, PLB represents profit and loss with plan and borrowing, ATFE represents after-tax Statement 106 expense, and t represents the year.

19. The method of claim 2, wherein:

the step of engaging the digital computer to process the input data that is electrically conveyed to the digital computer includes engaging the digital computer to compute $SPSB_t=SB_t/*SO$, wherein SPSB represents savings per share with borrowing and *SO represents shares outstanding.

20. The method of any one of claims 1 or 2–19, wherein said steps are carried out with said investment being restricted to spendthrift settlement.

21. The method of any one of claims 1 or 2–19, wherein said steps are carried out for payment of death benefits pursuant to the life insurance contract limited to an amount equal to a paid obligation of the employee benefit.

22. The method of claim 2, wherein said steps are carried out for death proceeds payable to a corporation owner of said insurance contract, but limited to Other Postretirement Employee Benefit pay-as-you-go costs incurred during a time period.

23. The method of claim 22, wherein said steps are carried out for death benefits and any other withdrawals and distributions from the insurance contract in the time period as not exceeding the Other Postretirement Employee Benefit pay-as-you-go costs during the same time period, with any excess amount retained by a carrier and paid out in accordance with a spendthrift insurance settlement clause so that payments from the insurance contract can only be applied toward the Other Postretirement Employee Benefit costs.

24. The method of claim 22, wherein said steps are carried out for the indenture agreement requiring that the indenture agreement shall terminate in the event that Other Postretirement Employee Benefit liability is completely settled, the employee benefit is terminated by the corporation, or government assumes the responsibility for paying the benefits.

25. The method of claim 22, wherein said steps are carried out such that income from at least one insurance contract and excess amounts are recorded for book accounting purposes using an expected long term rate of return pursuant to paragraph 57 of the Financial Accounting Standards Board Accounting Standard No. 106.

26. The method of claim 22, wherein said the second forecast includes a periodic series of death benefits, cash surrender values, partial policy surrenders, and after-tax cash surrender values of the insurance contract.

27. The method of claim 2, wherein the steps are carried out for the life insurance contract being an individual variable life insurance contract.

28. The method of claim 2, wherein the steps are carried out for the life insurance contract being a group variable life insurance contract.

29. The method of claim 2, further comprising the step of computing with said digital computer a tax on the investment income from excess amounts retained by the carrier and which income and tax is included in a net periodic expense computation.

30. The method of claim 2, further comprising a step of computing with said digital computer a book tax accrual by treating death proceeds paid and cash value increases pursuant to the insurance contract as income included in a net periodic expense computation, but the death proceeds and cash value growth from the insurance contract being exempt from taxation for book tax accounting purposes.

31. The method of claim 2, further comprising a step of computing with said digital computer a difference for book tax accounting purposes measured by comparing Other Postretirement Employee Benefit pay-as-you-go costs to Statement 106, accrued Other Postretirement Employee Benefit cost for service, interest, and amortization of a transition obligation.

32. The method of claim 2, wherein the step of engaging the digital computer to process the input data that is electrically conveyed to the digital computer includes engaging the digital computer to compute based on predefined assumptions, and wherein said assumptions include census data, and wherein said first forecast includes values representing active employees, retirees, percentage of retirees with dependent coverage, and census type used in said step of processing.

33. The method of claim 2, wherein the step of engaging the digital computer to process the input data that is electrically conveyed to the digital computer includes engaging the digital computer to compute based on assumptions, and wherein said assumptions include termination rates, disability rates, retirement rates, and mortality rates, wherein said termination rates represent rates at which members of an employee population subject to the employee benefit leave a company providing the employee benefit prior to retirement, turnover, termination, and other reasons not relating to disability or retirement, and wherein said disability rates represent rates at which segments of the employee population become disabled and are no longer able to work, and wherein said retirement rates represent rates at which the employee population retires, by age group, and wherein said mortality rates represent a number of deaths per 1,000 lives, by the age group for the employee population.

34. The method of claim 2, wherein the step of engaging the digital computer to process the input data that is electrically conveyed to the digital computer includes engaging the digital computer to compute based on assumptions, and wherein said assumptions include a medical cost inflation rate.

35. The method of claim 2, wherein the step of engaging the digital computer to process the input data that is electrically conveyed to the digital computer includes engaging the digital computer to compute based on assumptions, and wherein said assumptions include a medical cost discount rate and a pre-tax corporate borrowing rate are displayed, wherein said medical cost discount rate is used in the first forecast of Other Postretirement Employee Benefits liability, and wherein said pre-tax corporate borrowing rate represents a rate at which a corporation providing the employee benefit can borrow.

36. The method of claim 35, wherein the step of engaging the digital computer to process input data that is electrically conveyed to the digital computer includes engaging the digital computer to compute in response to a selection entered at the keyboard, the selection being made from an option selectable to recognize the Other Postretirement Employee Benefits costs immediately such that the transition obligation is written off in one year, or to delay recognition of Other Postretirement Employee Benefit costs such that the transition obligation is amortized on a straight-line basis over an average remaining service period of those covered by the employee benefit, except where the average remaining service period is less than 20 years, in which case the option is also selectable to recognize a 20 year amortization period.

37. The method of claim 2, wherein the step of engaging the digital computer to process the input data that is electrically conveyed to the digital computer includes engaging the digital computer to compute based on assumptions, and wherein said assumptions include a Taxable Trust tax rate, a corporate tax rate, an earnings rate in said insurance contract, and an earnings rate for amounts not held in an insurance contract.

38. The method of claim 2, wherein the step of engaging the digital computer to process the input data that is electrically conveyed to the digital computer includes engaging the digital computer to compute based on assumptions, and wherein said assumptions include an amount of death benefits reinvested.

39. The method of claim 2, wherein the step of engaging the digital computer to process the input data that is electrically conveyed to the digital computer includes engaging the digital computer to compute based on assumptions, and wherein said assumptions include average pre-65 and average post-65 health care costs for an employee population covered by said employee benefit.

40. The method of claim 2, wherein the step of engaging the digital computer to process the input data that is electrically conveyed to the digital computer includes engaging the digital computer to compute based on assumptions, and wherein said assumptions include an amortization period of the Other Postretirement Employee Benefits transition obligation.

41. An electrical digital computer machine, the apparatus comprising:

an electrical digital computer having a processor programmed to electrically process input data into output data, the digital computer being electrically connected to a keyboard and to a printer; wherein said electrical digital computer and said processor are operating pursuant to a program: to enable entering a first forecast of an employee benefit at the keyboard to convert the entered first forecast into a portion of the input data that is electrically conveyed to the digital electrical computer to electrically process;

to enable entering a second forecast of a segregated and restricted investment subject to an indenture agreement at the keyboard to convert the entered second forecast into an other portion of the input data that is electrically conveyed to the digital computer to electrically process;

and to enable engaging the digital computer to process the input data that is electrically conveyed to the digital computer and generate the output data that is electrically conveyed to the printer, the output data representing an illustration of the segregated and restricted investment subject to an indenture agreement providing prefunding for the employee benefit; and to enable the printer to print said illustration.

42. A method for making a machine comprising an electrical digital computer operating pursuant to a program, the method comprising the steps of:

providing a data processing system comprising an electrical digital computer having a processor programmed to electrically process input data representing a first forecast of an employee benefit and a second forecast of a segregated and restricted investment subject to an indenture agreement into output data including an illustration, the digital computer being electrically connected to a keyboard and to a printer, and the processor being programmed such that in response to (1) entering said first forecast of an employee benefit at the keyboard to convert the entered first forecast into a portion of the input data that is electrically conveyed to the digital electrical computer to electrically process;

(2) entering said second forecast of a segregated and restricted investment subject to an indenture agreement at the keyboard to convert the entered second forecast into an other portion of the input data that is electrically conveyed to the digital computer to electrically process; and (3) engaging the digital computer to process said electrically conveyed input data and to generate the output data that is electrically conveyed to the printer, the output data representing an illustration of the segregated and restricted investment subject to an indenture agreement providing prefunding for the employee benefit, the printer will print said illustration.

* * * * *